United States Patent
Tyagi et al.

(10) Patent No.: US 9,760,840 B1
(45) Date of Patent: Sep. 12, 2017

(54) GEOSPATIAL DATA ANALYSIS

(71) Applicant: Tango Analytics LLC, Irving, TX (US)

(72) Inventors: Pranav Tyagi, Southlake, TX (US); Jack B. Thompson, Grapevine, TX (US); Sunil Suram, Southlake, TX (US)

(73) Assignee: TANGO ANALYTICS LLC, Irving, TX (US)

( * ) Notice: Subject to any disclaimer, the term of this patent is extended or adjusted under 35 U.S.C. 154(b) by 58 days.

(21) Appl. No.: 13/663,340

(22) Filed: Oct. 29, 2012

Related U.S. Application Data

(60) Provisional application No. 61/552,373, filed on Oct. 27, 2011.

(51) Int. Cl.
*G06Q 10/00* (2012.01)

(52) U.S. Cl.
CPC .................. *G06Q 10/00* (2013.01)

(58) Field of Classification Search
CPC ......... G06Q 10/00; G06Q 40/00; G06F 17/60
USPC ......................................... 705/7.31
See application file for complete search history.

(56) References Cited

U.S. PATENT DOCUMENTS

| | | | |
|---|---|---|---|
| 5,032,989 A | 7/1991 | Tornetta | |
| 5,361,201 A | 11/1994 | Jost et al. | |
| 5,680,305 A * | 10/1997 | Apgar, IV | G06Q 10/0635 705/7.28 |
| 5,839,113 A * | 11/1998 | Federau et al. | 705/4 |
| 7,321,865 B2 | 1/2008 | Kelly et al. | |
| 7,702,518 B2 | 4/2010 | Kelly et al. | |
| 7,805,316 B2 | 9/2010 | Kelly et al. | |
| 7,856,370 B2 | 12/2010 | Katta et al. | |
| 7,877,287 B1 * | 1/2011 | Bailey | G06Q 10/06375 705/7.31 |
| 8,041,648 B2 * | 10/2011 | Rossmark et al. | 705/314 |
| 8,055,547 B2 | 11/2011 | Kelly et al. | |
| 8,095,412 B1 | 1/2012 | Zias et al. | |
| 8,799,044 B2 | 8/2014 | Sudarshan et al. | |
| 2002/0062360 A1 * | 5/2002 | Ishiguro | 709/219 |
| 2003/0028417 A1 * | 2/2003 | Fox | G06Q 10/06 705/7.34 |
| 2003/0033195 A1 * | 2/2003 | Bruce | G06Q 30/02 705/7.31 |
| 2003/0033229 A1 | 2/2003 | Keyes et al. | |

(Continued)

OTHER PUBLICATIONS

ASPRS "Journal of the American Journal Society for Photogrammetry and Remote", Jun. 2007, vol. 73, pp. 1-3.*

(Continued)

*Primary Examiner* — Romain Jeanty
(74) *Attorney, Agent, or Firm* — Perkins Coie LLP

(57) ABSTRACT

A unit planning system programmed to provide a graphical user interface to one or more user devices associated with users of the system us disclosed. The graphical user interface may provide the user devices with functionality for receiving graphical, geospatial data describing geographic areas, existing retail units, target areas for potential retail units, and sites for potential retail units. In conjunction with the graphical user interface and/or independent from it, the unit planning system may also be programmed to collect, calculate and organize data related to target geographic areas for placement of retail units as well as potential sites for placements of retail units.

13 Claims, 43 Drawing Sheets
(26 of 43 Drawing Sheet(s) Filed in Color)

(56) References Cited

U.S. PATENT DOCUMENTS

| | | |
|---|---|---|
| 2003/0097295 A1 | 5/2003 | Kiefer |
| 2003/0216966 A1 | 11/2003 | Saenz et al. |
| 2004/0078309 A1 | 4/2004 | Norquist et al. |
| 2005/0160033 A1 | 7/2005 | VanKirk et al. |
| 2005/0256778 A1 | 11/2005 | Boyd et al. |
| 2005/0273376 A1 | 12/2005 | Ouimet et al. |
| 2006/0009998 A1 | 1/2006 | Kelly et al. |
| 2008/0077509 A1* | 3/2008 | Rossmark ............. G06Q 10/06 705/28 |
| 2008/0205768 A1 | 8/2008 | Srivastava |
| 2008/0208652 A1 | 8/2008 | Srivastava |
| 2009/0012803 A1* | 1/2009 | Bishop, III ........... G06Q 50/16 705/323 |
| 2009/0076888 A1* | 3/2009 | Oster et al. ..................... 705/10 |
| 2009/0144097 A1 | 6/2009 | Fassio et al. |
| 2009/0187464 A1 | 7/2009 | Bai et al. |
| 2010/0094548 A1 | 4/2010 | Tadman et al. |
| 2012/0078678 A1 | 3/2012 | Pradhan et al. |

OTHER PUBLICATIONS

"Store Location and Store Assessment Research", by R. L. Davies, University of Newcastle, Newcastle Upon Tyne, UK, and D. S. Rogers, D.S.R. Marketing Systems Inc., Deerfield, Illinois, USA, 1991.

"Store Location: Choosing the Right Site", by Sophie Bowlby et al., Retail & Distribution Managementk, Jan./Feb. 1985.

"Techniques for Locating Retail Outlets", by Terry G. Meyer, Real Estate Issues; Spring/Summer 1988; 13, I; ABI/INFORM Global; p. 25.

* cited by examiner

GEOSPATIAL DATA ANALYSIS

PRIORITY CLAIM

This application claims the benefit of U.S. Provisional Patent Application Ser. No. 61/552,373 entitled "Geospatial Data Analysis," filed on Oct. 27, 2011 and incorporated herein by reference in its entirety.

RELATED CASES

This application is related to commonly owned and concurrently filed U.S. application Ser. No. 13/663,343 and U.S. application Ser. No. 13/663,348, which are incorporated herein by reference in their entireties.

BACKGROUND

The planning and placement of retail units requires a great deal of effort and due diligence. Companies must determine how many retail units to place in different markets as well as where specific retail units should be placed. Further, companies must select and evaluate potential sites for retail unit placement while considering, for example, access, parking, lease terms, etc. Once retail units are placed and operational, companies will also often track the revenue and profitability of existing retail units and/or competitor locations. There is a need for systems and methods to utilize geospatial data analysis to assist in the placement and analysis of retail units.

FIGURES

The patent or application file contains at least one drawing executed in color. Copies of this patent or patent application publication with color drawing(s) will be provided by the Office upon request and payment of the necessary fee. Various embodiments are described herein by way of example in conjunction with the following figures, wherein.

DESCRIPTION

Figure 1:
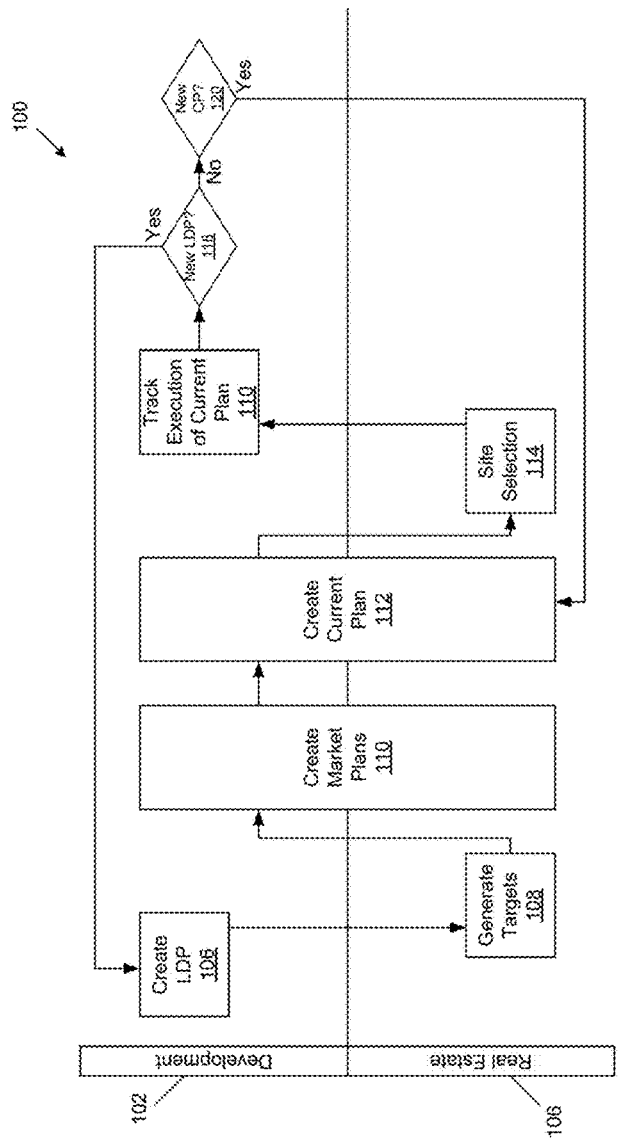
FIG. 1 is a flow chart showing one embodiment of a process flow that may be implemented to develop and execute retail unit planning and placement.

Various embodiments are directed to systems and methods for utilizing geospatial data to analyze existing and/or potential retail units. For example, the systems and methods described herein may be utilized to facilitate the planning, placement and/or analysis of retail units such as stores or other locations where retail or other goods are sold. Example geospatial data that may be utilized by the systems and methods described herein may include demographic data, sales data from existing retail units, etc. A unit planning system may comprise one or more computer systems programmed to receive and process geospatial data. The unit planning system may serve a graphical user interface for providing various data to and receiving various data from one or more users. Users may access the unit planning system, for example, directly and/or via one or more user devices, as described herein below. The unit planning system may be implemented by or on behalf of a company or other business unit that manages retail units, referred to herein as the implementing company. In some embodiments, the unit planning system is provided by a third party service, for example, as a cloud or Software as a Service (SaaS) solution, and provided to the implementing company and/or to users thereof.

In various embodiments, the unit planning system may be built to include and/or work in conjunction with a Geographic Information System or GIS, that may be executed by one or more servers or other suitable computer systems. Any suitable GIS may be used including, for example, GIS's available from ORACLE, ESRI, MAPINFO, etc. An example GIS system from ORACLE may be the ORACLE MAP VIEWER (e.g., utilizing DATABASE 11G and/or SPATIAL for DATABASE 11G).

In some example embodiments, the unit planning system is programmed to provide a graphical user interface to one or more user devices associated with users of the system. The graphical user interface may provide the user devices with functionality for receiving graphical, geospatial data describing geographic areas, existing retail units, target areas for potential retail units, and sites for potential retail units. In conjunction with the graphical user interface and/or independent from it, the unit planning system may also be programmed to collect, calculate and organize data related to target geographic areas for placement of retail units as well as potential sites for placements of retail units.

Also, in some example embodiments, the unit planning system is programmed to perform revenue forecasting, cannibalization forecasting and market optimization. The market optimization may comprise creating a market scenario having one or more seed points. One or more optimization parameters may be received by the system. A market optimization logic is applied to the one or more seed points to identify an optimal number and distribution of seed points. In various example embodiments, the market optimization may be implemented as an iterative process that proceeds until a predetermined number of seed points are identified. Performing the market optimization may also comprise generating revenue forecasts and cannibalization forecasts, as described herein.

Further, in some example embodiments, the unit planning system is configured to provide a pro forma functionality, for example, via the graphical user interface. The pro forma feature may provide a statement indicating various data describing a potential site for placement of a retail unit and/or an existing retail unit. For example, the pro forma functionality may provide and/or aggregate revenue forecasts, capital forecasts, building/capital details, expense forecasts, forecasted remodels, etc. Forecasted values may be provided in a pro forma form that may additional comprise calculated values for the net present value and/or internal rate of return for the site.

Before providing additional description of the functionality of geospatial data analysis performed by and/or with the unit planning system, a brief description is given of example processes for developing and executing retail unit planning and placement. FIG. 1 is a flow chart showing one embodiment of a process flow 100 that may be implemented to develop and execute retail unit planning and placement. The process flow 100 may be executed by a company or any other entity charged with planning and placing retail units. The process flow 100 comprises two rows 102, 104 indicating example actors that may perform the actions placed in the respective rows 102, 104. For example, actions placed in row 102 may be performed by an individual or team implementing a development function of the company. Actions placed in row 104 may be performed by an individual or team implementing a real estate development function for the company. Actions appearing in both rows 102, 104 may be jointly performed by the development and real estate functions. It will be appreciated that the division of process flow 100 between development and real estate functions is provided for purposes of example only. In practice, some or all of the actions in the process flow 100 may be performed by functions other than those indicated.

At 106, the development function may generate a long-range development plan (LDP). The long-range development plan may specify a number of planned retail units by market and by year. Long-range development plans may cover any suitable time period, and often cover between three and five years. At 108, the real estate development function may generate targets to implement the long-range development plan. Targets may represent specific geographic areas (e.g., target geographic areas) for placement of retail units. At 110, the real estate and development functions may jointly generate market plans (e.g., one market plan for each market covered by the long-range development plan). A market plan may comprise a map that shows the targets projected to open in the relevant market during the time period of the long-range development plan. The map may also indicate planned retail units, existing retail units and competitor units. At 112, the real estate and development functions may generate a current plan. The current plan may indicate retail units, represented as targets, which are to be opened within a sub-unit of the long range development plan period. For example, if the long range development plan period is three to five years, then current plan may indicate units to be opened within twelve to eighteen months.

At 114, the real estate function may select sites at which a target retail unit may be realized. Sites may be physical locations where a retail unit may be potentially opened. Sites may be determined, for example, based on the type of retail unit to be placed. For example, sites for retail units of a large department store such as MACY'S may be limited primarily to large shopping malls. On the other hand, sites for retail units of convenience stores, such as 7-ELEVEN may be any property at a suitably busy intersection. At 116, the development function may track the execution of the current plan, which may include the selection of sites identified at 114 as well as the execution of retail unit openings and operation. If at 118, the period of the long-range plan has expired or is nearing expiration, the development function may generate a new long-range plan at 106. If at 120, the period of the current plan has expired or is near expiration, then a new current plan may be generated at 112.

Figure 2:
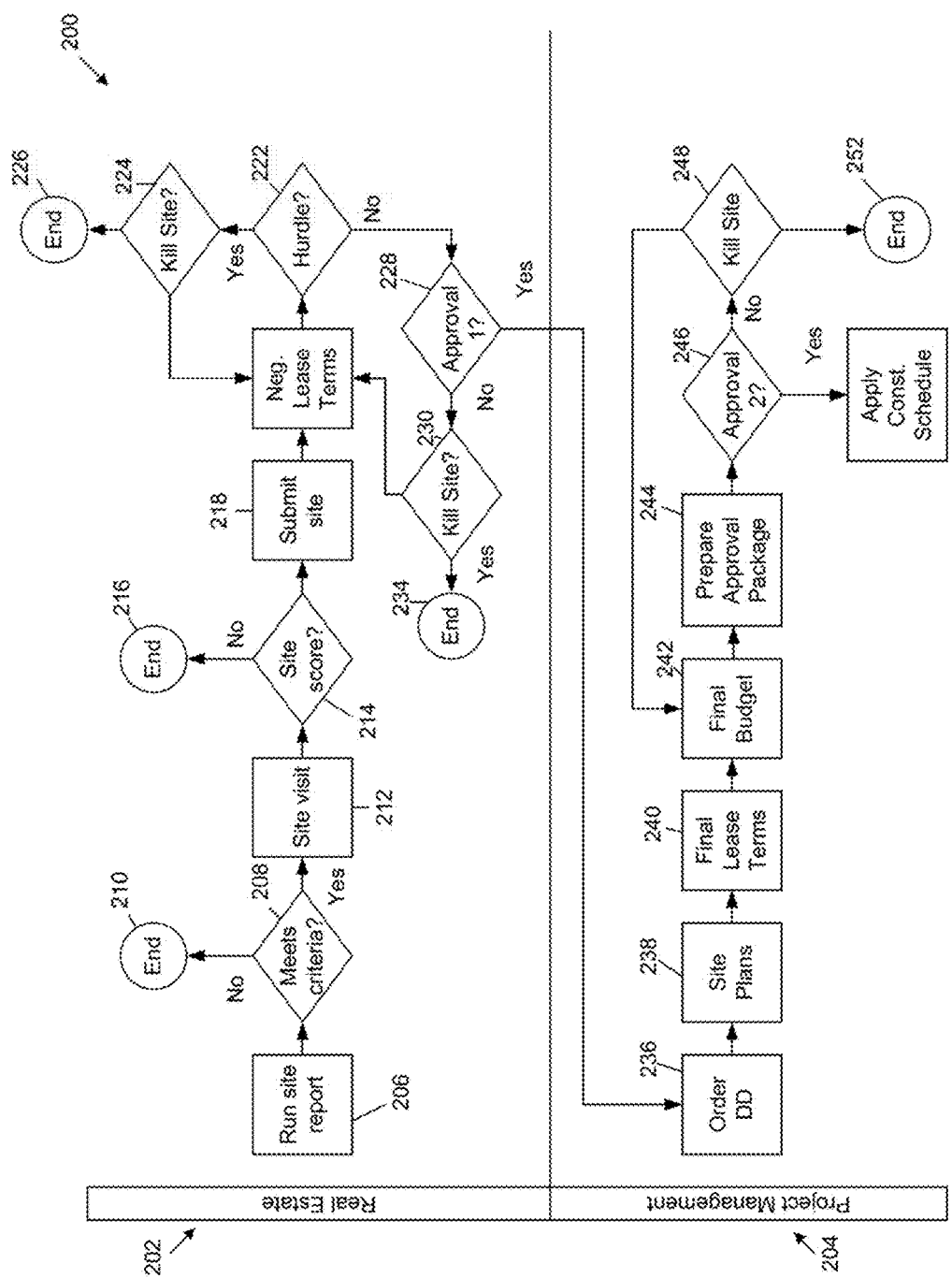
FIG. 2 is a flow chart showing one embodiment of a process flow that may be implemented to approve a potential site for placement of a retail unit.

FIG. 2 is a flow chart showing one embodiment of a process flow 200 that may be implemented to approve a potential site for placement of a retail unit. In various embodiments, the process flow 200 is executed for one or more potential sites associated with a target. When more than one site is associated with a target, the process flow 200 may be executed in series or parallel. For example, if the process flow 200 fails with respect to a first site, it may be performed again for a second site. In some embodiments, the process flow 200 may be executed for multiple sites in parallel so as to increase the likelihood of at least one of the sites being successful.

The process flow 200, like the process flow 100, may be implemented by a company or any other entity charged with planning and placing retail units. In some embodiments, the process flow 200 is implemented by a real estate function and a project management function of the company. For example, actions appearing in row 202 may be executed by the real estate function while actions appearing in row 204 may be executed by the project management function. At 206, the real estate function may generate a site report. The site report may include demographic data describing an area around the site. The area around the site may be and/or contain any suitable type of area including, for example, a region, a trade area, a census block, a mini-market, a designated market area (DMA), etc. The site report may be generated, at least in part, utilizing functionality of the unit planning system described in more detail below. At 208, the real estate function may determine whether the site report meets a set of threshold criteria. The threshold criteria may describe minimum values for demographic variables that tend to indicate that the site will support a successful retail unit. For example, the threshold criteria may include a minimum per captia income, a minimum number of households having an income above a threshold value, a minimum number of households having particular purchasing preferences, daytime population attributes, etc. If the site does not meet the threshold criteria, then consideration of the site may end at 210.

At 212, the real estate function may facilitate a visit to the site, for example, by real estate personnel. The personnel making the visit may assign the site a site score based on the quantification of certain values. For example, the personnel visiting the site may fill out a questionnaire rating the site based on, for example, the identity of co-tenants, other business generators around the site, visibility, access, parking, etc. The questionnaire, in some embodiments, is an electronic questionnaire provided to a mobile user device associated with the personnel. In some embodiments, the questionnaire is provided as part of a user interface generated by the unit planning system. Ratings based on a number of site qualities may be aggregated into a single site score. If the site score fails to meet a threshold value at 214, then consideration of the site may end at 216. If the site score does meet the threshold value, then the site may be submitted to the unit planning system at 218. Submitting the site may involve transmitting and/or saving data previously gathered and/or aggregated to the unit planning system.

At 220, the real estate function may begin to negotiate lease terms with the landlord associated with the site. In some embodiments, a legal function of the company is involved in the lease negotiations. In some embodiments, the real estate function may also prepare a preliminary budget for a retail unit at the site in view of the negotiated lease terms. At 222, the real estate function may determine whether the site, in view of the negotiated lease terms, has any further hurdles to clear to become a viable retail unit. A hurdle may be, for example, a problem with profitability in view of lease terms, projected revenue, etc. If a hurdle exists, the real estate function may determine whether to kill the site at 224. For example, the site may be killed if the hurdle is not likely to be resolved. If the site is to be killed, consideration of the site may end at 226. If the site is not to be killed, the real estate function may return to 220 and attempt to modify the negotiated lease terms and/or budgeting items in order to resolve the hurdle.

When there is no hurdle (or after a previous hurdle has been resolved) the real estate function may submit the site for management approval at 228. In some embodiments, various documents and/or data making up the submission at 228 may be generated by the unit planning system, as described herein below. Management approval may be provided by any suitable management function of the company, for example, based on company organization. If management approval is withheld, management and/or the real estate function may determine whether to kill the site at 230. If the site is killed, further consideration may end at 234. If the site is not killed, the real estate function may return to 220 to re-negotiate lease terms and/or rework the site budget.

If management approval is granted at 228, then responsibility for the site may be transferred to a project management function. At 236, the project management function may order due diligence for the site. Due diligence may involve, for example, verifying that the site is suitable for the desired use. For example, if the retail unit is to be a gas station, certain environmental studies may be required to determine whether a gas tank may be buried at the site. Also, for example, if the retail unit requires a liquor license, due diligence may be required to determine whether a liquor license is available and what procedure is necessary to obtain one. At 238, the project management function may order preliminary site plans for the site. The preliminary site plans may include, for example, architectural and design plans for construction and/or remodeling of the site. At 240, the project management function may negotiate final lease terms with the landlord, and may prepare a final budget at 242. A final site approval package may be generated at 244. As described herein below, the unit planning system may comprise functionality for aiding in the preparation of the final site approval package. At 246, the final site approval package may be submitted for approval by the management function. If the site is approved, construction may begin at 250. If the site is not approved, management and/or the project management function may determine whether to kill the site. If the site is to be killed, further consideration may cease at 252. If the site is not to be killed, modifications may be made to the final budget at 242 to address any issues that may have prevented approval.

Figure 3:
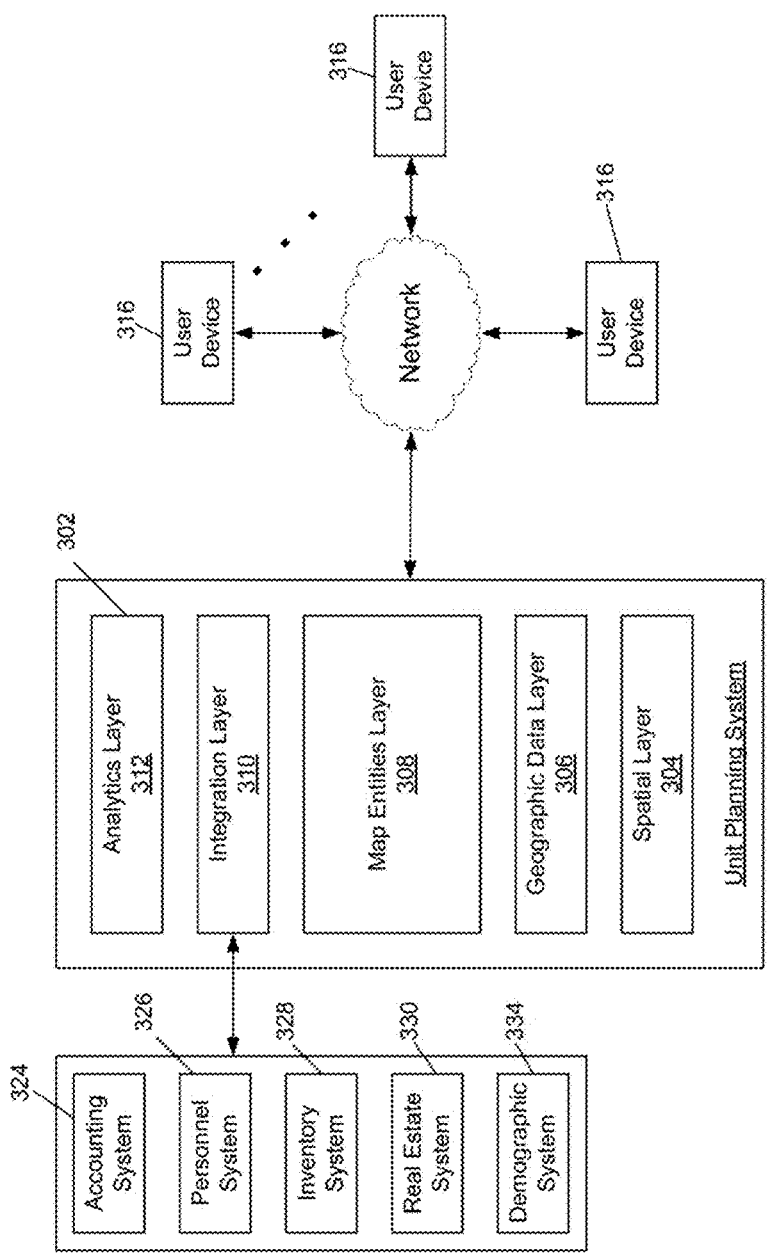
FIG. 3 is a block diagram showing one embodiment of an environment comprising a unit planning system.

FIG. 3 is a block diagram showing one embodiment of an environment 300 comprising a unit planning system 302. The unit planning system 302 is in communication with various user devices 316 via a network 314. The network 314 may be any suitable type of wired and/or wireless network and may include, for example, the Internet. The user devices 316 may be any suitable type of network-enabled computer devices including, for example, desktop computers, laptop computers, tablet computers, mobile devices, etc. Although the functionality of the unit planning system 302 is depicted separate from the user devices 316, in some embodiments, the functionality and data storage functions of the unit planning system 302 may be implemented directly on the various user devices 316. The user devices 316 may be utilized by users to access the functionality of the unit planning system 302. The users, for example, may be employees or other personnel of the implementing company, including personnel in a variety of different roles, as described herein.

The unit planning system 302 is illustrated in FIG. 3 as a diagram illustrating different functional layers. A spatial layer 304 may represent a database and/or database functionality for storing data of a geospatial nature. Geospatial data may include any data that includes a geographic reference and/or requires the storing of spatial geometry. Examples of geographic reference data may include street or address data, latitude and longitudes, etc. In some embodiments, the spatial layer 304 may be implemented utilizing a commercially-available Geographic Information System or GIS such as, for example, GIS's available from ORACLE, ESRI, MAPINFO, etc. An example GIS system from ORACLE may be the SITE HUB (e.g., utilizing DATABASE 11G and/or SPATIAL for DATABASE 11G).

A geographic data layer 306 may store boundaries of geographic units such as, borders or boundaries of regions, trade areas, census blocks, mini-markets, designated market areas (DMA's), etc. A Map entities layer 308 may represent entities placed within geographic areas and related data. Examples of entities may include existing retail units, existing and/or planned competitor retail units, targets, sites, etc. An integration layer 310 may integrate the unit planning system 302 with various other systems including data systems such as publicly-available data sources as well as internal sources associated with the company implementing and/or utilizing the unit planning system 302. For example, an accounting system 324 may provide the unit planning system 302 with various data describing existing company retail units including, for example, revenue, EBITDA or other measures of profitability, etc. A personnel system 326 may provide the unit planning system 302 with various data describing company personnel including, for example, salaries, staffing, employee hours, etc. An inventory system 328 may provide the unit planning system 302 with various data describing company inventory including, for example, inventory stored at central warehouse locations as well as inventory stored at retail units. A real estate system 330 may provide the unit planning system 102 with various data describing real estate arrangements for other retail units of the company including, for example, lease terms, mortgage terms, property taxes, etc. A customer relationship management (CRM) system 332 may provide the unit planning system 302 with various data describing customers of other retail units of the company including, for example, purchase histories, residences, etc. A demographic system 334 may be publicly available and may provide the unit planning system 102 with data describing the demographic make-up of various geographic areas. Demographic data provided by the demographic system may comprise, privately collected data as well as publicly (e.g., government) collected data such as, for example, census results.

Figure 4:
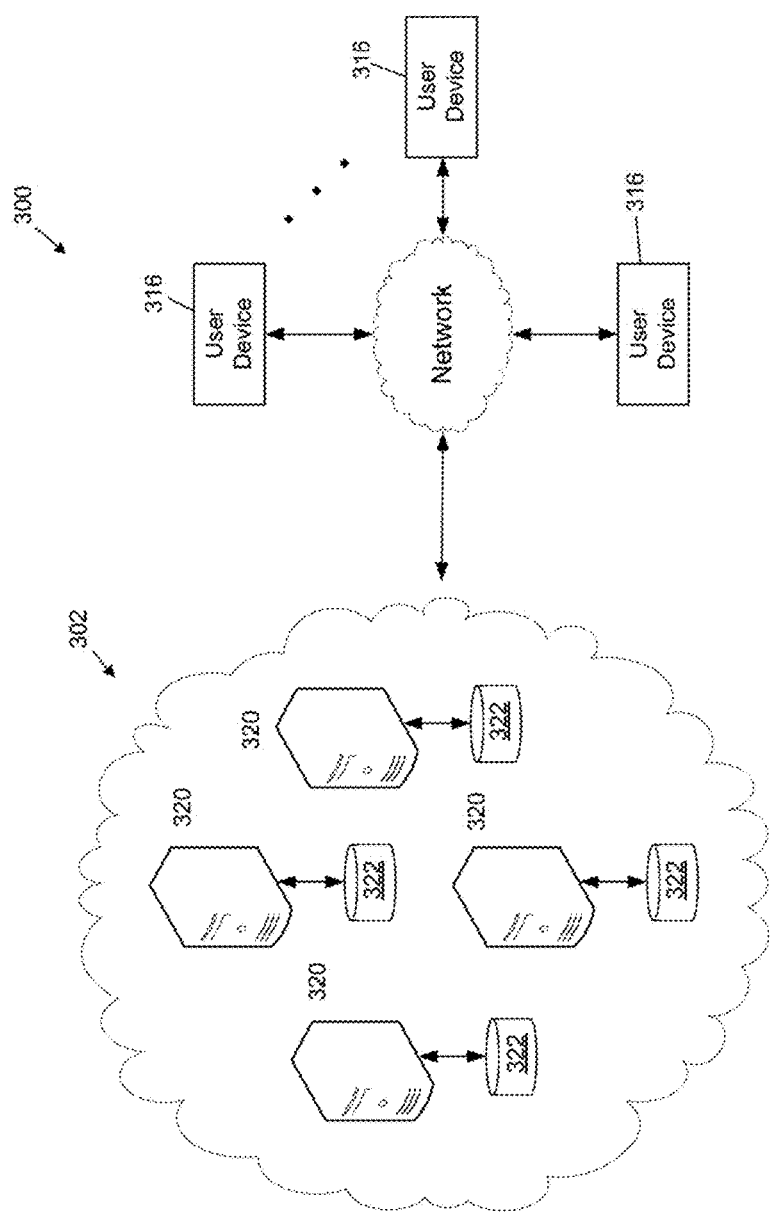
FIG. 4 is a block diagram showing one embodiment of the environment showing the unit planning system implemented as a cloud or Software as a Service (SaaS) service.

Referring back to the unit planning system 302, an analytics layer 312 may perform various modeling and calculations as well as provide a graphical user interface to the user devices 316. Additional details of the functionality of the analytics layer 312 are provided herein. It will be appreciated that the unit planning system 302 may be physically implemented in any suitable configuration. For example, in some embodiments, the unit planning system 302 may be implemented by a server or servers at a single physical location. Also, in some embodiments, the unit planning system 302 may be implemented as a cloud service or as a Software as a Service (SaaS) solution. FIG. 4 is a block diagram showing one embodiment of the environment 300 showing the unit planning system 302 implemented as a cloud or SaaS service. The system 302 is implemented across multiple servers 320 in communication with various databases or other data stores 322. The various servers 320 are in communication with one another via a network, such as the Internet and, in some embodiments, may be in communication with one another via the network 314.

Figure 5:
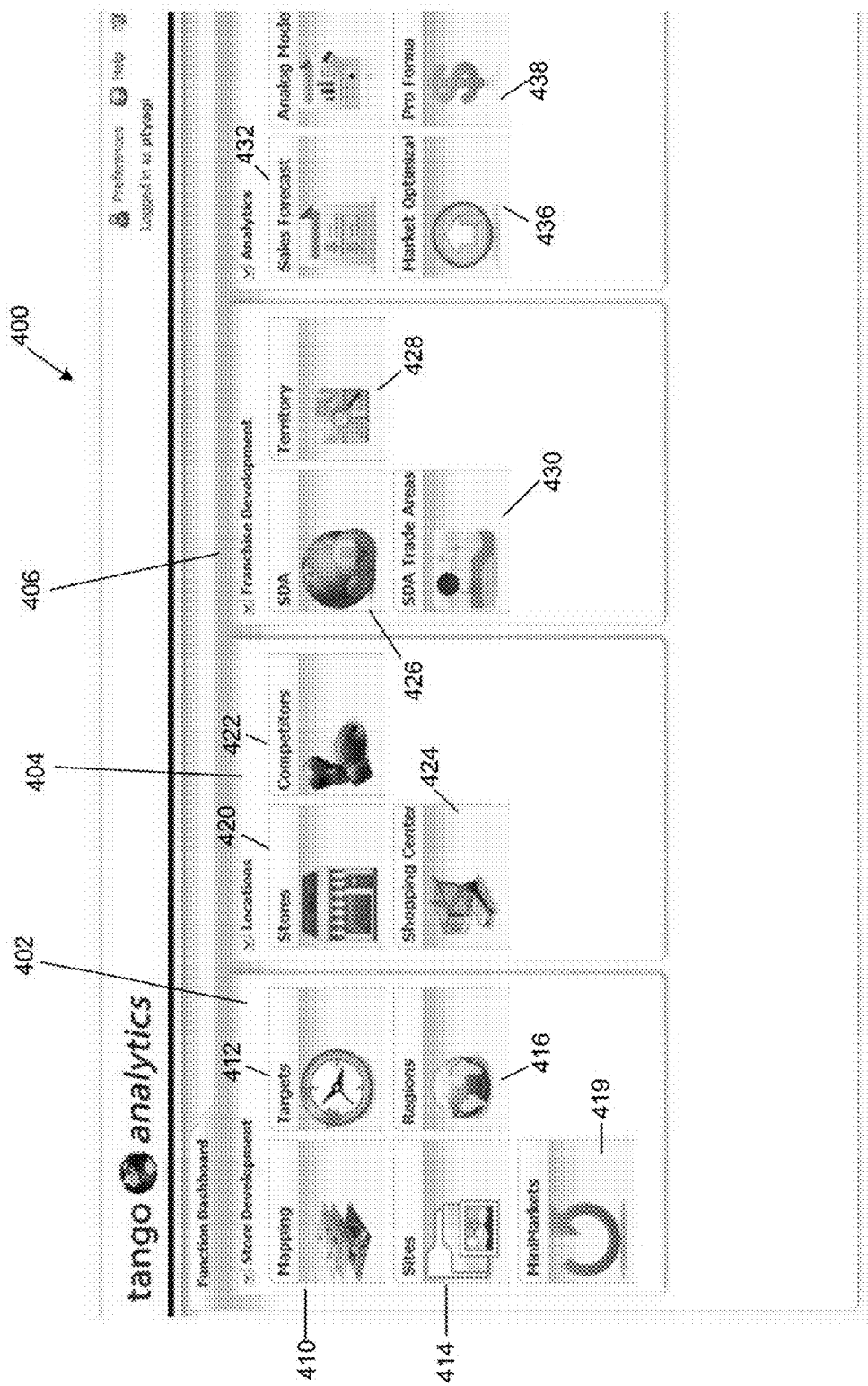
FIG. 5 is a screen shot showing one embodiment of a menu screen that may be part of the graphical user interface provided by the unit planning system of FIG. 3.

The unit planning system 302, and in particular the analytics layer 312 thereof, may be programmed to provide a graphical user interface to one or more of the user devices 316. The graphical user interface may provide the user devices 316 (and users thereof) with access to the various functionalities of the unit planning system 302. FIG. 5 is a screen shot showing one embodiment of a menu screen 400 that may be part of the graphical user interface provided by the unit planning system 302. The menu screen 400 may provide links to other screens for allowing the user devices 316 (and users thereof) to access specific functionalities of the unit planning system 302. A store development field 402 comprises various buttons linking to unit planning system 302 functionalities related to the development and implementation of market plans for opening new retail units. A Locations field 404 comprises various buttons linking to unit planning system functionalities related to existing locations (e.g., stores or other retail units, competitors, shopping centers, etc.). A Franchise Development field 406 comprises various buttons linking to unit planning system 302 functionality for monitoring the operations of franchises. An Analytics field 408 comprises various buttons linking to unit planning system 302 functionality for performing various analytical analyses of market areas, targets, sites, etc.

Figure 6:
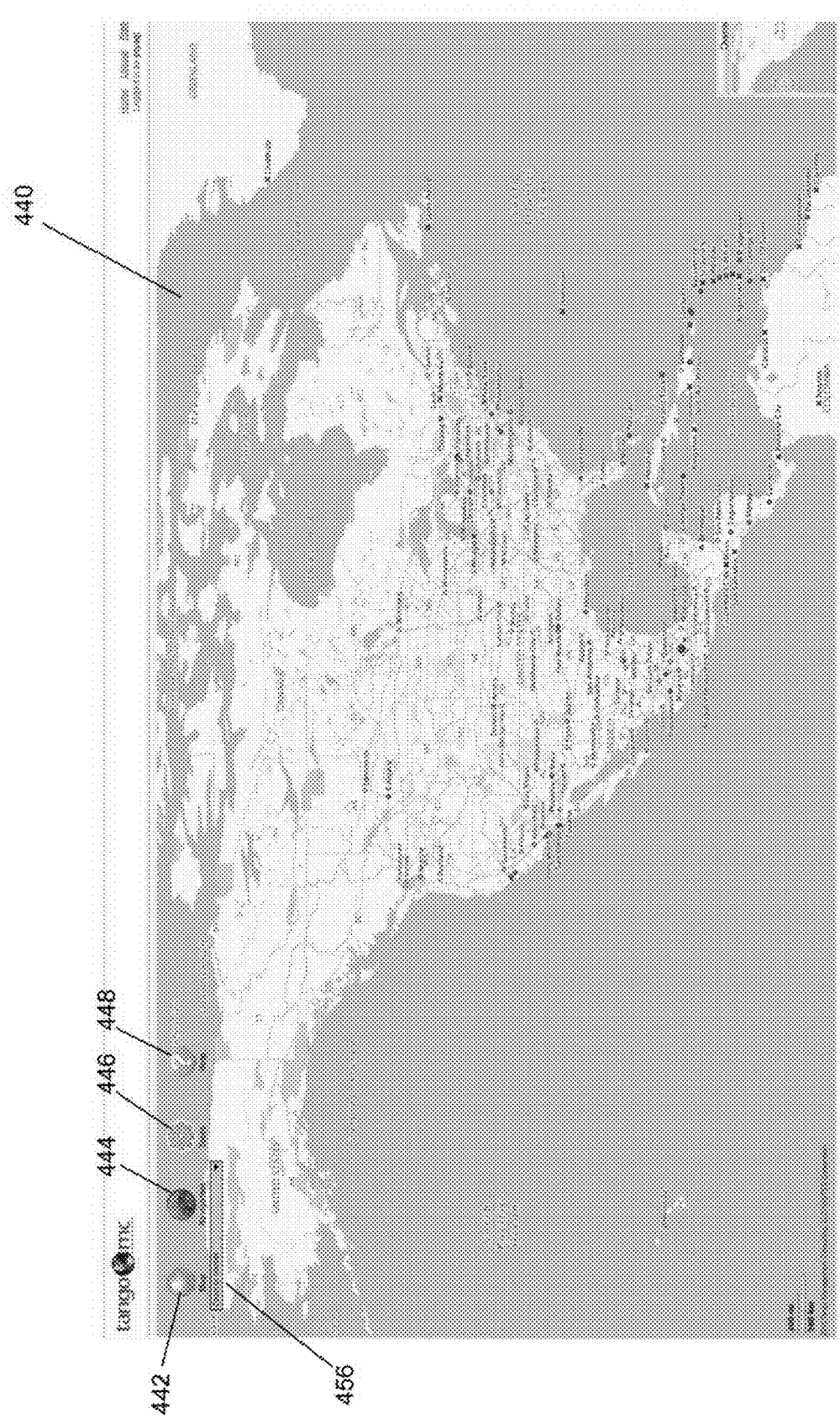
FIG. 6 is a screen shot showing one embodiment of a mapping screen that may be part of the graphical user interface provided by the unit planning system.

Referring specifically to the Store Development field 412, a mapping button 410 may provide users with access to various mapping functionalities of the unit planning system 302. FIG. 6 is a screen shot showing one embodiment of a mapping screen 440 that may be part of the graphical user interface provided by the unit planning system 302. The mapping screen 440 may be displayed, for example, upon selection of the mapping button 410 of the menu screen 400. The mapping screen 440 may initially show a geographic region (North America in FIG. 6). A navigation button 444 may provide functionality allowing the user to navigate the map by panning and/or zooming. For example, selection of the navigation button 444 may cause the mapping screen 440 to display a Zoom to Market menu 456. When selected, the Zoom to Market menu 456 may display a list of selected geographic areas (e.g., markets, trade areas, regions, census blocks or other geographies, designated market areas (DMA's), etc.). Upon selection of a geographic area, the mapping screen 440 may be zoomed to show the selected area. A Tools button 446, when selected by the user, may provide access to other functionality of the unit planning system 302, such as functionality related to target geographic areas and potential sites described herein below with respect to FIGS. 8, 9, 10 and 11. A Help button 448 may provide the user with access to a help feature for providing information about the user interface.

Figure 7:
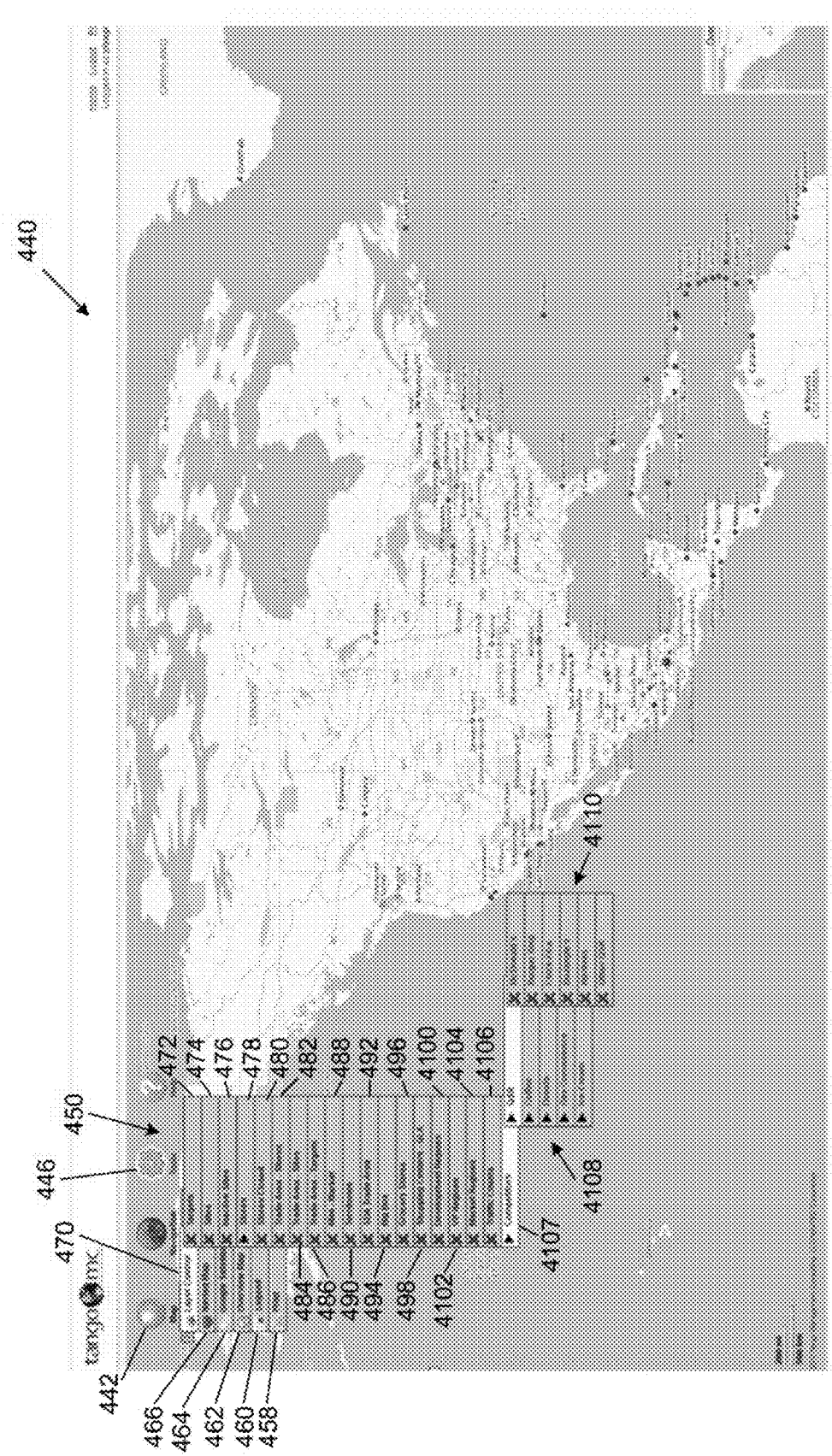
FIG. 7 is a screen shot showing one embodiment of the mapping screen of FIG. 6 with the Map button selected.

A Map button 442, when selected, may provide the user with access to additional functionality of the unit planning system 302. For example, FIG. 7 is a screen shot showing one embodiment of the mapping screen 440 of FIG. 6 with the Map button 442 selected. Upon selection of the Map button 442, the mapping screen 440 may display a map menu 450. A first layer of the map menu may comprise a Print button 458, a Legend button 460, an Overview Map button 462, a GOOGLE Satellite button 462, a NAVTEQ Map button 466 and a Layer Control button 470. Selection of the Print button 458 may cause the unit planning system 302 to deliver the current contents of the mapping screen 440 to a printer (e.g., a printer associated with the user's user device 316). The Legend button 460 may toggle a legend on the mapping screen 440. The legend may indicate, for example, a current configuration of the mapping screen 440 including an indication of data displayed thereon. An Overview Map button 462 may allow the user to toggle off or on the default map displayed at the mapping screen 440 (e.g., the map shown in FIG. 7). The GOOGLE Satellite button 462 and the NAVTEQ Map button 466 may both provide the user with functionality to toggle on or off additional maps available from various sources. Although GOOGLE and NAVTEQ are the provided examples, it will be appreciated that maps from any suitable source may be used. Maps from GOOGLE, NAVTEQ or other sources may be received by the unit planning system 302, for example, via the integration layer 310.

The Layer Control button 470 may provide an additional menu 450 to allow the user to select geospatial units and/or geospatial areas to be displayed on the mapping screen 440. Selection of the various buttons of the additional menu 450 may cause the unit planning system 302 to populate the mapping screen 440 with the indicated geospatial units and/or areas. In some embodiments, the geospatial units and/or areas may be populated over the current geographic area displayed by the mapping screen 440. For example, the mapping screen 440, as shown in FIG. 7, illustrates the whole of North America. Accordingly, selection of an item from the menu 450 may cause the indicated geospatial unit or area to be populated across the entirety of North America. When the mapping screen 440 shows a different geographic area (e.g., a city, a region, etc.), then selected geospatial units and/or areas may be populated only on the displayed geographic area.

The additional menu 450 comprises a Targets button 472 that, when selected, may cause the unit planning system 302 to populate the mapping screen 440 indicators for target geographic areas for placement of retail sites. The displayed target geographic areas may be targets otherwise stored at the unit planning system 302. The target geographic areas may be represented on the mapping screen 440 as markers, shaded or colored regions, etc. A Sites button 474, when selected, may cause the unit planning system 302 to populate the mapping screen 440 with potential sites for placement of a retail unit. The sites may be represented on the mapping screen 440 with any suitable type of marker. The displayed sites may also be sites otherwise stored at the unit planning system 302. An Inactive Sites button 476, when selected, may cause the unit planning system 302 to populate the mapping screen 440 with inactive sites. Inactive sites may be sites that were stored at the unit planning system 302, but have become inactive. Examples of inactive sites may include sites for which consideration was ended at 210, 216, 226 or 252 of the process flow 200 described herein above.

A Stores button 478, when selected, may cause the unit planning system 302 to populate the mapping screen 440 with existing stores or other retail units of the implementing company. The stores may be indicated by any suitable type of marker. A Stores Closed button 480, when selected, may cause the unit planning system 302 to populate the mapping screen 440 with stores of the implementing company that have closed within a threshold amount of time (e.g., in the past year, in the past two years, etc.). The threshold time, in some embodiments, is selected by the user. A Trade Area—Stores button 482 may cause the unit planning system 302 to populate the mapping screen 440 with indications of trade areas corresponding to stores of the implementing company (e.g., stores that may be displayed upon selection of the Stores button 478). A Trade Area—Sites button 484, when selected, may cause the unit planning system 302 to populate the mapping screen 440 with indications of trade areas corresponding to sites, such as the sites associated with the Sites button 474. A Trade Area—Targets button 484, when selected, may cause the unit planning system 302 to populate the mapping screen 440 with indications of trade areas corresponding to targets, such as the targets associated with the Targets button 472. A Mini-Market button 488, when selected, may cause the unit planning system 302 to populate the mapping screen 440 with indications of mini-markets. Mini-markets may represent any suitable geospatial subdivision and, in some embodiments, are associated with a contiguous market area.

A Territories button 486, when selected, may cause the unit planning system 302 to populate the mapping screen 440 with indications of territories. Territories may be, for example, any geospatial area and, in some embodiments, may be geospatial areas specific to the implementing company. For example, in some embodiments, territories may be geospatial subdivisions selected by the implementing company to subdivide its business. An SDA Trade Areas button 492, when selected, may cause the unit planning system 302 to populate the mapping screen 440 with indications of trade areas associated with a Strategic Development Area (SDA) of the implementing company. An SDA may be a geospatial area assigned to a franchisee of the implementing company. Buttons 494, 496 and 498 may, when selected, cause the unit planning system 302 to populate the mapping screen 440 with indications of geospatial locations that may tend to drive business. For example, Big Box button 494 may correspond to big box stores; Grocery Stores button 494 may correspond to grocery stores; and Shopping Centers button 498 may correspond to shopping centers. In some embodiments, the implementing company may consider locating retail units at or near these geospatial locations.

A Development Regions button 4100, when selected, may cause the unit planning system 302 to populate the mapping screen 440 with indications of development regions. Development regions may be geospatial areas relevant to the implementing company for any suitable region. For example, in some embodiments, development regions may correspond to geospatial areas where the implementing company intends to increase its number of retail units. A VP Regions button 4102, when selected, may cause the unit planning system 302 to populate the mapping screen 440 with indications of VP regions. Each VP region may correspond to the geospatial area of responsibility for one vice president or other suitable function at the implementing company. A Market Regions button 4104, when selected, may cause the unit planning system 302 to populate the mapping screen 440 with indications of market regions. A Traffic Counts button 4106, when selected, may cause the unit planning system 302 to populate the mapping screen 440 with indications of traffic counts at different locations on the screen 440. Traffic counts may be indicated in any suitable manner including, for example, as coloring, shading, dotting, etc.

A Competitors button 4107, when selected, may provide the user with options for plotting locations of retail units associated with competitors of the implementing company. For example, selection of the Competitors button 4107 may cause the screen 440 to further display a category menu 4108 providing the user with different categories of competitors. Upon selection of a category from the menu 4108, the user may be provided with competitor fields 4110 allowing the user to select a particular competitor or competitors. Upon selection of a competitor or competitors, the unit planning system 302 may populate the mapping screen with indications of retail units of the selected competitor or competitors.

Figure 8:
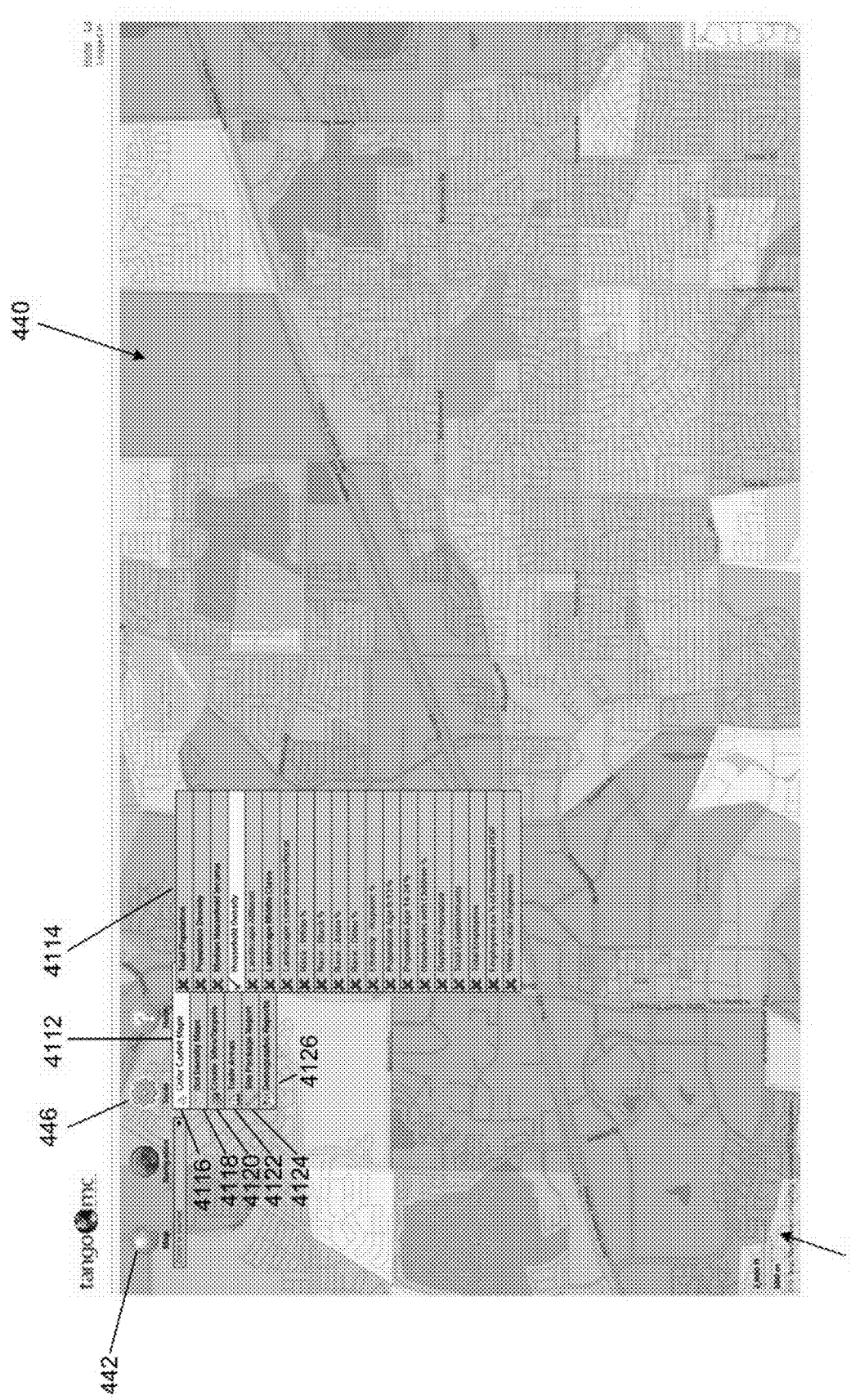
FIG. 8 is a screen shot showing one embodiment of the mapping screen of FIG. 6 with the Tools button selected.

FIG. 8 is a screen shot showing one embodiment of the mapping screen 440 of FIG. 6 with the Tools button 446 selected. At the outset, it is noted that the mapping screen 440, as illustrated in FIG. 8 and indicated by the legend 443, has been configured to display a geographic area showing only a few square miles. Selection of the Tools button 446 may cause a tools menu 4112 to be displayed on the screen 440. The tools menu 4112 may comprise buttons corresponding to additional functionalities of the unit planning system 302 that may be accessed through the mapping screen 440. A Color Coded Maps button 4116, when selected, may cause the unit planning system 302 to populate the mapping screen 440 with a color coded indication of a selected demographic variable. For example, upon selection of the Color Coded Maps button 4116, the screen 440 may display a Demographic variable field 4114, from which the user may select a demographic variable. Example demographic variables include, total population, population density, median household income, household density, landscape affluent, landscape middle class, landscape lower income/rural, the percentage of the population that is white, the percentage of the population that is black, the percentage of the population that is Asian, the percentage of the population that that has another race, the percentage of the population that is Hispanic, the percentage of the population that is between ages 0 and 13, the percentage of the population that is between ages 14-24, the percentage of households with children, the daytime population (e.g., considering commuters in and out), the total number of establishments, the total number of employees, the total number of employees as a percentage of the residential population, and the number of white collar employees. It will be appreciated that more or fewer demographic variables may be made available.

The unit planning system 302 may populate the mapping screen 440 with color-coded indications of the selected demographic variable in any suitable manner. For example, numerical values for the selected demographic variable may be obtained in any suitable manner. In some embodiments, demographic variable values are stored at the spatial layer 304 and/or the geographic data layer 306. In some embodiments demographic variable values may be received via the integration layer 310 from an external system such as, for example, the CRM system 332 and/or the demographic system 334. The unit planning system 302 may be programmed to correlate values for the demographic variable to particular geospatial points or areas to generate the color-coded map. For example, in FIG. 8, the household density variable is selected and values for household density at different areas and points on the displayed geographic area shown at the mapping field 440 by color.

A Dot Density Map button 4118, when selected, may cause the unit planning system 302 to populate the mapping screen 440 with dot densities indicating a selected demographic value. For example, the unit planning system 302 may populate the mapping screen 440 with dots such that the density of dots at any given area on the screen 440 corresponds to the value of the selected demographic variable at that area. The demographic variables plotted through the Dot Density Map button 4118, in some embodiments, are the same variables plotted through the Color Coded Map button 4116.

Figure 9:
FIG. 9 is a screen shot showing one embodiment of the mapping screen of FIG. 6 with the Tools button and the Create Sites/Targets button selected.

A Create Sites/Targets button 4118, when selected, may trigger functionality of the unit planning system 302 to create potential sites for placement of a retail unit and target geographic areas for placement of a retail unit. For example, FIG. 9 is a screen shot showing one embodiment of the mapping screen 440 of FIG. 6 with the Tools button 446 and the Create Sites/Targets button 4118 selected. As illustrated in FIG. 9, the map screen 440 shows a geographic area including the cities of Dallas and Fort Worth. Upon selection of the Create Sites/Targets button 4118, the user may select a point on the map screen 440, with the point corresponding to a geographic point. When the user selects, the point, the unit planning system 302 may display a Create field 4126 providing the user with an option to create a target or site at the selected geographic point. For example, the Create field 4126 may comprise a menu 4127 from which the user may select whether to create a site or a target at the selected geographic point.

Figure 10:
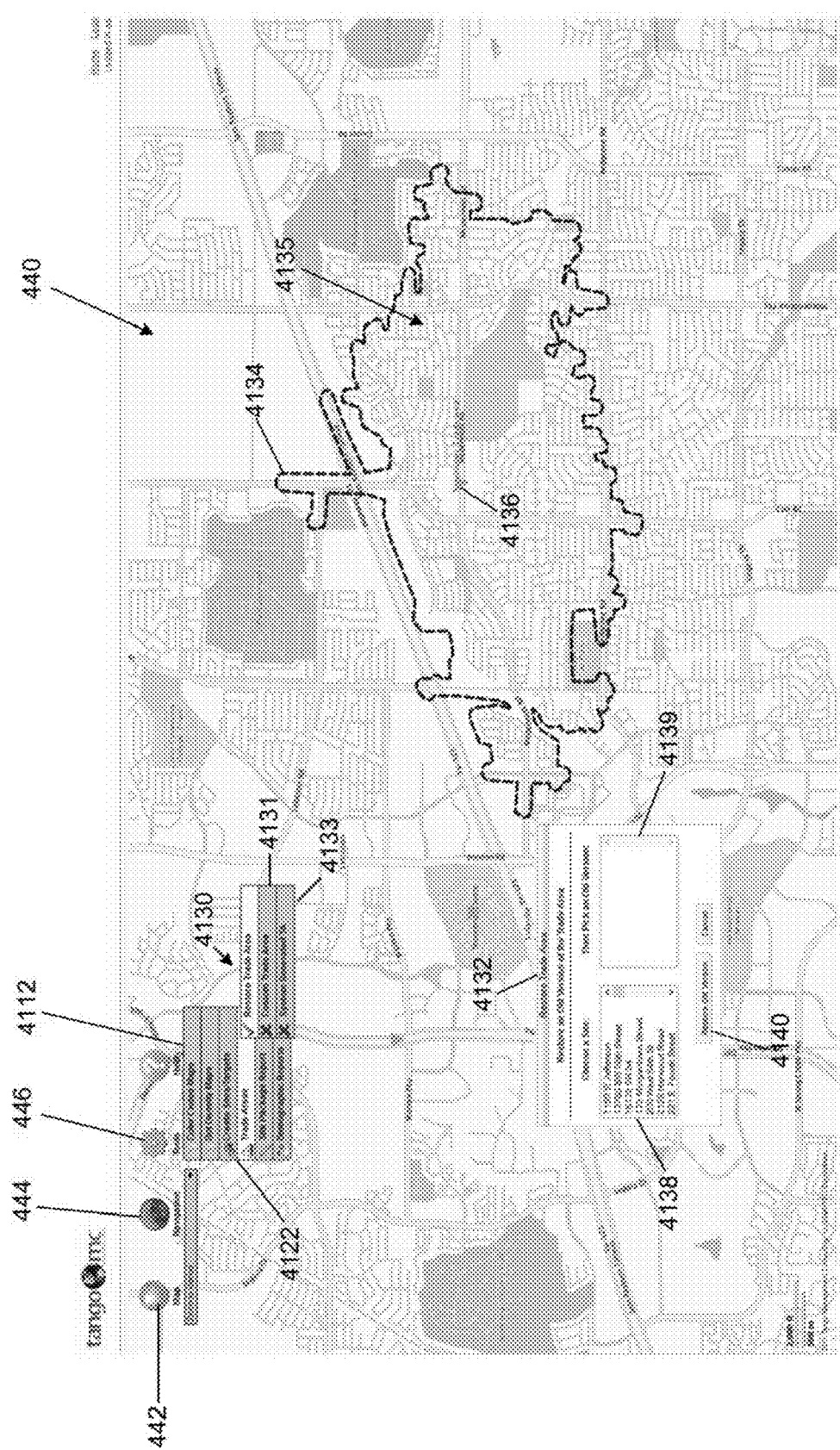
FIG. 10 is a screen shot showing one embodiment of the mapping screen of FIG. 6 with the Tools button and the Trade Areas button selected.

A Trade Areas button 4120, when selected, may trigger functionality of the unit planning system 302 for reviewing and manipulating trade areas. For example, FIG. 10 is a screen shot showing one embodiment of the mapping screen 440 of FIG. 6 with the Tools button 446 and the Trade Areas button 4120 selected. A trade area 4135 is indicated by a boundary 4134. Each trade area may be associated with a store or other retail unit, a site, a target, an SDA, etc. For example, the trade area 4135 shown in FIG. 10 is associated with a retail unit 4136. Trade areas may be determined in any suitable manner. For example, the user may select a System Generated TA button 4133 to cause the unit planning system 302 to generate a trade area based on predetermined criteria such as demographic characteristics, drive times, etc. In some embodiments, the criteria for generating the trade area may be provided by the user. A Custom Trade Area button 4131, when selected, may allow the user to create a trade area from scratch and/or modify an automatically generated trade area. For example, users may utilize a cursor to draw rings, polygons or other shapes defining trade area boundaries or modifying existing boundaries. A Restore Trade Area button 4130, when selected, may allow the user to restore a previous trade area or previous version of a trade area. For example, selecting the Restore Trade Area button 4130 may cause the unit planning system 302 to display on the mapping screen 440 a Restore Trade Area field 132. From a selection field 4138, the user may select a retail unit, target, site, etc. that has had multiple trade area versions.

Trade area versions associated with the selected retail unit, target, site, etc., may be displayed and selected from field 4139. Upon selection of the Restore Old Version button 4140, the unit planning system 302 may restore the trade area from the field 4139 to the selected retail unit, site or target from field 4138.

Figure 11:
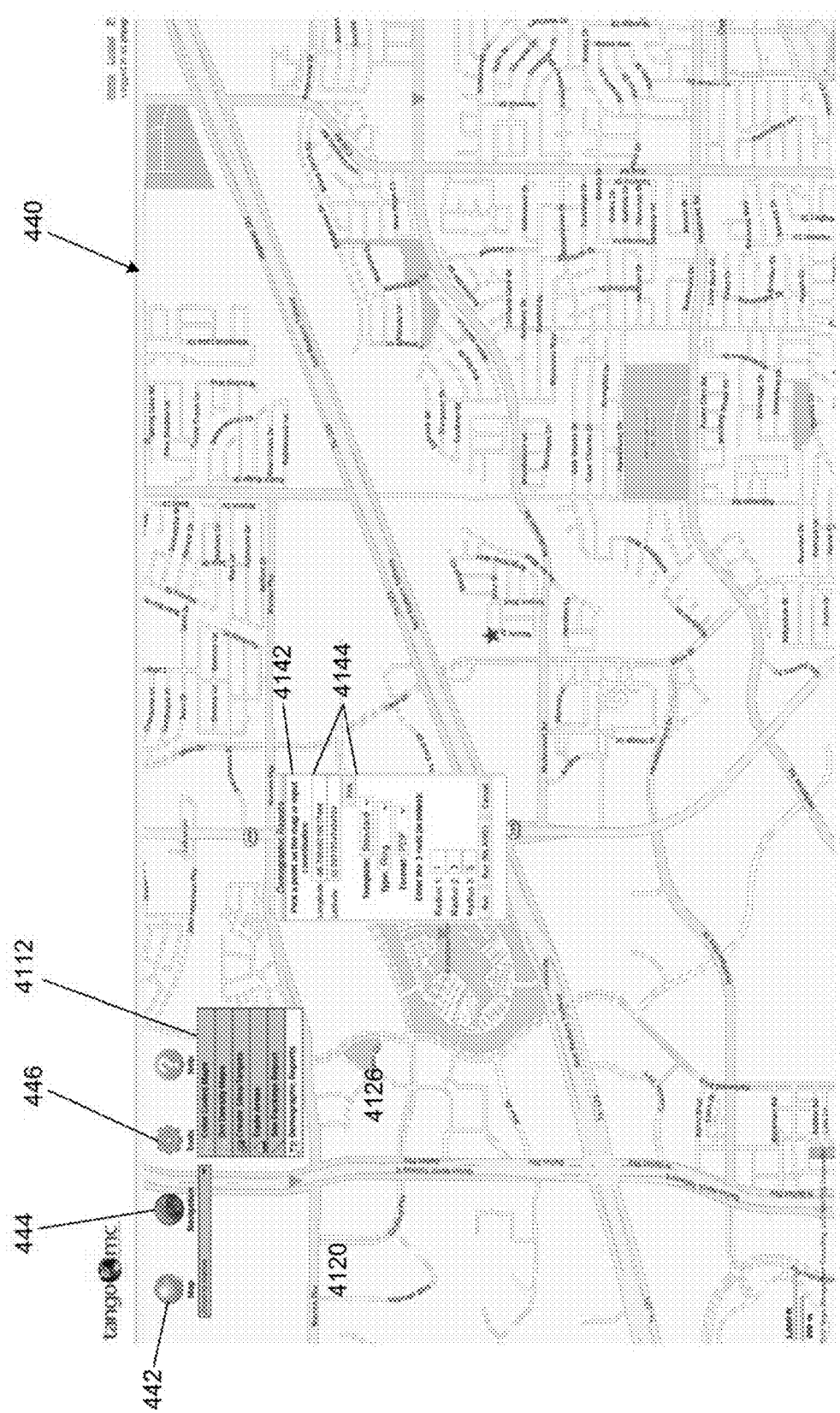
FIG. 11 is a screen shot showing one embodiment of the mapping screen of FIG. 6 with the Tools button and the Demographic Reports Button selected.

The tools menu 4112 may also comprise a Demographic Reports button 4126. FIG. 11 is a screen shot showing one embodiment of the mapping screen 440 of FIG. 6 with the Tools button 446 and the Demographic Reports Button 4126 selected. Upon selection, the Demographic Reports button 4126 may trigger functionality of the unit planning system 302 to for generating demographic reports. The generated demographic reports may be used in any suitable context. For example, the generated demographic reports may be utilized by the project management function as described above with respect to action 236 of the process flow 200. Demographic reports may also be used in conjunction with site approval, at 228, 224, and 246 of the process flow 200. In some embodiments, demographic reports may also be run by a development and/or real estate function of the implementing company to aid in the creation of long range development plans, market plants, current plans and/or in the selection of targets and sites, for example, as described with respect to the process flow 100.

Upon selection of the Demographic Reports button 4126, the unit planning system 302 may display on the mapping screen 440 a Demographic Reports field 4142. The Demographic Reports field 4142 may comprise a field 4144 for receiving a reference point for the report. The reference point may be indicated in any suitable manner. For example, the reference point may be indicated as a set of latitude and longitude coordinates. The reference point may also be indicated as matching an existing target, site, or retail location. Also, in some embodiments, the user may select the reference point from the geographic area displayed at the mapping screen 440. Upon selection of the reference point, the user may select a template, type and format of the demographic report. The template may indicate, for example, demographic variables and thresholds to be considered, etc. The type may indicate the bounds of the geographic area to be considered in the report. For example, in FIG. 11, the type is listed as a "ring." Additional information about the type is provided by the user in the form of a set of radii to be indicated. The radii may be expressed in distance from the reference point, drive time from the reference point, or any other suitable indicator. The format may describe the form of the final report. For example, in FIG. 11, the format is listed as PDF. Upon completion of the field 4144, the unit planning system 302 may generate the requested demographic report in any suitable manner. For example, numerical values for the selected demographic variable or variables may be obtained from the spatial layer 304 and/or the geographic data layer 306 of the system 302, from external systems such as, for example, the CRM system 332 and/or the demographic system 334, etc.

The Site Package Report button 4124, when selected, may trigger functionality of the unit planning system 302 for generating a site package report for a site. The site package report, for example, may serve as the approval package referenced at 244 of the process flow 200 described herein above. For example, the sited package report may comprise maps, demographic reports, text and comments, revenue forecasts, demographic reports, etc. describing a potential site. Constituent units of the site package report may be in any suitable file format including, for example, word processing documents, spreadsheet documents, etc. In some embodiments, the site package report comprises data across different location data layers such as sites, stores, competitors or any of the other layers of the field 450 described above. The site package report may also comprise demographic data, such as the demographic reports described above, which may be prepared across multiple radii measured in distance and/or drive times. The site package report may also comprise additional map content, comments and other user-defined content, etc.

The unit planning system 302 may be programmed to collect all of the constituent components of the site package report into a single conglomeration accessible from a single location. In some embodiments, the site package report is compiled into a single document, such as a Portable Document Format (PDF) document.

Figure 12:
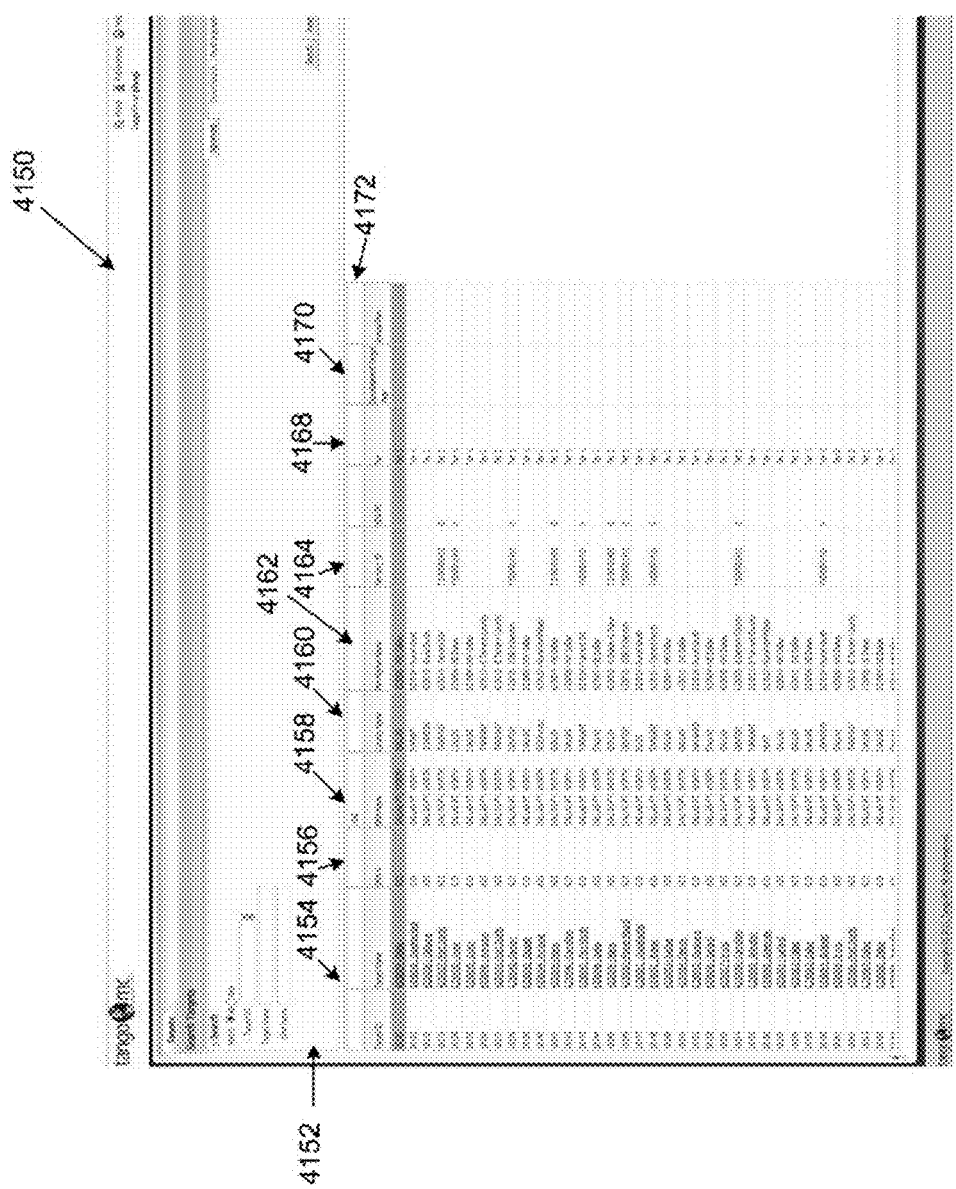
FIG. 12 is a screen shot showing one embodiment of the target summary screen.

Referring now back to the menu screen 400 shown in FIG. 5, other buttons in the Store Development field 402 may provide additional functionality. Regions button 416 and Mini-Market button 418 may launch the mapping screen 440 described herein above, albeit pre-configured to show a geographic area corresponding to a selected region or mini-market. Targets button 412, when selected, may trigger additional functionality of the unit planning system 302 for the generation and consideration of target geographic areas for placement of retail units (e.g., targets). For example, selection of the Targets button 412 may cause the unit planning system 302 to launch a target summary screen. FIG. 12 is a screen shot showing one embodiment of the target summary screen 4150. The screen 4150 may comprise a listing of information regarding previously-generated targets. It will be appreciated that targets may be generated in any suitable manner. For example, targets may be generated via the mapping screen 440 as described herein above with respect to FIG. 9. Also, for example, targets may be generated via optimization, as described herein with respect to FIGS. 25-34.

At screen 4150, targets are listed in tabular form with various descriptive data. A Target ID column 4152 lists an identification number for each target. A Target Name column 4154 lists a name for each target. A DMA # column 4156 lists a Designated Market Area (DMA) associated with each target. A DMA Name column 4158 may indicate a name of the DMA associated with the target. The DMA, for example, may indicate a franchise area associated with the target. A County Name column 4160 may indicate a county or other political subdivision in which the target is located. A Mini-Market column 4162 may indicate a mini-market associated with the target. A Territory ID column 4164 may indicate a territory associated with the target. A Tier column 4168 may indicate a territory associated with the target. A Development Target Year column 4170 may indicate a year in which the target is estimated to result in an open retail unit. An Annual Plan column 4172 may indicate an annual plan year during which the target is estimated to result in an open retail unit.

Figure 13:
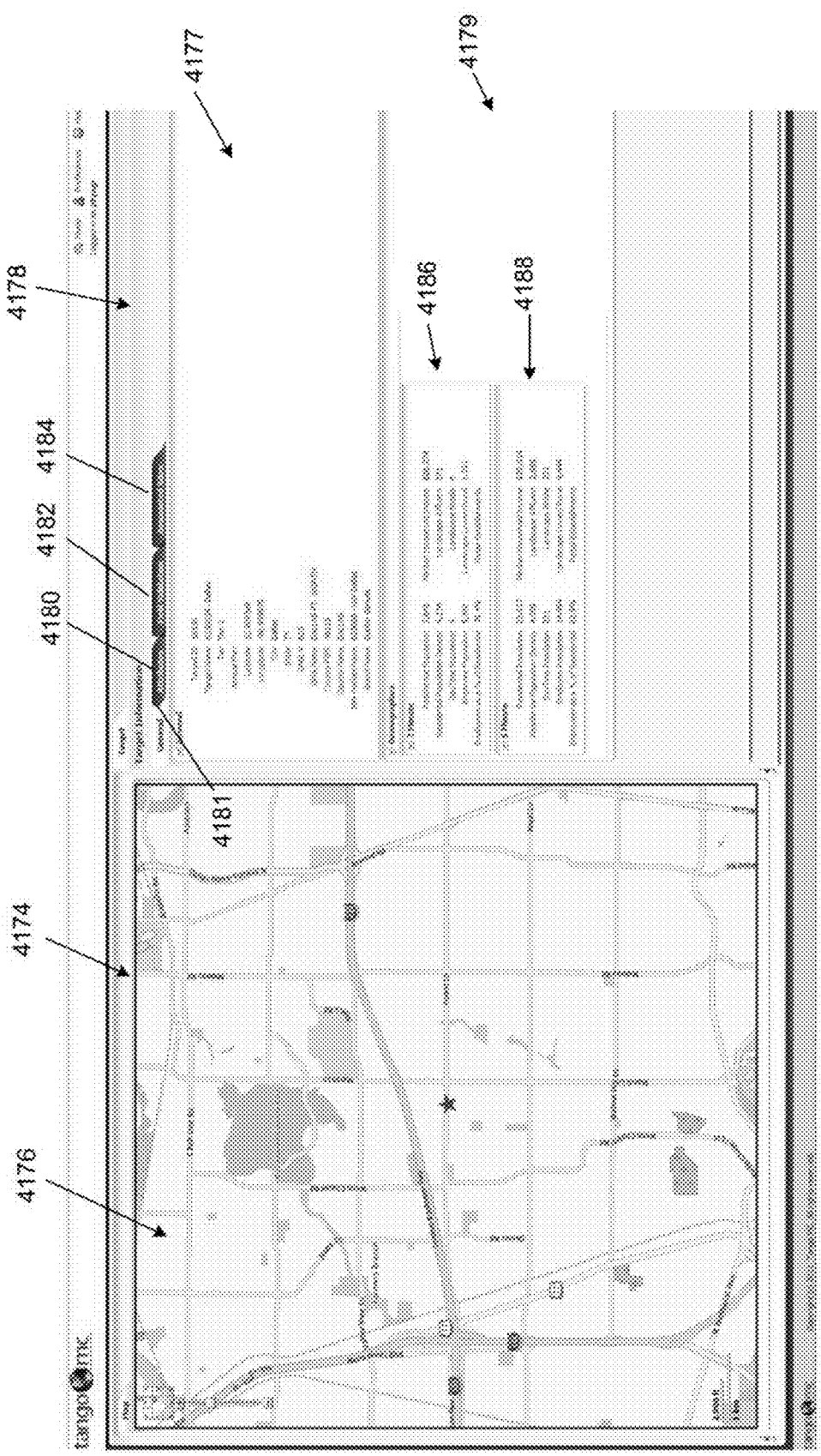
FIG. 13 is a screen shot showing one embodiment of the target screen.

Upon selection of a target from the screen 4150, the unit planning system 302 may provide the user with a target screen 4174 specific to the selected target. FIG. 13 is a screen shot showing one embodiment of the target screen 4174. The target screen 4174 may comprise a map field 4176 and a data field 4178. The map field 4176 displays a map of a geographic area comprising the target. The data field 4178 shows various information describing the target. The information may be presented in any suitable manner. In the example of FIG. 13, the data field 4178 comprises a tabbed data field 4177 comprising various tabs where each type corresponds to a type of information. A General tab 4181, when selected, displays at 4177 general data regarding the target such as, for example, the target data listed at the various columns of the target summary screen 4150. An Attribute tab 4180, when selected, may display at 4177 additional attributes of the target. A Field Validation tab 4182 may cause the tabbed data field 4177 to include various fields for receiving user-collected input from implementing company personnel describing the target geographic area. Such information may include, for example, the availability of real estate, growth rates in the market, competition in the market, etc., as well as market validation of a target (e.g., whether the conditions on the ground match the assumptions in the unit planning system 302). In some embodiments, the user-collected input also comprises a ranking or prioritization target relative to at least one other target (e.g., based on market conditions or any other factor such as the other user-collected input factors described herein).

An Associated Sites tab 4184 may display potential sites that are associated with the target (e.g., potential sites where a retail unit could be opened to implement the target). The data field 4178 may also comprise a Demographics field 4179 comprising various demographic data regarding the target. For example, a 3 Minute demographic field 4186 may list demographic properties of the area within a three minute drive the target while a 5 Minute demographic field 4188 may list demographic properties of the area within a five minute drive the target.

In some embodiments, the unit planning system 302 is configured to automatically generate various data describing a target upon creation of the target. For example, the unit planning system 302 may be configured to automatically generate the data described in FIG. 13. For example, various data may be derived and/or received from the various layers of the unit planning system 302 such as the spatial layer 304, the geographic layer 306, the map entities layer 308, etc. Examples of such data may include the geospatial data displayed at the map field 4176, some or all of the demographic data shown at field 4179, etc.

Figure 14:
FIG. 14 is a screen shot showing one embodiment of a site summary screen.

Referring again back to FIG. 5, selection of the Sites button 414 may launch a site summary screen 4200. FIG. 14 is a screen shot showing one embodiment of a site summary screen 4200. The screen 4200 is illustrated in tabular form with each row corresponding to a site and each column providing information regarding the corresponding site. Information provided in the columns may include, for example, a ID identifying the site, a name for the site, a development or project manager or function responsible for the site, a franchisee (if any) associated with the site, a fiscal year in which the site is slated to open a retail unit, a fiscal quarter in which the site is slated to open a retail unit, a status of the deal (if any) to finalize lease and construction data for the site, a store and SDA identification number to be associated with the site, an address of the site, a city and state for the site, a DMA associated with the site, the name of the DMA, etc. In some embodiments, the site summary screen 4200 also indicates an associated target for some or all of the sites. In some embodiments, all of the sites indicated at screen 4200 are associated with a single target. For example, in some embodiments, the screen 4200 may be displayed upon selection of the Associated Sites tab 4184 of the target screen 4174 described herein above.

Figure 15:
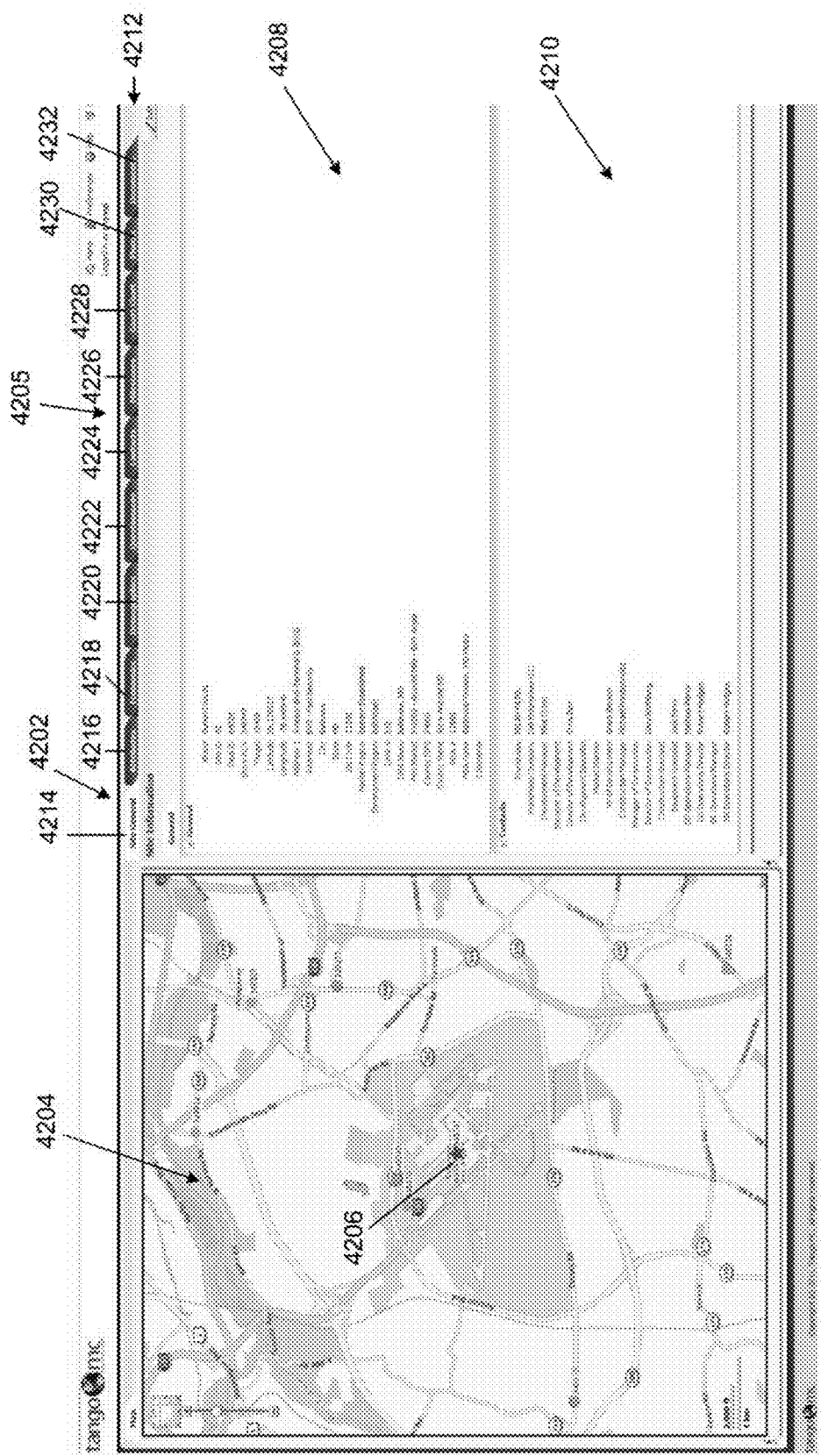
FIG. 15 is a screen shot showing one embodiment of a site screen.

Upon selection of one of the sites from the site summary screen 4200, the unit planning system 302 may display a site screen 4202 providing additional details of the selected site. FIG. 15 is a screen shot showing one embodiment of a site screen 4202. The site screen 4202 comprises a map field 4204 that shows a geographic area including the site 4206. A data field 4205 may display additional data describing the site. For example, a Contacts field 4210 may display contact information for individuals associated with the site including, for example, a franchisee, a franchise company, development managers and other personnel, construction managers and other personnel, etc.

Additional data describing the site may be provided at data field 4205. The data field 4205 may comprise a tabbed field 4208 having a plurality of tabs 4212 to organize the presented data. A Site General tab 4214 may cause the tabbed field 4208 to display general information about the site including, for example, the information provided at the site general screen 4200. Additional tabs 4212 may cause the tabbed field 4208 to display additional information about the site. An Attribute tab 4216 may include more detailed information describing the site. A Demographics tab 4220 may provide various demographic information about the trade area associated with the site. A Contacts tab 4224 may cause the tabbed field 4208 to display contacts information similar to the contacts information shown at 4210. A Milestones tab 4226 may list milestones associated with the site. Examples of such milestones, with reference to the process flow 200, may include the site visit 212, the submission of the site at 218, the clearing of hurdles at 222, the preliminary approval of the site at 228, the final approval of the site at 246, etc. A Gantt Chart tab 4228 may include a Gantt chart illustrating a project plan for the site including, for example, the milestones. A Photos tab 4230 may include photos of the site (e.g., aerial and/or ground level photos). In some embodiments, the Photos tab 4230 may include photos that are uploaded to the unit planning system 302 and may include a field (not shown) for uploading the user-collected photos.

An Economics tab 4218 may include detailed information about the site including, for example, revenue forecasts and cannibalization reports, as described herein. Some or all of the information displayed at the Economics tab 4218 may be user-collected information provided by the user. Such information may include, for example, information regarding the landlord associated with the site, the terms of actual or potential deals with the landlord for lease terms, the terms of actual or potential deals with contractors for retail unit construction at the site, etc. A Questionnaire tab 4222 may cause the tabbed field 4208 to display fields for receiving user-collected data regarding the site. For example, the Questionnaire tab 4222 may receive from the user a qualitative and/or quantitative assessment of the site. For example, the user may rate the site on various factors including, for example, visibility, parking, overall score, etc. The scores for a site may be indicated on a pre-determined scale (e.g., 1-100).

Figure 16:
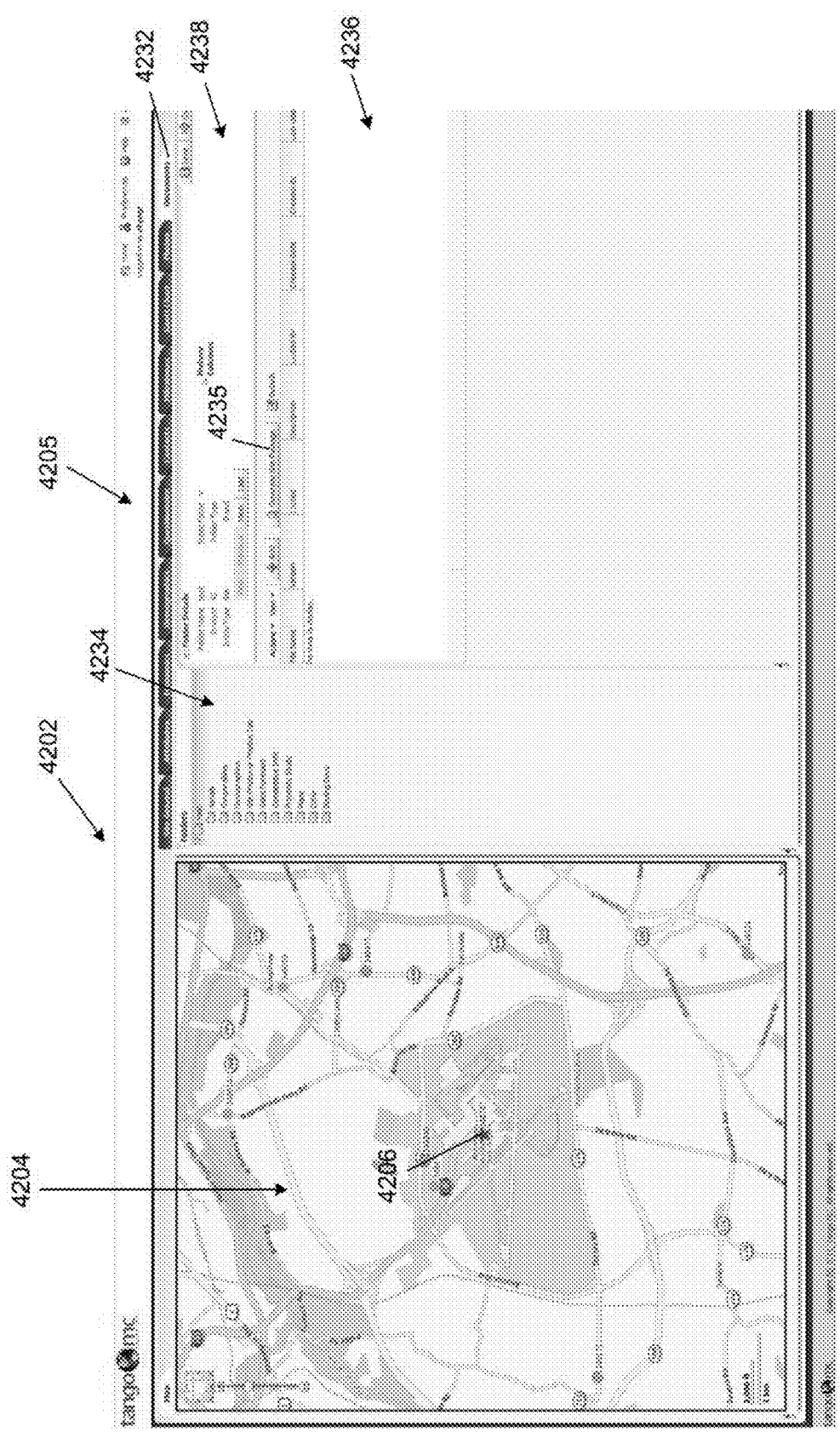
FIG. 16 is a screen shot showing one embodiment of the site screen with the Documents tab selected.

A Documents tab 4232 may include an organization of documents describing the site. FIG. 16 is a screen shot showing one embodiment of the site screen 4202 with the Documents tab 4232 selected. As illustrated the data field 4205 comprises a folder field 4234 listing a plurality of folders for organizing documents associated with the site. When a folder is selected, details of the folder (4238) and contents of the folder (4236) are displayed. Example folders include an Aerials folder comprising aerial photographs of the site, a Comparables folder comprising data describing comparable sites and/or comparable retail units, a Demographics folder comprising demographic information on the site, such one or more Demographic Reports generated by the unit planning system 302 as described herein above, a Site Photos or Photos folder that may comprise additional information on the site, a Sales Forecast folder that may comprise one or more sales forecasts generated by the unit planning system 302 as described herein, a Competitive Info folder that may comprise reports describing near-by retail units of competitors to the implementing company, a Proximity Study folder comprising studies of geographic locations near the site, a Maps folder comprising maps showing the site (e.g., maps with various layers as described herein above with respect to the map field 440), an Other folder comprising miscellaneous information describing the site and a Binding Docs folder comprising documents describing other documents for the site.

In various embodiments, the unit planning system 302 may be configured to automatically generate various data regarding a site upon creation of the site. For example, the unit planning system 302 may be configured to automatically generate a folder structure, such as that shown in 4234, and automatically populate one or more of the folders and/or tabs 4212. For example, the unit planning system 302 may automatically generate sales forecast, demographic reports, cannibalization reports, etc.

Figure 17:
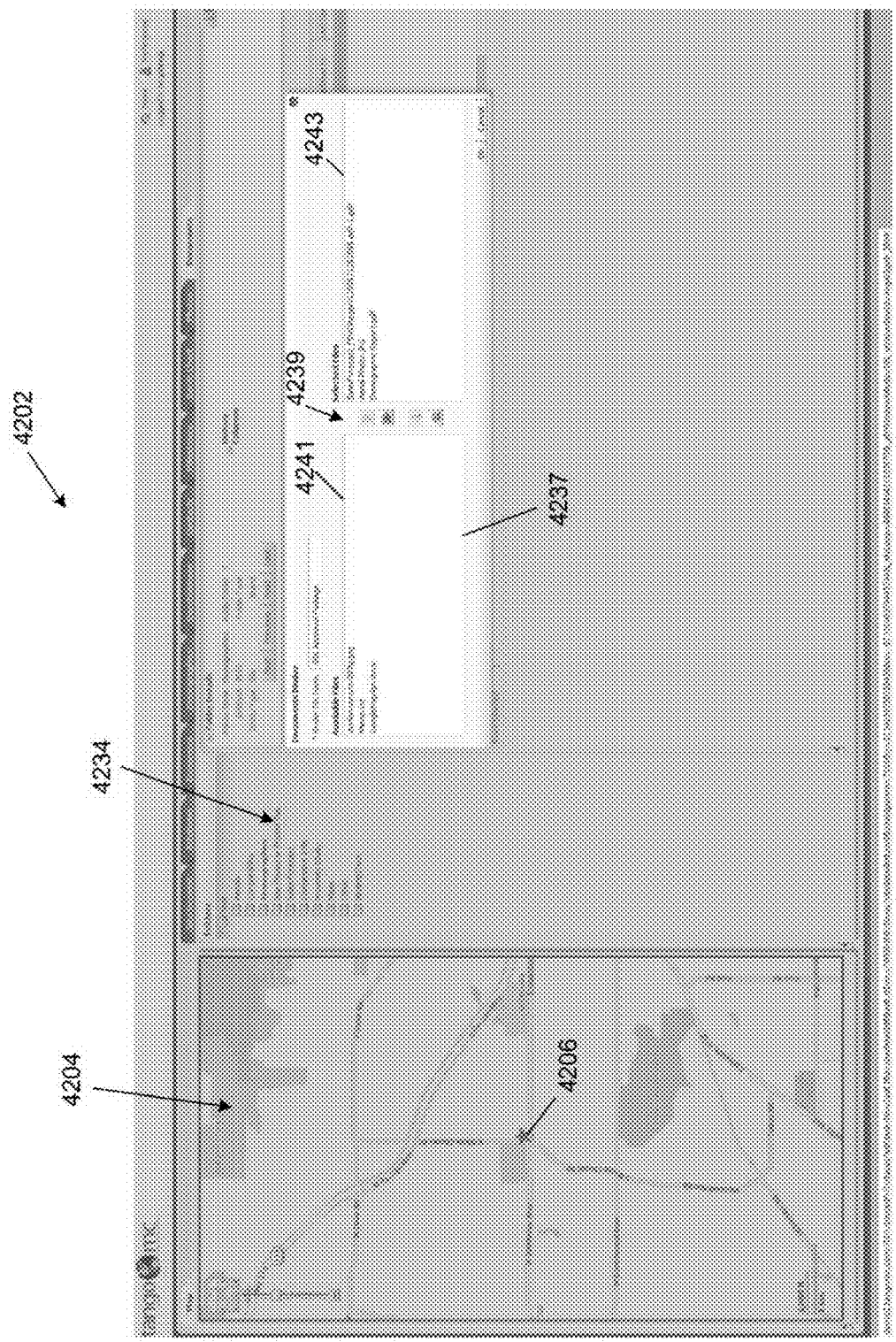
FIG. 17 is a screen shot showing one embodiment of the site screen with a Documents Binder field.

In various embodiments, the unit planning system 302 may comprise functionality, accessible via the site screen 4202, for generating a site approval package. The site approval package, for example, may be a detailed set of documents and/or other information describing the site that may be provided to management of the implementing company (e.g., at 246 of the process flow 200 described herein). For example, from the folder 4238, the user may select the Generate Site Package button 4235. Upon selection of the button 4235, the unit planning system 302 may automatically generate a site approval package comprising various documents (e.g., documents stored within the folder structure 4234). Documents may be collated into the site approval package according to a pre-existing template or similar structure. In some embodiments, the user may provide input on the structure of the site approval package. For example, selection of the Generate Site Package button 4235 may launch a Documents Binder field 4237. FIG. 17 is a screen shot showing one embodiment of the site screen with a Documents Binder field 4237. The Documents Binder field 4237 comprises an Available Files field 4241. The available files field may comprise files that may be included in the site approval package. A Selected Files field 4243 may comprise files that are to be included in the site approval package. Selection buttons 4239 may allow the user to move files between the fields 4241, 4243.

Referring back to FIG. 5, the Locations field 404, as described, may comprise various buttons linking to unit planning system 302 functionalities related to existing locations. A Stores button 420, when selected, may provide the user with various data relating to stores and/or other retail units that are already in existence. Such data may include, for example, sales history, sales forecasts, demographic reports, etc. A Competitors button 422, when selected, may provide the user with various data relating to existing or planned retail units of competitors of the implementing company. Such data may include, for example, sales history (to the extent available), demographic reports regarding the retail units, etc. Shopping Center button 424, when selected, may provide the user with various data relating to selected shopping centers. Shopping centers of interest may include, for example, shopping centers that include an existing retail unit of the implementing company, shopping centers that are within an existing target area and/or associated with an existing site, etc. Data describing the shopping centers may comprise, for example, demographic reports for areas surrounding the shopping centers, sales forecasts for hypothetical or actual sites surrounding the shopping center, etc.

Figure 18:
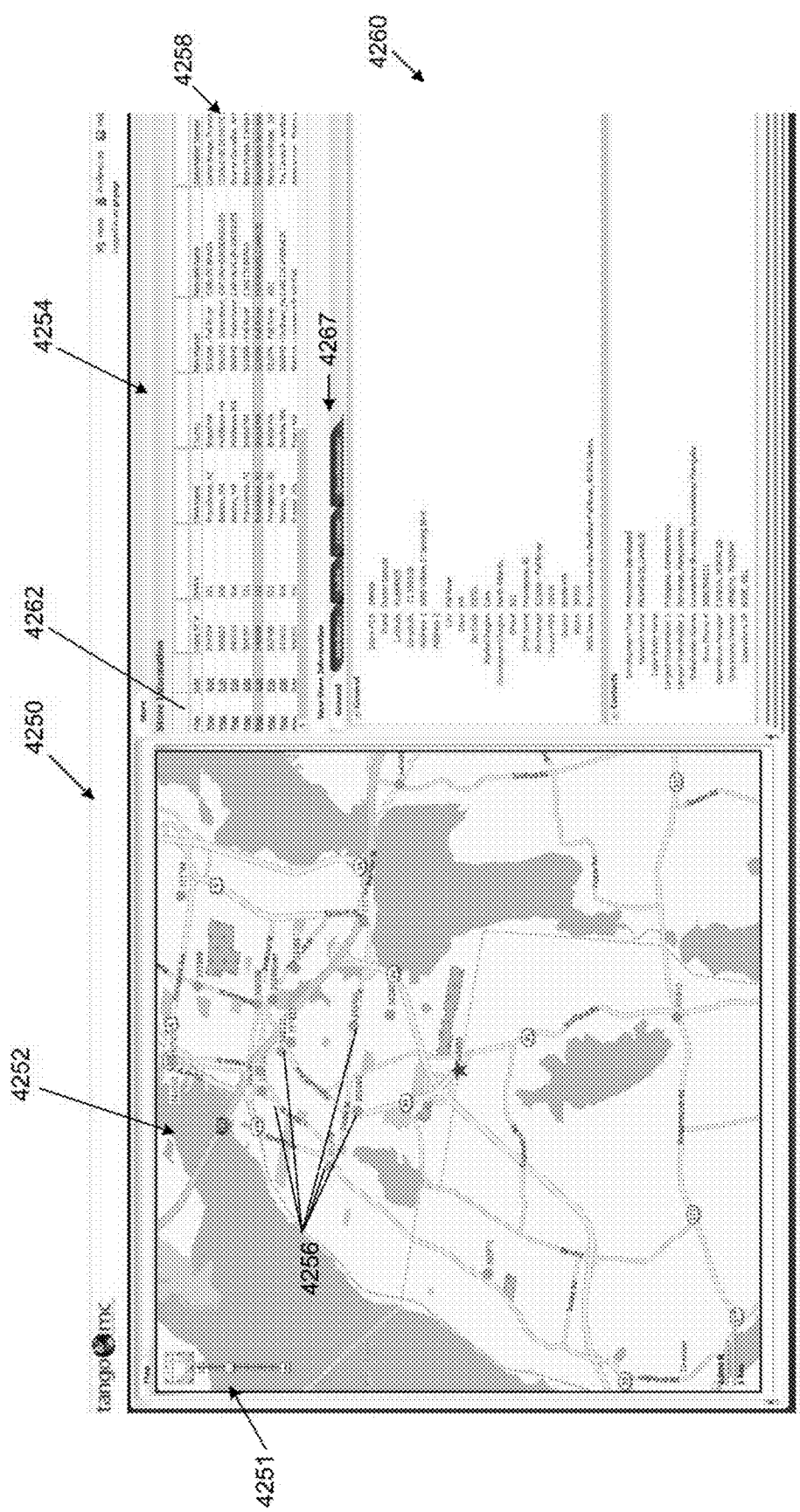
FIG. 18 is a screen shot showing one embodiment of a stores screen that may be displayed to a user via a user device upon selection of the Stores button of the menu screen.

FIG. 18 is a screen shot showing one embodiment of a stores screen 4250 that may be displayed to a user via a user device 316 upon selection of the Stores button 420 of the menu screen 400. The stores screen 4250 may comprise a map field 4252 and a Data field 4254. The map field 4252 may display a geographic area comprising one or more retail units 4256. The map field 4252 may also comprise a pan and zoom tool 4251 for providing the user with functionality for changing the geographic area shown. The data field 4254 may comprise a retail unit field 4258 listing retail units (e.g., retail units within the geographic area displayed at 4252, retail units associated with the implementing company, retail units within a given market area, mini-market, territory, etc.). Various information about each retail unit may be provided at 4254. In various embodiments, each retail unit listed at 4254 may comprise an associated Map button 4262. Upon selection of Map button 4262 associated with a retail unit, the unit planning system 302 may modify the geographic area shown at map field 4252 to show the selected retail unit and surrounding area.

Upon selection of a retail location from the retail unit field 4258, the data field 4260 may be populated with data describing the selected retail unit. A series of tabs 4262 may organize the displayed information. A General tab may display general information about the site, including, for example, the information displayed at retail site field 4254, contact information for individuals associated with the retail site, etc. An Attributes tab may show attribute information describing the retail site. A Sales tab may show historical sales data for the site as well as sales forecasts describing future sales for the site. Historical sales data may be received by the unit planning system 302, for example, from an accounting system 324 of the implementing company. A Lease tab may comprise data describing the site's lease. The lease data may be received by the unit planning system 302, for example, from a real estate system 330 of the implementing company. A Questionnaire tab may comprise data and/or fields for user-provided data describing the site. In various embodiments, access to the retail site information may be restricted to certain authorized users.

Figure 19:
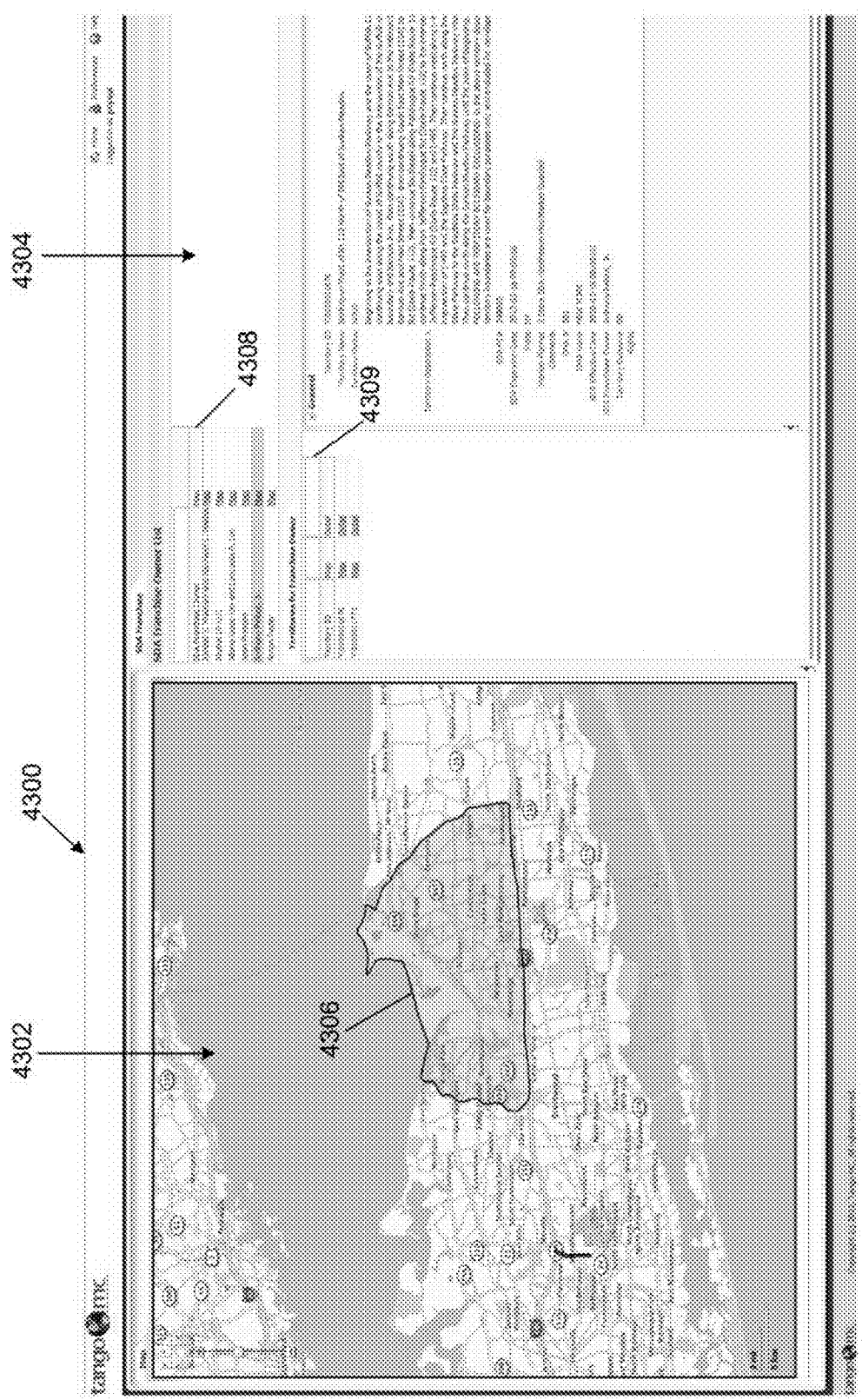
FIG. 19 is a screen shot showing one embodiment of an strategic development area (SDA) management screen.

Referring again back to FIG. 5, the Franchise Development field 406 may comprise various buttons 426, 428, 430 that, when selected, provide the user with functionalities for managing franchisee territory and agreements. For example, some implementing companies utilize franchisees to open retail units. Often, each franchisee is assigned a strategic development area or SDA defined by the franchise agreement. Each SDA may have a number of stores and may include an obligation on the part of the franchisee to open additional stores. The SDA button 426, when selected, may cause the unit planning system 302 to launch an SDA management screen 4330. FIG. 19 is a screen shot showing one embodiment of an SDA management screen 4330. The SDA management screen 4330 comprises a map field 4302 and a data field 4304. The map field 4302 shows a geographic area comprising an SDA territory 4306 associated with a franchise agreement. The data field 4304 comprises various data describing the territory. In some embodiments, the data field 4304 may also comprise an SDA selection field 4308 that may allow the user to re-populate the SDA management screen 4330 with data describing an additional SDA territory. The data field 4304 may also comprise a territory field 4309 listing the displayed SDA territory as well as additional SDA territories owned by the same franchisee. Each territory listed at territory field 4309 may be associated with a Detail button that, when selected, causes the unit planning system 302 to display a detailed SDA management screen.

Figure 20:
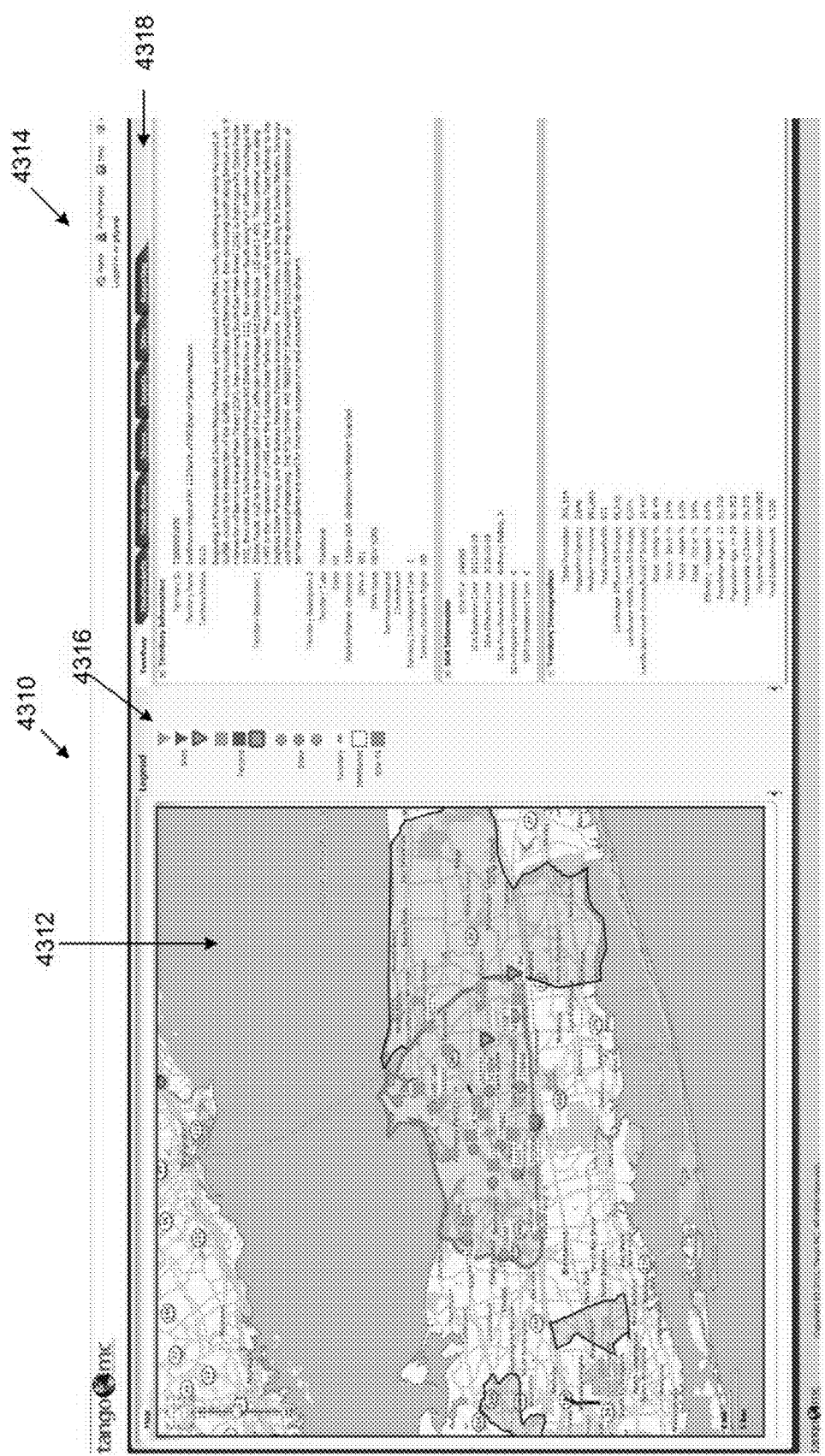
FIG. 20 is a screen shot showing one embodiment of a detailed SDA management screen.

FIG. 20 is a screen shot showing one embodiment of a detailed SDA management screen 4310. The detailed SDA management screen 4310 provides additional detailed information describing a selected SDA territory and may be accessed, for example, by selection of the Detail button in screen 4300 and/or via selection of the Territory button 428 of the menu screen 400. The detailed SDA management screen 4310 comprises a map field 4312 and a data field 4314. The map field 4312 shows a geographic area comprising the selected SDA territory. As indicated by the Legend field 4316, the map field 4312 indicates the SDA territory by shading. Mini-markets included with the SDA territory are indicated by dark outlines. Stores or other retail units within the SDA territory are indicated by circles. Targets within the SDA territory are indicated by squares. Sites within the SDA territory are indicated by triangles.

The data field 4314 comprises various data describing the selected SDA territory. The data may be organized by tabs 4318. A Territory tab may comprise data describing the SDA and/or territory including, for example, a description of the territory, a description of the SDA including, for example, an effective date, an expiration date, a franchisee owner, a development term, and a required number of retail units to be opened (e.g., by the franchisee) during the development term. The Territory tab may also comprise demographic information, such as a demographic report, describing demographics of the SDA territory. A Minimarket tab may comprise similar data for minimarkets (e.g., subdivisions of the territory). A Trade Area tab may comprise data describing trade areas associated with retail units, sites and/or targets within the SDA territory. A Stores tab may comprise data describing stores or other retail units within the SDA territory. Targets and Sites tabs may similarly comprise data regarding targets and sites within the SDA territory. A Reporting tab may comprise data describing reports provided by the franchise owner to the implementing company.

Figure 21:
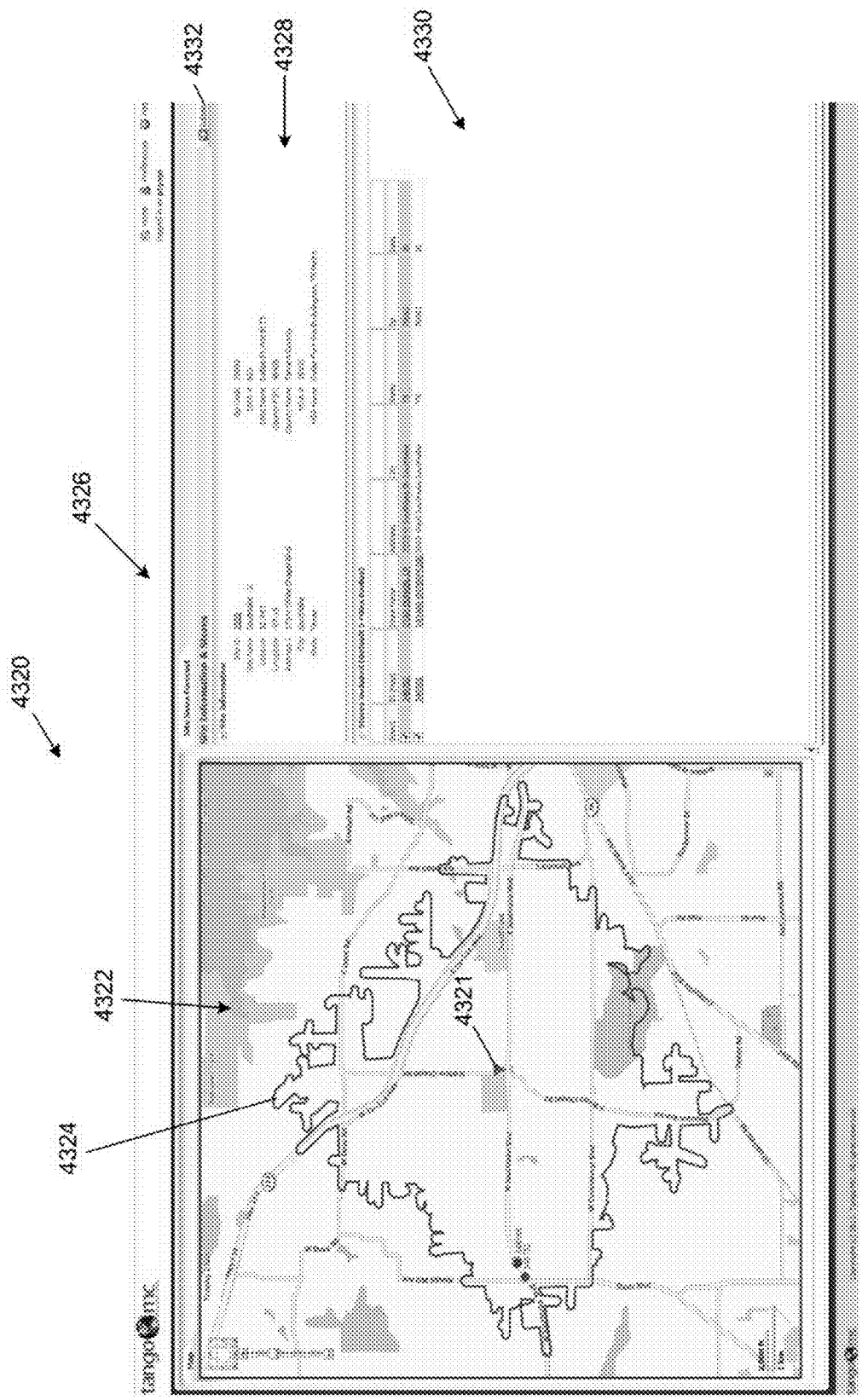
FIG. 21 is a screen shot showing one embodiment of a sales forecast screen.

Referring yet again back to the menu screen 400, the Analytics field 408 may comprise a Sales Forecast button 432, a Market Optimization button 436, and a Pro Forma button 438. The Market Optimization 436 and Pro Forma buttons 438 may be selected by the user to access market optimization and pro forma functionality, as described herein below. Similarly, the Sales Forecast button 432 may be selected by the user to access sales forecast functionality for a site. FIG. 21 is a screen shot showing one embodiment of a sales forecast screen 4320. The sales forecast screen 4320 may be accessed by selecting the sales forecast button 432 and/or may be access through various other screens that include sales forecasting. For example, the sales forecast screen 4320 (and/or results thereof) may be accessed via the Sales Forecast folder of the site screen 4202. The particular site that is the subject of the sales forecast screen 4320 may be selected in any suitable manner. For example, when the sales forecast screen is accessed via a Sales Forecast folder, the site may be maintained. Also, in some embodiments, the unit planning system 302 may prompt the user to provide a site.

The sales forecast screen 4320 comprises a map field 4322 and a data field 4326. The map field 4324 may indicate the relevant site 4321 as well as a trade area 4324. The trade area 4324 may be determined automatically by the unit planning system 302, or may have been previously entered and/or modified by a user, for example, as described above with respect to the mapping screen 440. The data field 4326 may comprise information about the site. A Site Information field 4328 comprises basic site information. A Stores Included field 4330 comprises an indication of other retail locations that are considered in the sales forecast for the purpose of determining cannibalization. A submit button 4332 may be selected by the initiate the sales forecast calculation. The calculation may be performed in any suitable manner including the manner described herein below with respect to FIG. 33.

Figure 22:
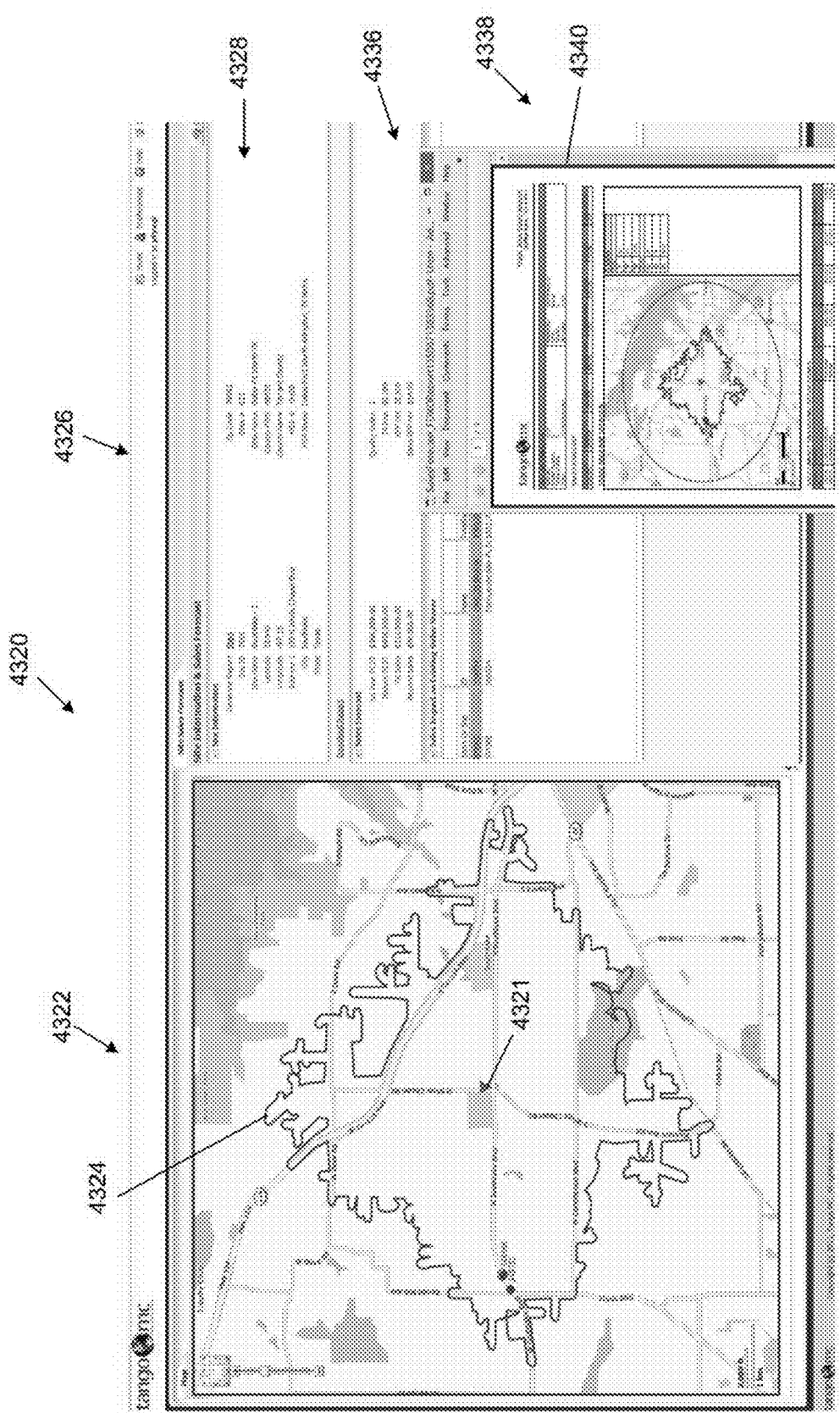
FIG. 22 is a screen shot showing one embodiment of the sales forecast screen of FIG. 21 after the sales forecast calculation is completed.

FIG. 22 is a screen shot showing one embodiment of the sales forecast screen 4320 of FIG. 21 after the sales forecast calculation is completed. The data field 4326 may additionally comprise a Sales Forecast field 4336 comprising results of the sales forecast as well as a Sales Impact field 4338 indicating a forecasted impact of the site on sister retail units (e.g., cannibalization). The results of the sales forecast calculation may also be included in a result document, such as a PDF document, indicated by 4340. The unit planning system 302 may automatically store the result document 4340 at the Sales Forecast folder from the site folders 4234 associated with the site (See FIG. 16).

Figure 23:
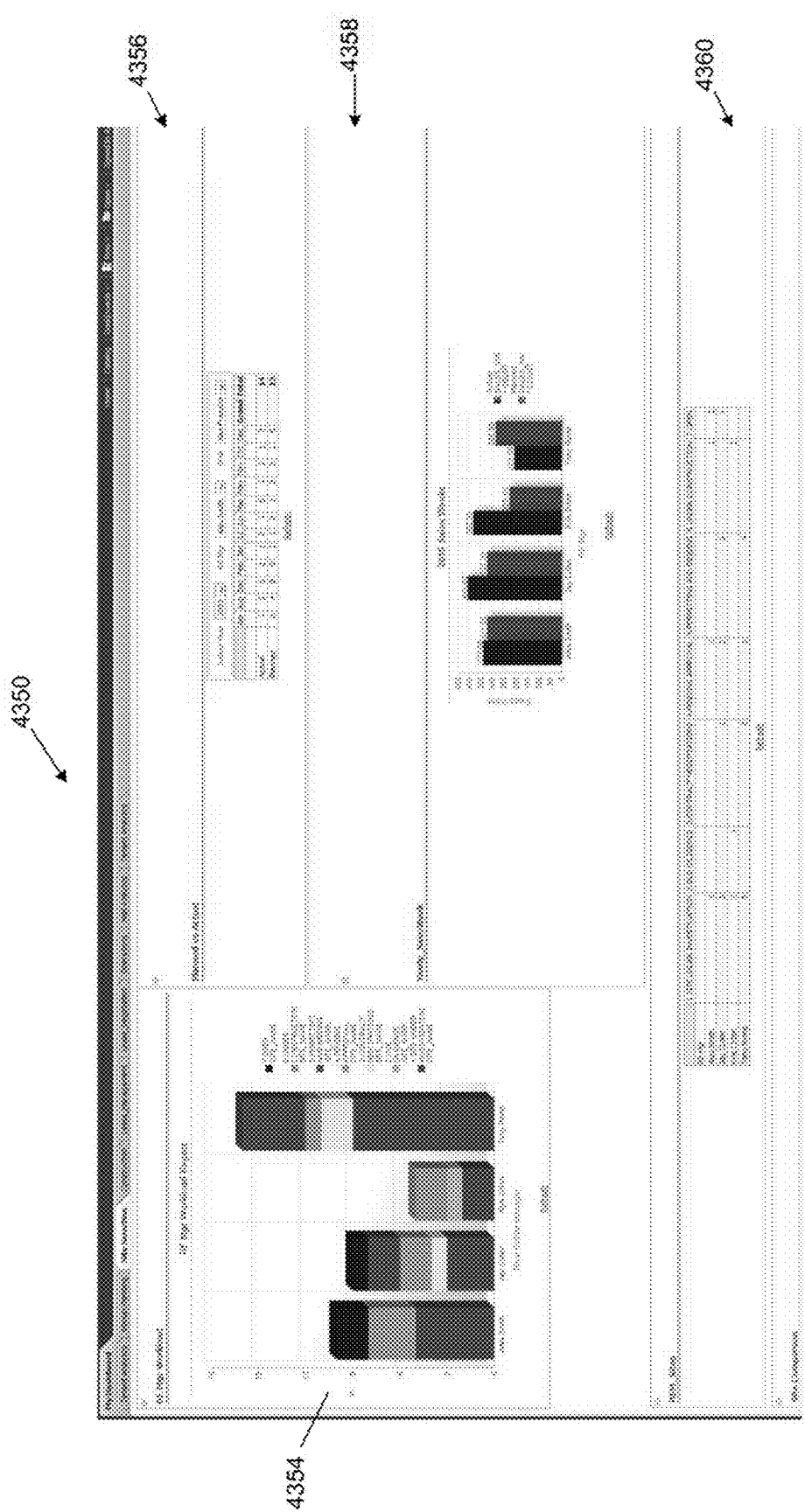
FIGS. 23 and 24 are screen shots showing respective dashboard screens providing functionality for monitoring the progression of sites.
Figure 24:
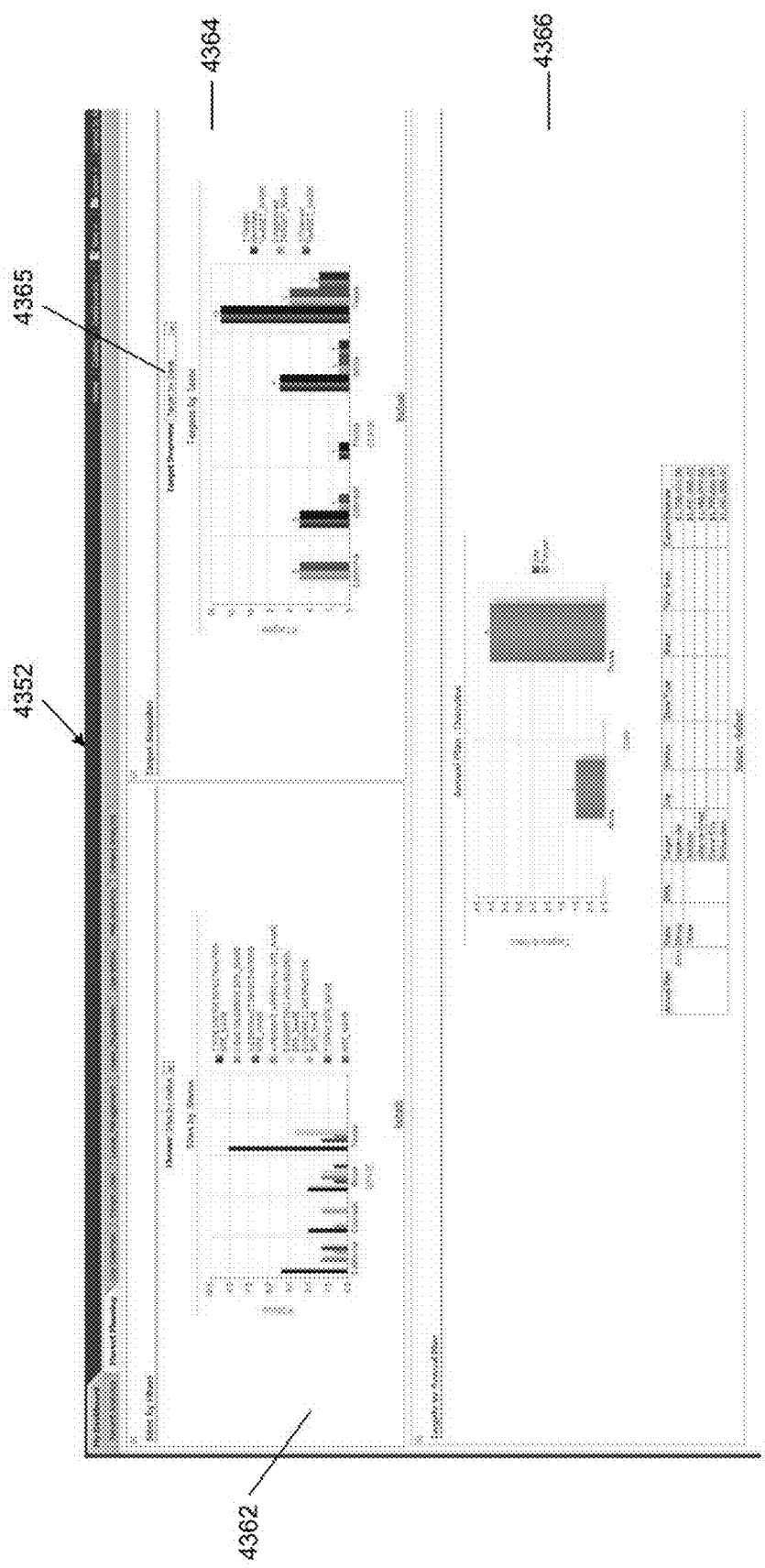

FIGS. 23 and 24 are screen shots showing respective dashboard screens 4350, 4352 providing functionality for monitoring the progression of sites and targets. The screens 4350, 4352 provide various metrics to a user, for example, a user in a management roll. In some embodiments, the screens 4350, 4352 may only be available to authorized users. Referring now to screen 4350, a field 4354 may comprise a manager workload report showing a graphical and/or numerical indication of sites and corresponding managers (e.g., project managers) and indicating the degree of completion of the various sites. A Planned vs Actual field 4356 may indicate the number of actual versus a number of planned site openings over a given time period. The field 4356 may be calibrated by manager, year, DMA territory, etc. A Yearly Sales Week field 4358 may indicate a number of sales weeks for open retail units and may be broken down by manager. A REM Sites field 4360 may indicate a number of sites at various stages of completion and may be broken down by manager. Referring now to the screen 4352, a Sites by Status field 4362 may show sites in various geographic areas indicated by status. A Target by Status field 4364 may indicate targets in various geographic areas shown by status. A Targets Vs Annual Plan field 4366 may indicate metrics describing the status of a current or annual plan.

Figure 25:
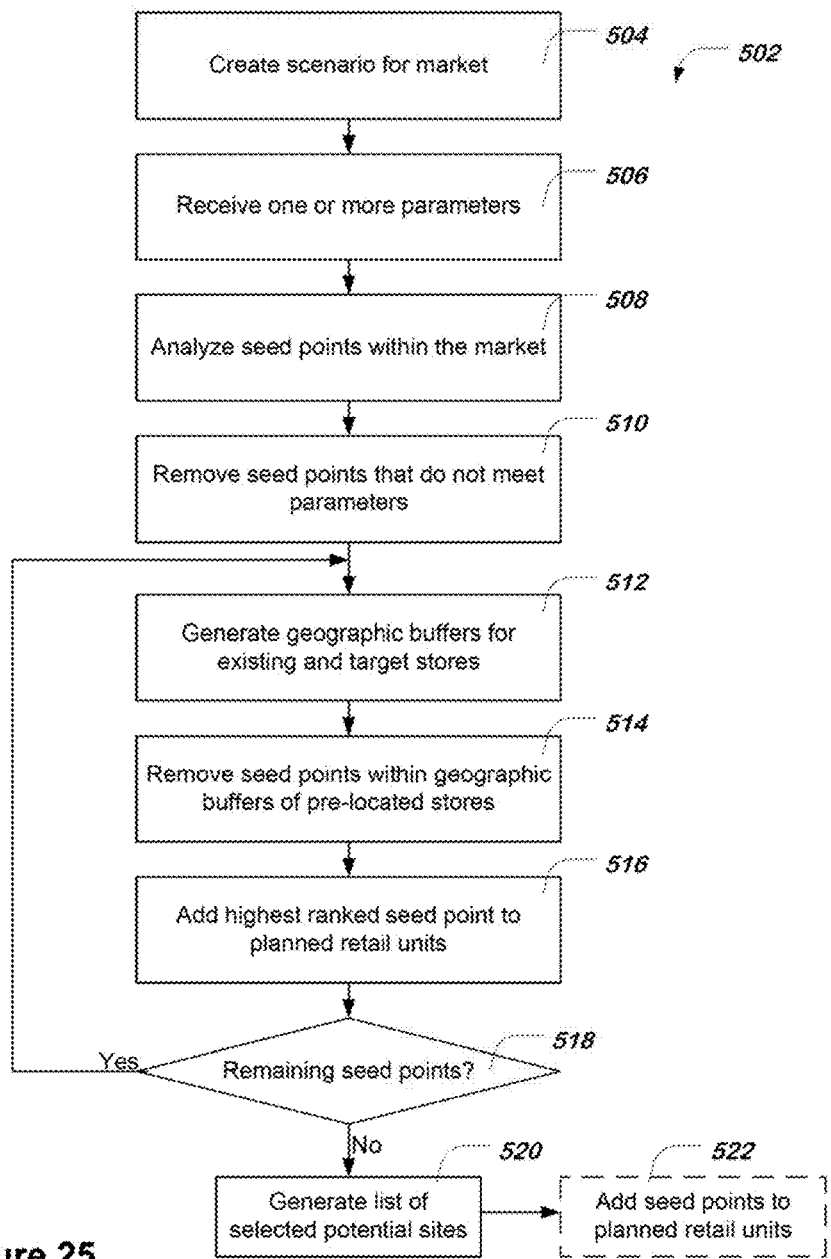
FIG. 25 is a flow chart showing one embodiment of a process flow for calculating a market optimization to determine optimal distribution of retail units within a market.

In some example embodiments the unit planning system 302 is programmed to calculate a market optimization, or an optimal distribution of retail units within a geographic area or market. FIG. 25 is a flow chart showing one embodiment of a process flow 502 for calculating a market optimization to determine optimal distribution of retail units within a market. At 504, the unit planning system 302 may receive a market scenario. The market scenario may define a geographic area (e.g., a market) as well as additional parameters utilized in the optimization. In some example embodiments, receiving the market scenario may comprise receiving an indication of one or more existing retail units and of one or more planned retail units. A planned retail unit may be, for example, a potential site for retail unit placement or a target area for retail unit placement. Planned retail units may be identified by the user and/or specified as part of the market scenario (e.g., as a component of a long range development plan, current plan, etc.). The market scenario may be a predetermined market scenario stored in the unit planning system or on a network location. In some example embodiments, the market scenario may be generated during execution of the process flow 502, for example, based on inputs received from the user.

In various example embodiments, optimizing a distribution of retail units within a geographic area or market comprises considering a plurality of seed points. Each seed point may represent a potential site or target geographic area for a retail unit. The type and number of seed points used in any given calculation may depend on the type of retail unit to be placed. For example, a mall-based department store like MACY'S, may consider as seed points only locations within the market area where a shopping mall is present. Also, for example, a convenience store like 7-ELEVEN may consider every commercially zoned intersection within the market area as a seed point.

The unit planning system 302 may receive optimization parameters at 506. Optimization parameters may be any values used in the optimization performed by the unit planning system 302. In some example embodiments, optimization parameters may include seed point thresholds. The thresholds may set minimum or maximum values for revenue, profit, cannibalization, etc. that a seed point should meet to be considered as potentially optimal. Some embodiments may utilize a revenue and/or profit threshold. Revenue and profit thresholds may specify a minimum level of forecasted revenue and/or profit that should be generated by a seed point in order to merit further consideration. Seed points with a profit forecast value below a minimum profit threshold, for example, may be eliminated from further consideration. Some embodiments may utilize one or more cannibalization thresholds. A cannibalization threshold may be set by a user or by the unit planning system. Cannibalization thresholds may be expressed in any suitable way. For example, a cannibalization threshold may specific a maximum aggregate amount of revenue that a seed point may cannibalize from sister seed points, a maximum amount of revenue that a seed point may cannibalize from any one sister location, etc. For example, in some embodiments, a seed point may not cannibalize any existing retail unit for more than 10% of the existing retail unit's current sales. In some embodiments, the maximum cannibalization value may be an aggregate cannibalization value caused by a seed point for the entire market, such as, for example, a seed point may not cannibalize the existing and planned retail units in the market for more than the threshold amount of revenue. In some embodiments, the maximum cannibalization value may be an aggregate cannibalization of a single existing retail unit caused by one or more seed points. Those skilled in the art will recognize that any other threshold, or any combination of thresholds, may be used to filter the one or more seed points.

In various example embodiments, the unit planning system 302 may perform analysis of each of seed points within the market area at 508. The analysis, in various embodiments, may include calculating a sales forecast and a cannibalization forecast for each of the seed points under consideration. After the analysis has been performed at 508, the forecasted values of the one or more seed points are compared to the revenue and/or cannibalization threshold(s) received at 506. Any seed points which fail to meet one or more of the thresholds (e.g., revenue forecast is less than the minimum revenue value or cannibalization forecast is more than the cannibalization value) are removed from further consideration at 510.

In various example embodiments, once the one or more seed points have been reduced through the threshold comparisons at 512, the unit planning system 302 may generate geographic buffers around one or more of the existing retail units and planned retail units. Each geographic buffer may represent an area around an existing or planned retail unit in which it is likely a new retail unit would cause too much cannibalization to be profitable. The geographic buffers may be defined in terms of drive-time, geographic distance, etc., and in some embodiments may be defined by the user. In various example embodiments, for example, a drive-time buffer of two minutes may be set. The unit planning system 302, leveraging the geographic data layer 306, may calculate a geographic area around the retail unit which represents the distance that may be covered by a customer driving for two minutes. Seed points located within the geographic buffers may be removed from further consideration. By eliminating all seed points within the geographic buffers, the processing power required to determine the optimal distribution of seed points may be reduced as the number of seed points to be considered is reduced.

At 516, the unit planning system 302 may rank seed points that remain under consideration. The remaining seed points may be ranked by any metric (e.g., a metric selected by the user). For example, the remaining seed points may be ranked based on the revenue forecast, a profit forecast, a combination of revenue and profit forecasts, or any other suitable metric. Those skilled in the art will recognize that any metric associated with the one or more seed points may be used to calculate a ranking of the one or more seed points. After ranking the one or more seed points, the unit planning system 302 may selects the highest ranked seed point at 516 and add the highest ranked seed point to the pool of one or more planned retail units.

At 518, the unit planning system 302 may determine whether there are any remaining seed points available for selection. If one or more seed points remain, the unit planning system 302 may return to 512 and generate a geographic buffer around the new planned retail unit based on the highest ranked seed point. After removing seed points located within the geographic buffer around the new planned retail unit, the unit planning system 302 re-ranks the remaining seed points and selects the next highest ranked seed point for inclusion in the one or more planned retail units. In some embodiments, the unit planning system 302 may continue to run until all of the seed points under consideration have been selected as planned retail units or have been eliminated. In some embodiments, the unit planning system 302 may select a predetermined number of planned retail units and operate until the predetermined number of seed points is selected.

In various example embodiments, once the market optimization calculation 502 has completed, either by processing all of the one or more seed points or by selecting a predetermined number of planned retail units, the unit planning system 302 may output a list of the selected planned retail units. In various embodiments, the list of selected planned retail units may be provided as points on a map of the geographic area defined in the market scenario, a table of information, or any other suitable method for displaying the selected planned retail units. In some embodiments, the unit planning system 302 may provide the selected planned retail units to a user for review and may automatically add the selected planned retail units to the list of planned retail units maintained by the unit planning system. The output of the market optimization calculation may include, in various embodiments, the number of additional retail units that may be placed in the geographic area of the market scenario, the total incremental revenue generated in the defined market, the total cannibalization effect in the market, or any other suitable output for the market scenario.

In various example embodiments, the unit planning system 302 may apply one or more optimization algorithms in addition to or instead of the actions 512, 514, 516 and 518 described above. For example, in various example embodiments, a bin packing optimization algorithm may be used. According to a bin packing optimization algorithm, the seed points and the market scenario are considered similar to a plurality of boxes and a large bin. Conceptually, the bin has certain parameters, such as width, height, volume, maximum weight limits, etc. Each of the plurality of boxes also has one or more parameters, such as, for example, width, height, volume, weight, maximum stacking weight, etc. Bin packing is a statistical model that considers the optimal way to get the most boxes into the bin by attempting to pack the boxes in a plurality of configurations until the configuration allowing the maximum number of boxes to fit in the bin is determined. The unit planning system 302 may apply this technique to the market scenario, running multiple simulations to determine the optimal solution for packing the maximum number of seed points (the boxes) into the geographic area of the market scenario in view of the optimization parameters (the bin).

Figure 26:
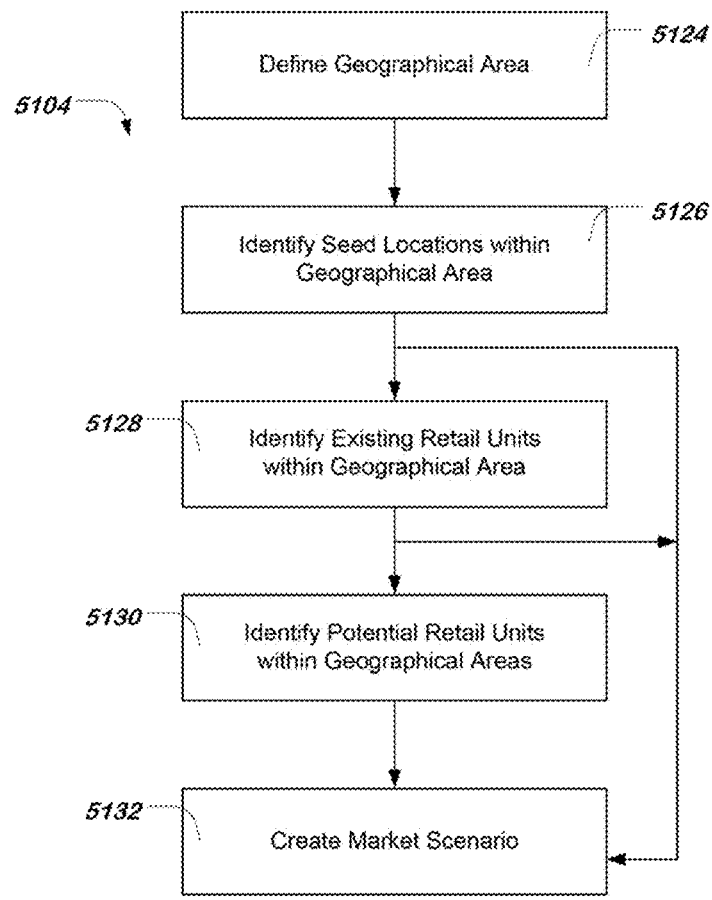
FIG. 26 is a flow chart showing one embodiment of a process flow for generating a market scenario.

FIG. 26 is a flow chart showing one embodiment of a process flow 5104 for generating a market scenario. In some embodiments of the process flow 502, a saved market scenario may be provided at 504. Also, in some example embodiments, the unit planning system 302 may generate the market scenario and/or receive it form the user. In various example embodiments, a market area is defined for the market scenario at 5124. The market area may be any suitable geographic area, such as, for example, a region, a census block, a designated market area, a zip code, a municipality, etc. In other embodiments, the market area may be a polygon defined by a user encompassing a specific geographic area. After defining the market area, one or more seed points are identified within the market area.

Figure 31:
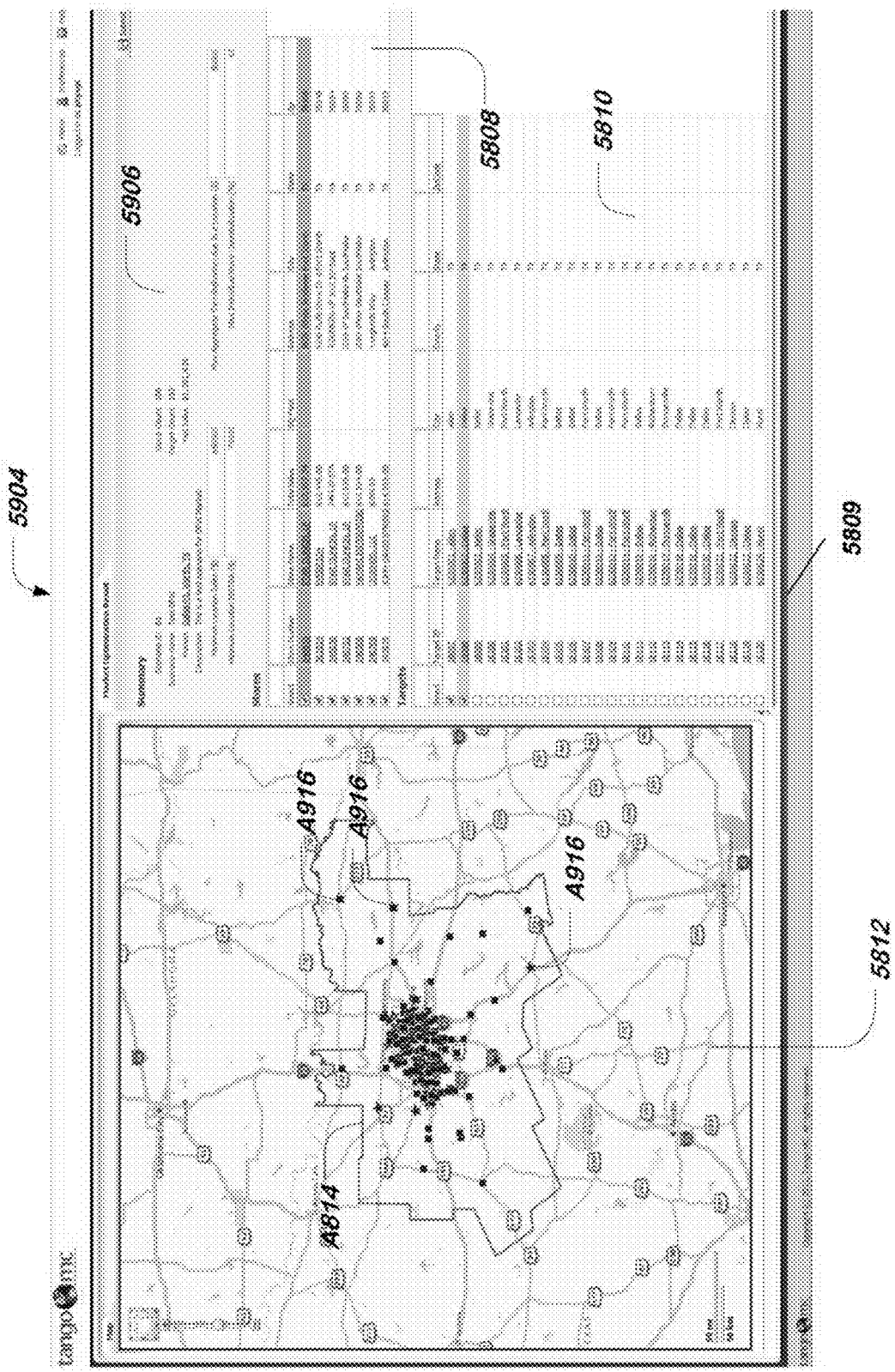
FIG. 31 is a screen shot of the parameter selection interface with the optimization thresholds defined by the user.

In some embodiments, at 5128, one or more existing retail units may be identified for inclusion in the market scenario. The existing retail units may be retail units may be units that have already been opened or are intended to open within the geographic area. In some embodiments, the user may exclude one or more existing retail units from consideration, for example, if the selected retail locations are scheduled to close. Also, in some example embodiments, the user may perform a "green field" optimization, in which all existing retail units are ignored and the optimal distribution of retail units is determined without considering the preexisting retail units. FIG. 31 illustrates one embodiment of an input screen 5904 which allows a user to select or deselect one or more existing retail units for consideration in optimization. For example, an existing retail unit field 5808 may list existing retail units within the market area. Check boxes at column 5807 may enable the user to select or de-select existing retail units for consideration in optimization.

Referring now back to FIG. 26, one or more planned retail units or user-selected potential sites may be included in the market scenario at 5130. The planned retail units represent potential sites that have been selected for retail units but have not yet reached existing retail unit status. In some embodiments, the planned retail units may include potential sites for placement of a retail unit and/or target areas for placement of a retail unit that may be chosen by a user. In other embodiments, the planned retail units may include sites and/or targets selected by previous iterations of the market optimization calculation 502. FIG. 31 also shows a target field 5810 that may list targets and/or sites. The user may select or de-select a target and/or site for consideration as planned retail units utilizing check boxes at column 5809. Referring again to FIG. 26, at 5132, the unit planning system 302 may generate a market scenario for use by the market optimization calculation 502 including the selected market area, existing retail units, and planned retail units.

Figure 27:
FIG. 27 is a screen shot of one embodiment of a market scenario selection interface.

FIG. 27 is a screen shot of one embodiment of a market scenario selection screen 5604. The market scenario selection screen 5604 allows a user to select a predefined market scenario for use in the market optimization calculation 502. In various example embodiments, a search box 5606 may allow user to search for a predefined market scenario using one or more search factors, such as, for example, a scenario name, a scenario ID, or a market name. The market scenario selection screen 5604 may also provide a list 5608 of one or more predefined market scenarios. The list 5608 of one or more market scenarios may, in various embodiments, comprise default market scenarios, user defined market scenarios, or system defined market scenarios (such as, for example, a green field scenario).

Figure 28:
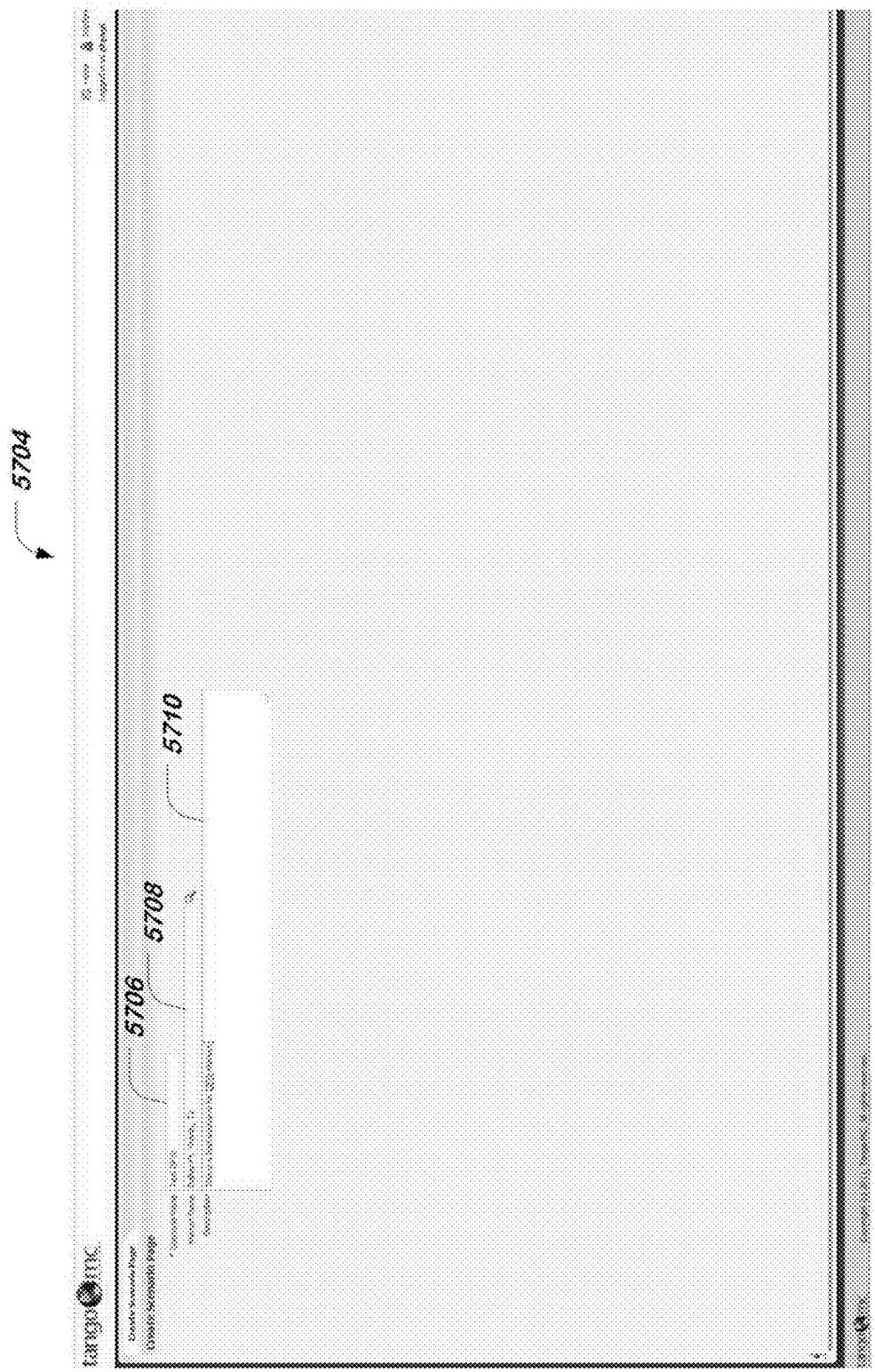
FIG. 28 is a screen shot of one embodiment of a market scenario creation interface.

FIG. 28 is a screen shot of one embodiment of a market scenario creation screen 5704. The market scenario creation screen 5704 may allow a user to define a market scenario by selecting one or more parameters of the market scenario, such as, for example using the market area field 5708, one or more existing retail units in the market, and one or more planned retail units in the market. In the embodiment shown in FIG. 28, the user may use the market scenario creation screen 5704 to select a predefined market area for the market scenario. In some embodiments, the market scenario creation screen 5704 may allow a user to draw or select a new market area. In various example embodiments, the other parameters of the market scenario may be defined on another screen, such as, for example, the parameter selection screen shown in FIG. 29. The market scenario creation screen 5704 may also, in various embodiments, provide a user-definable name field 5706 and a user-definable description field 5710 of the market scenario.

Figure 29:
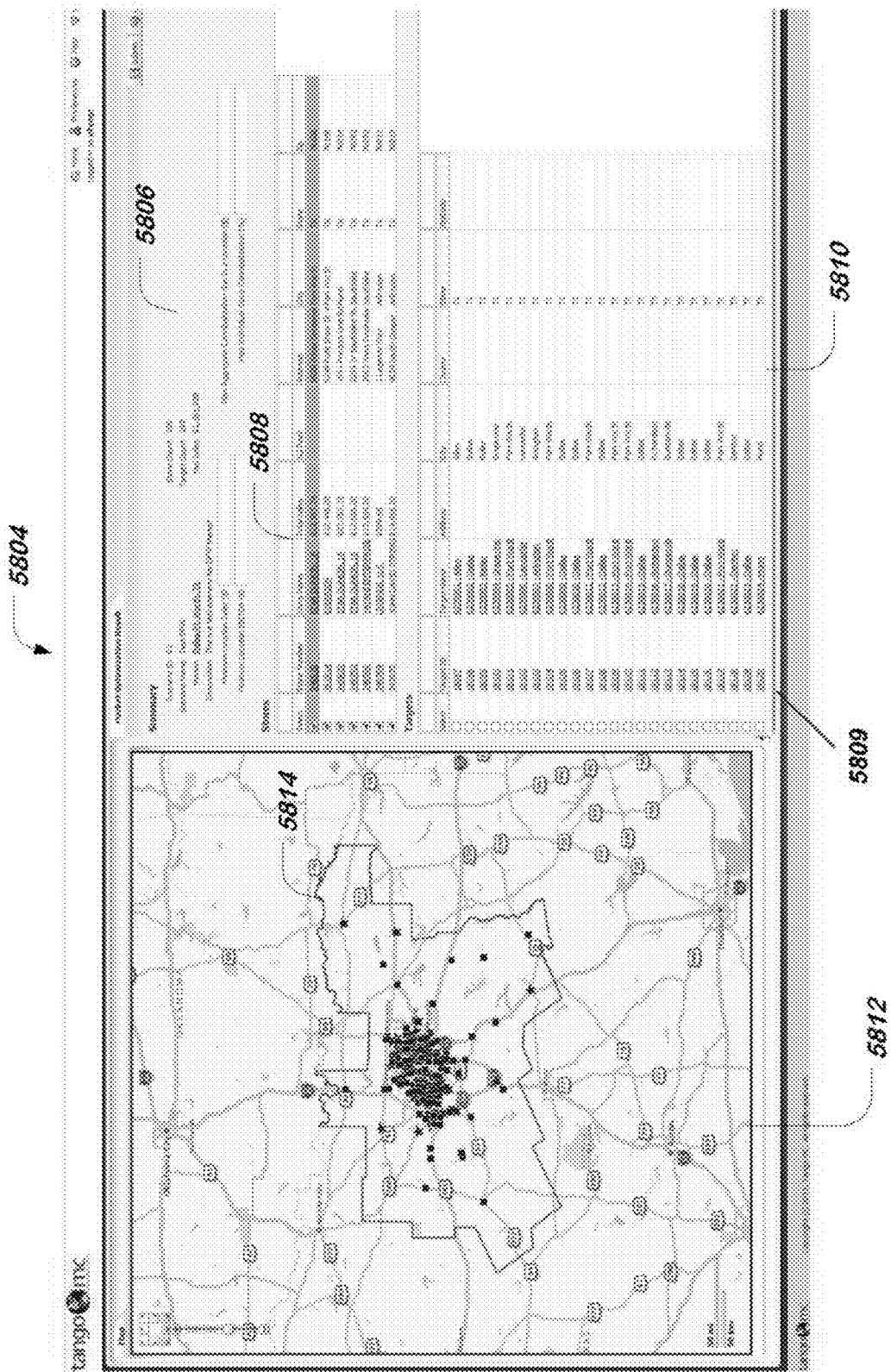
FIG. 29 is a screen shot of one embodiment of a parameter selection interface.

FIG. 29 is a screen shot of one embodiment of a parameter selection screen 5804. The parameter selection screen 5804 allows a user to further define a market scenario by selecting one or more existing retail units 5808 to be included in the market optimization calculation 502. The existing retail units 5808 may be automatically identified by the unit planning system 302 based on the market area 5708 selected by the user at the market scenario creation screen 5704. The parameter selection screen 5804 may also allow a user to select one or more targets or sites for consideration as planned retail units at 5810. The list of targets and/or sites 5810 may comprise one or more planned locations saved in the unit planning system by the user or may be defined by the user during the market scenario creation. The parameter selection screen 5804 may further comprise a map 5812 showing the market area of the market scenario 5814, the one or more existing retail units 5816 within the market scenario, and one or more planned retail units (represented as squares in FIG. 29).

Figure 30:
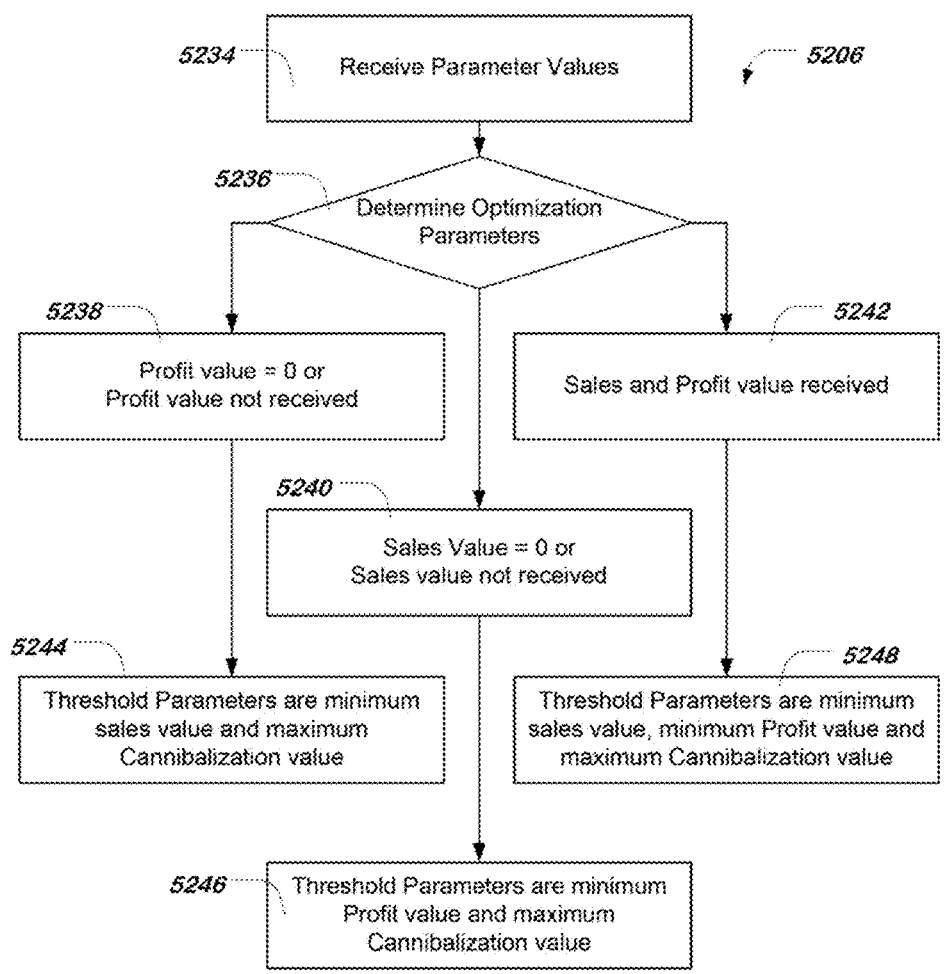
FIG. 30 is a flow chart showing one embodiment of process flow for selecting one or more optimization parameters.

FIG. 30 is a flow chart showing one embodiment of process flow 5206 for selecting one or more optimization parameters. In various embodiments, a user may select one or more optimization parameters for use during the market optimization calculation 502. For example, in some embodiments, a user may select a revenue value and a cannibalization value as the basis for analyzing the one or more seed points, a profit value and a cannibalization value, or a revenue value, a profit value, and a cannibalization value for analyzing the one or more seed points. Those skilled in the art will recognize that any combination of optimization parameters may be selected by a user. In various example embodiments, a user may select one or more optimization parameters by providing the thresholds for the selected optimization parameters at 5234. For example, by providing a revenue threshold of $1,000,000 the user has selected revenue value as one of the optimization parameters. In some embodiments, if a user fails to provide a parameter threshold, or provides a threshold of 0, the unit planning system 302 may ignore the parameter. For example, if a user provides a revenue threshold of $1,000,000, a cannibalization threshold of 10%, and a profit threshold of $0, the unit planning system 302 may optimize the market based only on the revenue and cannibalization values of the one or more seed points, and may ignore the profit values of the one or more seed points. In various example embodiments, the cannibalization value may be set to zero to specify that the existing or planned retail units may not be cannibalized by the selected potential site for any amount. In these embodiments, setting the cannibalization threshold to zero does not cause the optimization algorithm to ignore the cannibalization value or threshold.

At 5236, the system analyzes which optimization parameter values have been provided and selects appropriate optimization process for the provided parameters. FIG. 30 illustrates three possible scenarios, in which a user may provide a minimum revenue threshold, a minimum profit threshold, and a maximum cannibalization threshold. If the profit threshold received is zero, or if a profit value is not provided at 5238, the system selects the optimization parameters as the minimum revenue threshold and the maximum cannibalization threshold, as shown at 5244. If the revenue threshold received is zero, or not received at all at 5240, the system selects the minimum profit threshold and the maximum cannibalization threshold as the optimization parameters. At 5242, a non-zero revenue threshold, non-zero profit threshold, and a cannibalization threshold are provided. In this scenario, the system selects all three provided thresholds as optimization parameters. Although not shown, those skilled in the art will appreciate that other combinations of optimization parameters, such as using only a revenue threshold and profit threshold or using only a single parameter value, may be used by the unit planning system 302.

Referring back to FIG. 29, an optimization parameter field 5806 is included in the parameter selection screen 5804. The optimization parameter field 5806 allows a user to define one or more optimization parameters to be received by the unit planning system 302 at 506. Optimization parameters may include, for example, a revenue threshold, a profit threshold, an aggregate cannibalization threshold, and a retail unit cannibalization threshold. FIG. 31 is a screen shot of the parameter selection screen 5804 with the optimization thresholds defined by the user. In this embodiment, the user has entered thresholds for all four optimization parameters in the optimization parameter field 5906. A revenue threshold of $650,000, a profit threshold, shown as an EBIDA threshold of $75,000, a maximum aggregate cannibalization of $50,000 and a maximum individual retail unit cannibalization of 12% has been set. Therefore, the market optimization calculation 502 will eliminate all possible seed points that do not have a revenue forecast of at least $650,000, a profit forecast of at least $75,000 or which cause overall market cannibalization of more than $50,000. Additionally, the market optimization calculation 502 will exclude any combination of seed points which cause cannibalization of more than 12% to any existing or planned retail unit.

FIG. 31 also illustrates one way in which a user may select existing retail units or planned retail units for inclusion in the market scenario. A list of existing retail locations 5808 is provided to a user. The list of existing retail locations 5808 includes check boxes at column 5807 that allow a user to select, or deselect, the existing retail units to be included in the market optimization at 504. By selecting a check box associated with an existing retail unit, a user may include the existing retail unit in a market optimization calculation 502. By deselecting the check box, a user may exclude an existing retail unit from the market optimization calculation. A list of potential targets and/or sites 5810 also includes a column 5809 of checkboxes. Selection of a target and/or site, through the use of the check boxes at column 5807, may cause the potential site to be included as a planned retail unit during the market optimization calculation.

Figure 32:
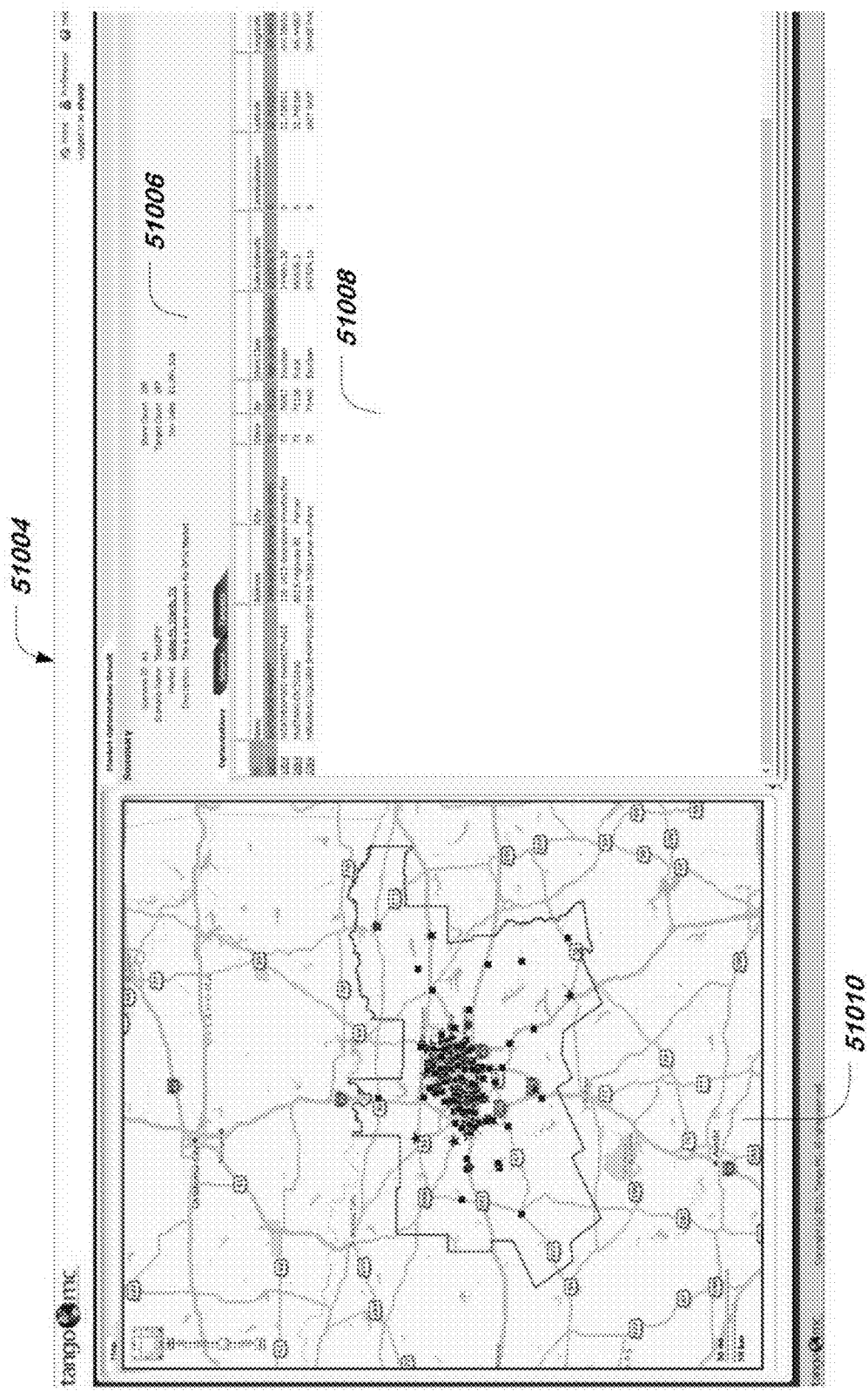
FIG. 32 is a screen shot of one embodiment of the results of a market optimization calculation.

FIG. 32 is a screen shot of one embodiment of the results of a market optimization calculation 502. The market optimization calculation 502 is based on the market scenario and optimization parameters defined in FIGS. 28-34. As can be seen in the results display 51008, the unit planning system 302 produced four target areas that may be added to the defined geographic area to optimize the market. The four selected target areas each display the estimated revenue forecast and the cannibalization effect of the target area on other retail units. As can be seen in the results, one of the selected target areas, 3384, has a revenue forecast less than the threshold of $650,000 defined in FIG. 31. The reduced revenue forecast is the result of an adjusted trade area of the 3384 potential site based on the presence of the other three target areas in the market, as discussed in more detail below with respect to FIGS. 33 and 34. Without the other three selected target areas, the revenue forecast of the 3384 target would exceed the revenue threshold of $650,000 and therefore the potential site was not excluded from the optimization algorithm by the threshold check. However, because the threshold is calculated based on a theoretical trade area in which only the existing retail units and the selected target exist, the revenue forecast for the threshold check is higher than the actual revenue forecast calculated for the corrected trade area of the selected target after the other selected targets are added to the market scenario.

Figure 33:
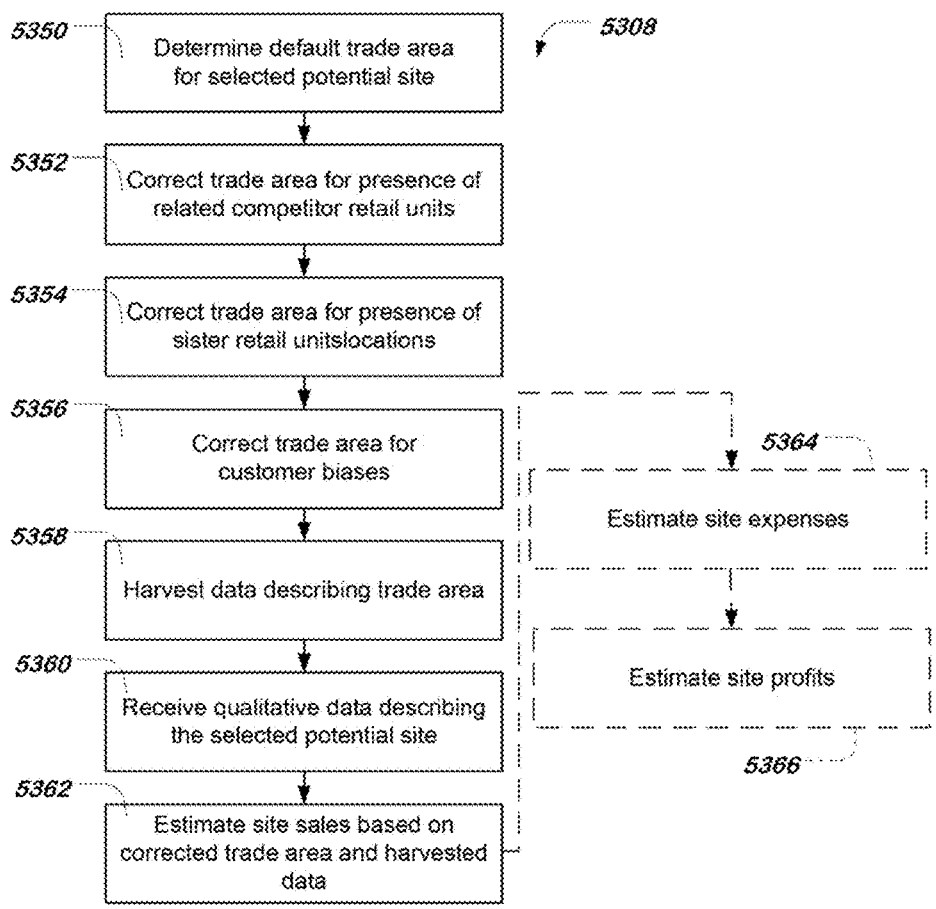
FIG. 33 is a flow chart showing one embodiment of a process flow for generating a revenue and/or profit forecast for a retail unit.

FIG. 33 is a flow chart showing one embodiment of a process flow 5308 for generating a revenue and/or profit forecast for a subject retail unit. The process flow may be implemented, for example, by the unit planning system 302. According to the process flow 5308, the subject retail unit may be any existing and/or potential retail unit. For example, the subject retail unit may be a seed point, an existing retail unit, a target area for placement of a retail unit, a potential site for placement of a retail unit, etc. In some embodiments, the process flow 5308 may be performed, as described above, as a part of the market optimization process flow 502. For example, the process flow 5308 may be executed by the unit planning system 302 to generate a revenue and/or profit forecast for various seed points. In some embodiments, the user may access the functionality of the process flow 5308 via the menu screen 400 (e.g., via the Sales Forecast button 432 as described herein above. Also, in some embodiments, the functionality of the process flow 5308 may be utilized by the unit planning system 302 in performing a pro forma calculation as described herein below.

At 5350, a default trade area is determined for a selected subject retail unit. The trade area may be a geographic area around the subject retail unit from which the subject retail unit would draw a certain percentage of its customers. For example, a trade area may be described as a polygon defined by drive time from the subject retail unit, a neighborhood or city in which the subject retail unit is located, a circle described by a straight line distance from the potential site, or any other suitable geographic area around the subject retail unit. In some embodiments, the trade area may be automatically generated by the unit planning system 302, for example, according to a pre-existing set of parameters. In some embodiments, the trade area may be defined by a user prior to or concurrent with the forecast calculation 5308. In various example embodiments, a trade area may define the geographic area from which 60%-75% of the subject retail unit's customers would be drawn.

After an initial, or default, trade area is defined at 5350, the trade area may be corrected based on one or more correction factors. In various embodiments, the correction factors may include the presence of one or more competitor retail units, one or more sister retail units, or one or more planned retail units. The correction factors may further include directional drive-time biases, natural feature biases, such as, for example, the existence of a river without a bridge or some other natural barrier, or man-made feature biases. At 5352, the forecast calculation 5308 may correct the trade area for the presence of one or more related competitor retail units. A related competitor retail unit may be a retail unit that offers similar or identical products or services as the subject retail unit will offer. For example, in various example embodiments, the subject retail unit may be a prospective location for a coffee shop retail unit. In this embodiment, related competitor retail units may be other coffee shops, such as, for example, STARBUCKS, DUNKIN DONUTS, or CARIBOU COFFEE. In various example embodiments, the subject retail unit may have a single competitor retail unit type, such as, for example, coffee shops. In some embodiments, the subject retail unit may have multiple competitor retail unit types, such as, for example, coffee shops, pastry shops, and gas stations. In various example embodiments, the competitor retail units may be identified by the forecast calculation 5308 based on the type of services or products offered or based on some other criteria, such as, for example, the name of the competitor. In some embodiments, the related competitor retail units may be provided by the user. In some embodiments, the competitor retail units may be provided by the unit planning system 302.

In various example embodiments, the presence of a related competitor retail unit may reduce the default trade area at 5352. The presence of a competitor retail unit within the trade area may reduce the distance that customers are willing to travel to visit the subject retail unit. For example, in the embodiment discussed above, the subject retail unit may be a possible location for a coffee shop. The presence of a competitor coffee shop within the calculated trade area may result in customers choosing the competitor for convenience reasons. If customers consider the products offered at the subject retail unit to be fungible with those offered by a competitor retail unit, the customers may not be willing to drive past the competitor's retail unit to reach the subject retail unit. This may result in a reduction of the theoretical trade area that would not have existed without the presence of a competitor retail unit.

In various example embodiments, the presence of one or more sister retail units may result in a reduction of the default trade area at 5354. A sister retail unit may be a retail unit operated by the company implementing the unit planning system 302. When generating the trade area for a subject retail unit, sister retail units may be considered. Customers within the trade area of a subject retail unit may not drive past a sister retail unit to reach the subject retail unit, and may instead choose to visit a closer sister retail unit. Therefore, the trade area for a subject retail unit may be reduced if sister retail units are located within or near the default trade area. In some embodiments, the reduction in trade area may result in a truncation of the trade area at the intersection between the subject retail unit trade area and the sister retail unit trade area or an overlap between the subject retail unit trade area and the sister retail unit trade area may be permitted. For example, in various example embodiments, some customers who are located in the sister unit's trade area may be inclined to visit the subject retail unit, as the subject retail unit will be a "newer" or "updated" version of the sister retail unit. Some customers located within the subject retail unit's trade area may continue to visit the sister unit out of a feeling of loyalty or habit. In this embodiment, a regression calculation may be applied in the overlap area between the subject retail unit's trade area and the sister unit's trade area to determine the effect of each location on the other, as discussed in more detail below with respect to the forecast calculation.

In various example embodiments, the subject retail unit's trade area may be adjusted based on one or more customer biases at 5356, such as, for example, a drive-time bias. For example, in various example embodiments, a subject retail unit may be located in a northern suburban area surrounding a major city. Customers may have a travel bias in a southern direction, or towards the city. A subject retail unit's trade area may extend twenty minutes in the northern direction, as customers are more likely to be driving from the north into the city, and therefore more traffic may be generated from the northern portion of the trade area. In contrast, the southern portion of the trade area may extend only five minutes from the subject retail unit, as customers are less likely to drive in a northern direction to visit the subject retail unit and may instead prefer to visit a retail unit that is in the bias direction of travel, e.g., to the south. In some example embodiments, a subject retail unit may be located on a roadway which allows only a single direction of travel, such as, for example, a one-way street or a specific side of a highway without easy ingress or egress. By placing a subject retail unit on a roadway allowing only a single direction of travel, customers traveling in the opposite direction may bypass the subject retail unit, as visiting the subject retail unit would require the customer to change their direction of travel. After the trade area has been corrected for the presence of competitor retail units, sister retail units, drive-time biases, and other customer biases, a corrected trade area different from the default trade area may be generated. In various example embodiments, the corrected trade area may be smaller than the default trade area.

The corrected trade area may be used for the forecast calculation 5308. In various example embodiments, the unit planning system 302 may harvest data describing the corrected trade area at 5358. The harvested data may comprise qualitative or quantitative information. In various embodiments, the harvested data may comprise demographic information, competitor sales information, historic sales information, neighborhood information, retail unit format information, psychographic information, traffic generators, or projected changes to the trade area (such as the closing of other retail units or the addition of new residential properties). In various example embodiments, the data may be provided by one or more data systems integrated with the unit planning system 302 by the integration layer 310, such as, for example, the accounting system 324, the personnel system 326, the real estate system 330, the CRM system 332, the demographic system 334, or any other suitable integrated data system.

In various example embodiments, qualitative data about the subject retail unit may be received by the forecast calculation 5308 at 5360. The qualitative data may comprise information about the potential site provided by the unit planning system 302, such as, for example, accessibility, visibility, signage, or parking. In some embodiments, the qualitative data may be user-provided, provided through the integration layer 310, or both. Each of the qualitative factors may have a score indicating the qualitative value of the factor. The scores may be used individually during the forecast calculation 5308 or may be aggregated into an overall site score for use during the forecast calculation 5308. Those skilled in the art will recognize that any suitable qualitative factors may be used by the forecast calculation 5308.

At 5362, a forecast is generated for the subject retail unit based on the corrected trade area, harvested data, the received quantative factors, the received scores indicating qualitative values, and a forecast equation. In various example embodiments, the forecast may comprise a revenue forecast. The revenue forecast may indicate an estimated revenue of the subject retail unit per year based on the provided trade area and harvested data. In various example embodiments, the revenue forecast may be based on one or more retail unit models generated for the subject retail unit. A retail unit model may be based on one or more retail unit characteristics, such as, for example, floor space, retail unit type, projected staff levels, seating, amenities, specialty services, sales margins, or any other suitable retail unit characteristic. In various example embodiments, the retail unit models may be tied to one or more neighborhood types. For example, in various example embodiments, two retail unit models may be available, a first model comprising a coffee shop with a drive-through and a second model comprising a coffee-shop without a drive-through. The first model may be tied to neighborhoods classified as, for example, suburban, rural, or high-vehicle traffic neighborhoods. The second model may be tied to neighborhoods classified as urban, high-foot traffic neighborhoods, or vehicle restricted. As another example, a first model may comprise a coffee shop with a drive-through for placement within a suburban town. A second model may comprise a coffee shop with a drive-through for placement along a major highway. Although both models comprise coffee shops with a drive-through, the retail unit characteristics of each model may vary based on the intended neighborhood for that model. In various example embodiments, one or more models may be associated with one or more neighborhoods and a revenue forecast may be performed for each of the one or more models associated with a specific neighborhood type. Revenue may be expressed as any suitable financial measure, such as, for example, operating revenues such as sales revenue, fee revenue, service revenue or non-operating revenues such as interest revenue, rent revenue, etc.

In various example embodiments, the revenue forecast calculation may be performed using a regression equation based on the selected model. In some embodiments, the regression equation may be a linear regression, a polynomial regression, or any other suitable regression equation. In some embodiments, weighted factors for the regression equation are determined by building sales bands around the subject retail unit. Each sales band may comprise a geographic area a predetermined distance from the subject retail unit. For example, in some embodiments, the sales bands may comprise a plurality of geographic areas defined by successive rings around the subject retail unit. For example, the sales bands may comprise a half-mile circle around the subject retail unit, a first ring encompassing an area located at least a half-mile from the subject retail unit but not greater than one mile from the subject retail unit, a second ring encompassing an area located at least one mile from the subject retail unit but not more than one-and-a-half miles from the subject retail unit, and a third ring encompassing an area at least one-and-a-half miles from the subject retail unit but not more than two miles from the subject retail unit. In some embodiments, the sales bands may be defined by one or more drive times from the subject retail unit, such as, for example, an area with a drive-time three minutes from the subject retail unit, an area with a drive-time at least three minutes but not greater than five minutes from the subject retail unit, an area with a drive-time at least five minutes but not greater than seven minutes from the subject retail unit, and an area with a drive time at least seven minutes from the subject retail unit. In various example embodiments, the sales bands may extend beyond the corrected trade area previously calculated at 5356.

In various example embodiments, data for each sales band is harvested to calculate the potential revenue from the selected band. For example, in various example embodiments, each sales band may comprise demographic information, psychographic information, zoning information, a business count, an employee count, competitor information, and a resident count. In various example embodiments, for each sales band, weighting factors are applied to the harvested data as part of the sales forecast calculation. For example, in various example embodiments, the subject retail unit may be a potential site for a restaurant. In this embodiment, competitor restaurants within a two-minute drive of the subject retail unit may have a large impact on sales, and therefore the competitor information would have a high weighting value. However, competitor restaurants between a two and ten minute drive of the subject retail unit may only have a weighting factor that is half the value of restaurants located within a two-minute drive, and competitor restaurants located beyond a ten-minute drive may have a negligible affect and therefore are assigned a low or zero weighting factor.

In various example embodiments, a regression equation with different weighting factors may be calculated for each band to determine estimated revenue for that band. For example, in various example embodiments, a regression equation for a given band may comprise demographic variables, such as, for example, the median household income of the band, the population distribution of the band, the historical buying data of the band, etc. A regression equation may also include site feature variables, such as, for example, access, signage, visibility, strategic position, or number of parking spots. The demographic values, site feature values, or any other values included in the regression function may be affected by a weighting factor. The weighting factors for the regression equation may vary from band to band.

In various example embodiments, the retail unit model may define the weighting factors for the harvested data associated with each sales band. For example, in various example embodiments, a retail unit model may include the following rules for the regression model: population density affects revenue within a half-mile radius of the subject retail unit; household income affects revenue within a fifteen-minute drive-time of the subject retail unit; competitors affect revenue within a two-minute drive time around the subject retail unit. In this embodiment, the regression equation may consist of three variables, the population within a half-mile, the household income within a fifteen-minute drive, and competitors within a two-minute drive. Each of these factors may be weighted and a revenue forecast is generated based on the weighted factors in the regression equation.

In various example embodiments, the revenue forecast calculation may be tested by applying the forecast function to one or more existing retail units and comparing the forecast data with known, historic revenue data. If the revenue forecast calculation is accurate, the forecasted revenue and the actual revenue of the test retail unit should be within a statistically insignificant margin of error. Once the revenue forecast calculation is confirmed as accurate through testing, the revenue forecast calculation may be applied to one or more subject retail units.

In some embodiments, the revenue forecasting calculation may be performed by using one or more customer profiles. In this embodiment, the one or more customer profiles are generated based on actual customer data. For example, the customer data may be accessed by the unit planning system 302 from a CRM system 332 via the integration layer 310. The unit planning system 302 may use customer data such as, for example, customer life-stage, family size, income level, historical buying habits, or any other suitable customer data, to generate the one or more customer profiles. In various example embodiments, the unit planning system 302 may utilize one or more rules associated with each of the one or more customer profiles. For example, in various example embodiments, a customer profile may have a rule that the customer is willing to travel 2 miles and spend $20.00 per trip to a retail unit. A second customer profile may have a rule that the customer is willing to travel 3 miles but will only spend $10.00 per trip to the retail unit. The one or more customer profiles are used to generate an aggregate plan that may be applied to specific demographic information to determine the behavior of potential customers within a given geographic area.

In various example embodiments, the revenue forecast model may apply the aggregate plan based on the customer profiles to one or more census blocks. A census block comprises the smallest geographic area for which census data is released. By applying the aggregate plan to one or more census blocks located near the subject retail unit, the revenue forecasting model can estimate the number of customers of each profile per block and, using the information included with each customer profile, estimate the total revenue for the subject retail unit. In various example embodiments, a total dollar value may be calculated for each block. The total dollar value may be reduced by one or more reduction factors, such as a distance factor, determined by the customer profile for the census block. The reduced total dollar value is added to the forecast value for the revenue of a subject retail unit.

In various example embodiments, the forecast generated by the unit planning system 302 by execution of the process flow 5308 may be a profit forecast for the subject retail unit. As can be seen in FIG. 33, a profit forecast may be calculated by adding additional actions to the revenue forecast discussed above. After the revenue forecast calculation is complete, by applying a revenue forecast model, such as, for example, using one or more retail unit models as discussed above, the operating expenses for the subject retail unit may be calculated at 5364. The one or more retail unit models may comprise one or more expense elements, such as, for example, staffing costs, product overhead costs, general utility estimations, average rental costs, or any other suitable expense item. In some embodiments, specific expense information may be provided for the subject retail unit, such as, for example, a rental amount negotiated with the landlord of the subject retail unit. In some embodiments, a combination of retail unit model expenses and potential site specific expenses may be used to estimate the total site expenses. The site specific expense and ritual unit model expenses may be provided, for example, by the user, the unit planning system 302 or any other suitable data source. In various example embodiments, a simple profit forecast may be performed by subtracting the total site expenses from the revenue forecast. Profit may be expressed by any suitable financial measure, such as, for example, gross profit, earnings before interest, taxes, depreciation, and amortization (EBITDA), earnings before interest and taxes (EBIT), earnings before tax (EBT), earnings after tax, net profit after tax, or retained earnings.

In various example embodiments, the unit planning system 302 may be programmed to determine a cannibalization value for a subject retail unit. For example, cannibalization values may be determined as a part of the market optimization process flow 502, the pro forma calculation described herein, etc. Cannibalization may describe the degree to which the revenue, profits, etc., of one retail unit reduce or are reduced by the revenue and/or profits of another sister retail unit. For example, a planned retail unit located five minutes from an existing retail unit may have a revenue forecast of $1,000,000 but may cause the existing retail unit to lose $500,000 in revenue. Therefore, the net gain in revenue may only be $500,000 and may result in the existing retail unit being unprofitable. Although the cannibalization process flow 5508 is discussed with respect to the market optimization calculation 502, those skilled in the art will recognize that the cannibalization calculation 5508 may be used as a stand-alone function of the unit planning system or as part of another process performed by the unit planning system 302.

Figure 34:
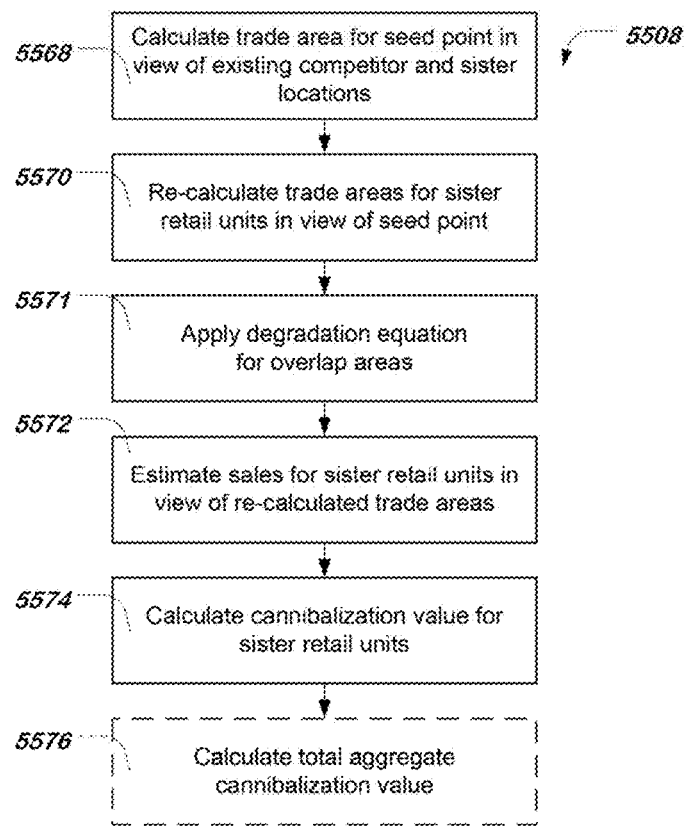
FIG. 34 is a flow chart showing one embodiment of a process flow for determining a cannibalization value.

FIG. 34 is a flow chart showing one embodiment of a process flow 5508 for determining a cannibalization value. In various example embodiments, at 5568, the trade area for a subject retail unit may be calculated. The trade area calculation for cannibalization is similar to that discussed above with respect to the forecast calculation 5308. For example, the trade area for the subject retail unit is generated by selecting a default trade area and adjusting the trade area in response to the presence of one or more factors, such as, for example, competitor retail units, sister retail units, drive-time biases, or any other suitable factors. As discussed above with respect to the forecast calculation 5308, a corrected trade area is generated for the subject retail unit.

In various example embodiments, new trade areas are calculated for one or more sister retail units located within a certain distance of the subject retail unit. For example, in various example embodiments, new trade areas may be calculated for all sister retail units located within a geographic area defined by a thirty-minute drive time from the subject retail unit or may be calculated for all sister retail units having a trade area that overlaps the trade area of the subject retail unit. The new trade areas are calculated in the same manner as that discussed above with respect to the forecast calculation 5308. The presence of a retail unit at the subject retail unit may result in a truncated or reduced trade area for the existing retail unit. In various example embodiments, an area of overlap may exist between the trade area for the existing retail unit and the trade area calculated for the subject retail unit. This area of overlap may be referred to as a "shadow" cast by a sister retail unit on the trade area of another retail unit. In the area of the "shadow," customers may patronize either the subject retail unit or the existing retail unit. In various example embodiments, one or more equations may be applied to the area of overlap to determine a percentage distribution of revenue allocated to each of the affected retail units from the overlap area. In various example embodiments, the one or more equations may comprise a distance versus time function, a distance convenience function, a distance curve, or any other suitable distribution equation. In various example embodiments, the one or more equations applied to the area of overlap may be based on historic location data. In various example embodiments, the impact that new retail units had on existing retail units in similar locations is considered, and an algorithm is built to quantify the effect based on historic data. In various example embodiments, one or more rules of thumb may be included in the algorithm, such as, for example, if the subject retail unit and the existing retail unit are equal distance from a census block, the potential revenue from the census block are split at a predetermined percentage, such as, for example, 33-50%.

In various example embodiments, a revenue or profit forecast may be performed for the existing retail unit using the new trade area. The revenue forecast calculation, as discussed above, produces an estimated revenue value for a potential site based on trade area and other input. The revenue forecast for the existing retail unit produces a revenue value that has been reduced by the cannibalization effect of a retail unit located at the subject retail unit, based on the new trade area for the existing retail unit. The cannibalization amount may be determined by subtracting the forecasted revenue value from historic revenue values of the existing retail unit. The difference between the revenue values is the retail unit cannibalization amount, expressed in dollars, that a retail unit at the subject retail unit would have on the existing retail unit.

In some embodiments, the retail unit cannibalization amount may be determined by taking the current revenue values for the existing retail unit, and subtracting the estimated revenue value of one or more geographic areas that were removed from the corrected trade area of the existing retail unit. For example, in various example embodiments, the placement of a retail unit at a subject retail unit may result in a reduction of the trade area for an existing retail unit. The reduction in trade area may result in the loss of one or more geographic areas (e.g., census blocks) from the trade area. In addition, the corrected trade area may comprise one or more geographic areas shared between the existing retail unit's corrected trade area and the subject retail unit's trade area. The areas of overlap may result in a reduction, by a calculated percentage, of revenue produced for the existing retail unit from that geographic area. For example, a subject retail unit may be a location near an existing retail unit. The trade area for the existing retail unit may be corrected, based on a retail unit located at the subject retail unit, such that the corrected trade area loses three census blocks and now shares two census blocks with the subject retail unit. The total revenue for the existing retail unit will be reduced by the revenue value calculated for the three lost census blocks and by a percentage value for the two shared census blocks. The reduction in total revenue is the cannibalization amount caused by the subject retail unit on the existing retail unit.

In various example embodiments, the trade area of the one or more existing retail units may not be adjusted. The trade areas for the one or more existing retail units may be held constant, and only the area of overlap, or the "shadow" area, may be considered as affecting the revenue of the existing retail units. In this embodiment, only the equations for the area of overlap may be applied to calculate a reduction in revenue of the existing retail unit caused by the "shadow" of a planned retail unit located at the subject retail unit.

In various example embodiments, an aggregate cannibalization amount may be calculated. The aggregate cannibalization amount may be, in various embodiments, the total amount of cannibalization caused by one or more subject retail units to all existing retail units located within the market or the total amount of cannibalization caused by one or more subject retail units to a single existing retail unit. The aggregate cannibalization amount may comprise the cannibalization amount caused to all existing retail units by one or more target locations, the cannibalization amount caused to all existing retail units and target locations caused by one or more selected seed points, the total cannibalization caused by multiple subject retail units to a single existing retail unit, or any combination thereof. For example, in various example embodiments, three potential sites may be selected that, individually, cause a four percent cannibalization to an existing retail unit. Although the individual cannibalizations may each be below a given threshold, such as, for example 10% cannibalization, the aggregate cannibalization caused to the existing retail unit is 12%, which exceeds the cannibalization threshold, and therefore the combination of the three subject retail units violates the cannibalization threshold. The total aggregate cannibalization may be expressed in dollars, percentage of revenue per retail unit, percentage of total revenue for the market, or any other suitable metric.

In various embodiments, the unit planning system 302 may provide users with pro forma functionality for evaluating potential sites for placement of a retail unit. For example, the unit planning system 302 may be configured to calculate and/or aggregate various data describing a subject site such as, for example, revenue forecasts, profit forecasts, net present value and internal rate of return. In some embodiments, data describing the subject site may be organized into an income statement. The pro forma functionality of the unit planning system 302 may be accessed in any suitable manner. For example, referring to the menu screen 400 of FIG. 5, the user may select the pro forma button 438. Also, in some embodiments, pro forma functionality of the unit planning system 302 may be accessed directly from a site-related screen, such as the site summary screen 4200 and/or the site screen 4202.

Figure 35:
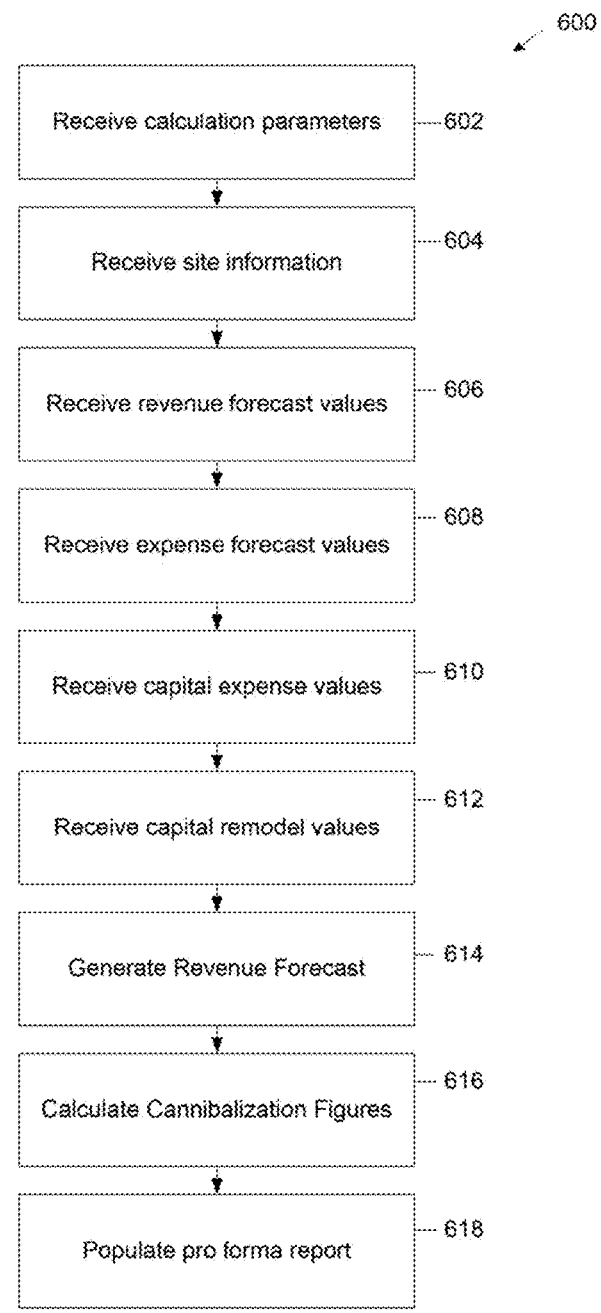
FIG. 35 is a flow chart showing one embodiment of a process flow that may be executed by the unit planning system to implement a pro forma functionality for a subject site.

FIG. 35 is a flow chart showing one embodiment of a process flow 600 that may be executed by the unit planning system 302 to implement the pro forma functionality for a subject site. At 602, the unit planning system 302 may receive calculation parameters for the pro forma calculation. The parameters may include, for example, a term of analysis, the tax and discount rates to be applied to cash flows from the site, methods of characterizing the revenue forecast (e.g., aggregate, category, by area, etc.), and the method of forecasting growth in revenue in expenses during out years, etc. The term of the analysis, for example, may comprise a plurality of periods (e.g., months, years, quarters, etc.).

In various embodiments, the unit planning system 302 may receive parameter values for every pro forma calculation performed. In some embodiments, the unit planning system 302 may be programmed to save calculation parameter templates indicating predetermined sets of parameter values. This may allow the user to select a saved template rather than provide all parameter values for each pro forma calculation. In some embodiments, templates include parameter values that are common to different types of subject sites. In some embodiments, the user may modify parameter values in a template, for example, to customize a pro forma calculation for site-specific factors.

Figure 36:
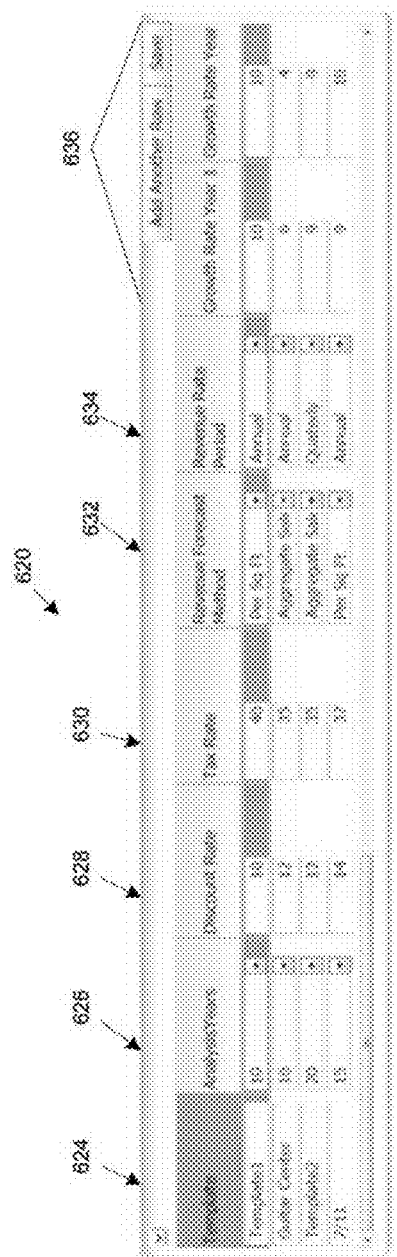
FIG. 36 is a screen shot showing one embodiment of a template screen that may be provided to the user to receive values for template variables.

FIG. 36 is a screen shot showing one embodiment of a template screen 620 that may be provided to the user to receive parameter values. The template screen 620 comprises a table with values for different pro forma model parameters (columns) for various templates (rows). A Template column 624 indicates a name for each template. An Analysis Years column indicates a period for the pro forma calculation for each template (e.g., in years). A Discount Rate column 628 provides a field for entering a discount rate to be applied to the pro forma calculation for each template. The discount rate may be used, for example, as described herein, to determine the net present value of site cash flows. A Tax Rate column 630 may indicate a tax rate to be assumed for the pro forma calculations in each template. A Revenue Forecast Method column 630 may indicate a selected revenue forecast method. A Revenue Rate Period column 634 may indicate a period over which revenue from the site will be forecast (e.g., annually, quarterly, etc.). Growth rate columns 636 indicate for each template assumptions that will be made about the growth of revenue. For example, the revenue forecasting methods described herein are based, at least in part, in the current demographics and other factors surrounding a site. To project revenue forecasts into the future, however, it may be necessary to assume a rate of change or growth rate for revenues. In some embodiments, pro forma parameters may specify a year-by-year growth rate for each year of the pro forma calculation period. If no growth rate is provided for a given year, then the growth rate from the previous year may be carried over. Although not illustrated in FIG. 36, the pro forma parameters may also describe a growth in expenses, which may be separately modeled and/or may be forecast to track revenue. For example, expenses may be modeled as a percentage of sales revenue, as a separate aggregate estimate, or as a rate per square foot. If the aggregate or per square foot method is used, a growth rate for expenses may also be entered.

Referring back to FIG. 35, at 604, the unit planning system 302 may receive site information. Site information may be specific to a given site or type of site. Examples of site information may include, a site name, a site size, a site type, a division of the implementing company associated with the site, the site address, an expected open date for the site, etc. In some embodiments, the site information may also comprise values for calculation parameters such as the analysis term, the discount rate and the tax rate.

Figure 37:
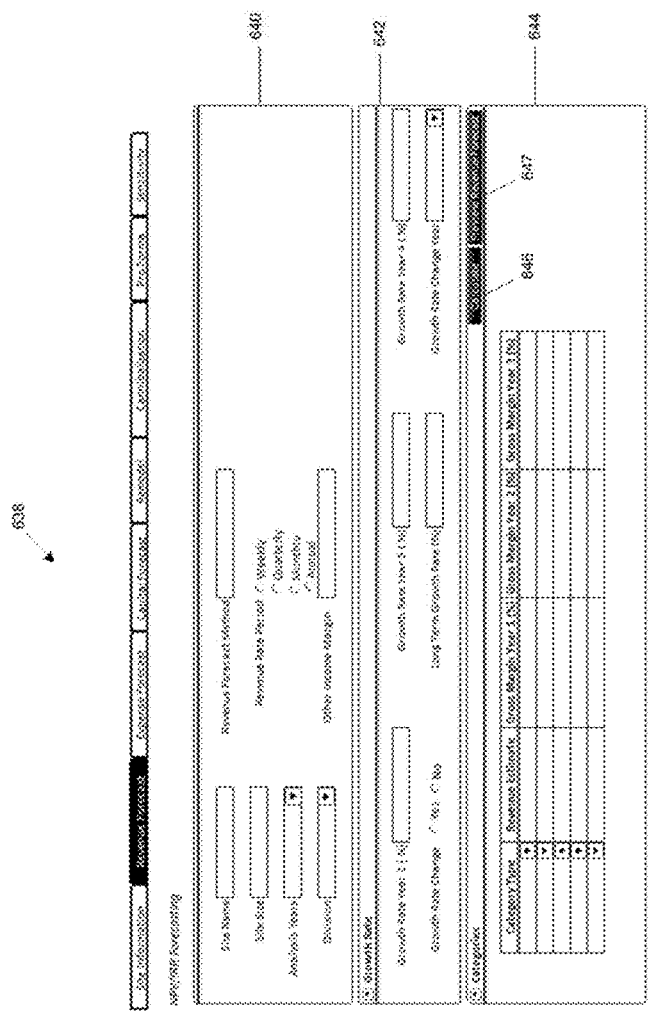
FIG. 37 is a screen shot showing one embodiment of a Revenue Forecast screen for receiving values for forecasting site revenue.

At 606, the unit planning system 302 may receive values for forecasting site revenue. FIG. 37 is a screen shot showing one embodiment of a Revenue Forecast screen 638 for receiving values for forecasting site revenue. A field 640 may comprise fields for receiving site information such as the site name, the site size, the analysis years, a division of the implementing company associated with the site, a revenue forecast method, a revenue rate period, etc. In some embodiments, the field 640 also comprises an Other Income Margin field for receiving a margin indication to be utilized in the pro forma calculation.

A Growth Rate field 642 may comprise various fields for receiving information about assumed growth rates for the pro forma calculations. For example, growth rate values may be entered for early years of the site (years 2, 3 and 4, for example). Also, a long term growth rate may be entered. During the pro forma calculations, the early year growth rates may be applied until a growth rate change year, at which point the long term rate may be applied. A Categories field 644 may receive data describing revenue categories and may be utilized, for example, if the category method of revenue forecasting is used. Each revenue category may correspond to a particular type of product or service sold. In some embodiments, one or more categories may have start and end dates based on when the revenue is expected to begin or end. Also, in some embodiments, the field 644 may receive gross margin values over all or part of the analysis term by category. For example, revenue from different categories of sales may have different gross margin rates. It will be appreciated that when the per square foot revenue forecasting method is selected, the revenue forecast values received at 606 may also comprise an indication of the allocation of space at the site and a revenue per square foot. A Calculate button 446, when selected, may cause the unit planning system 302 to perform the pro forma calculation (e.g., based on data already entered). A Preview Revenue Forecast button 647, when selected, may cause the unit planning system 302 to generate a preview of the revenue forecast portion of the pro forma calculation, for example, as described herein. Some or all of the values in screen 638 may be pre-populated, for example, based on values for a selected template, values for calculation parameters, and/or site information previously received by the unit planning system 302.

Figure 38:
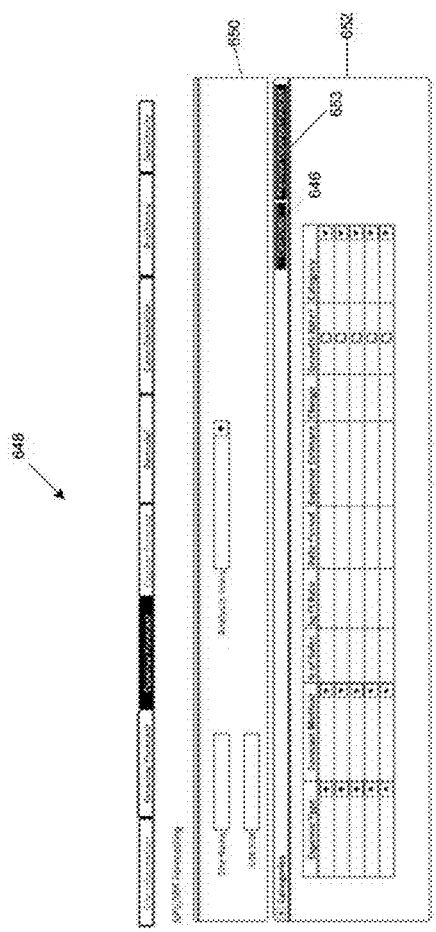
FIG. 38 is a screen shot showing one embodiment of an Expense Forecast screen for receiving expense forecast values.

Referring now back to the process flow 600, at 608, the unit planning system 302 may receive expense forecast values. Expense forecast values may describe parameters used by the unit planning system 302 to forecast expenses over the analysis term. FIG. 38 is a screen shot showing one embodiment of an Expense Forecast screen 648 for receiving expense forecast values. The screen 648 comprises a field 650 that may comprise data describing the site and/or calculation parameter values such as site name, site size, analysis years, etc. An expense field 652 may receive various data describing expenses including, for example, an expense type, a method by which the expense type will be forecast (e.g., as a percentage of sales, as a rate per square foot over a given period, as a raw estimate), whether the expense is fixed or changes with time, a growth rate for the expense, a category for the expense (e.g., a revenue category to which the expense is tied), etc. In addition to the Calculate button 446, as described above, the Expense Forecast screen 648 may also comprise a Preview Expense Forecast button 653 that, when selected, may cause the unit planning system 302 to generate a preview of the expense forecast portion of the pro forma calculation.

Figure 39:
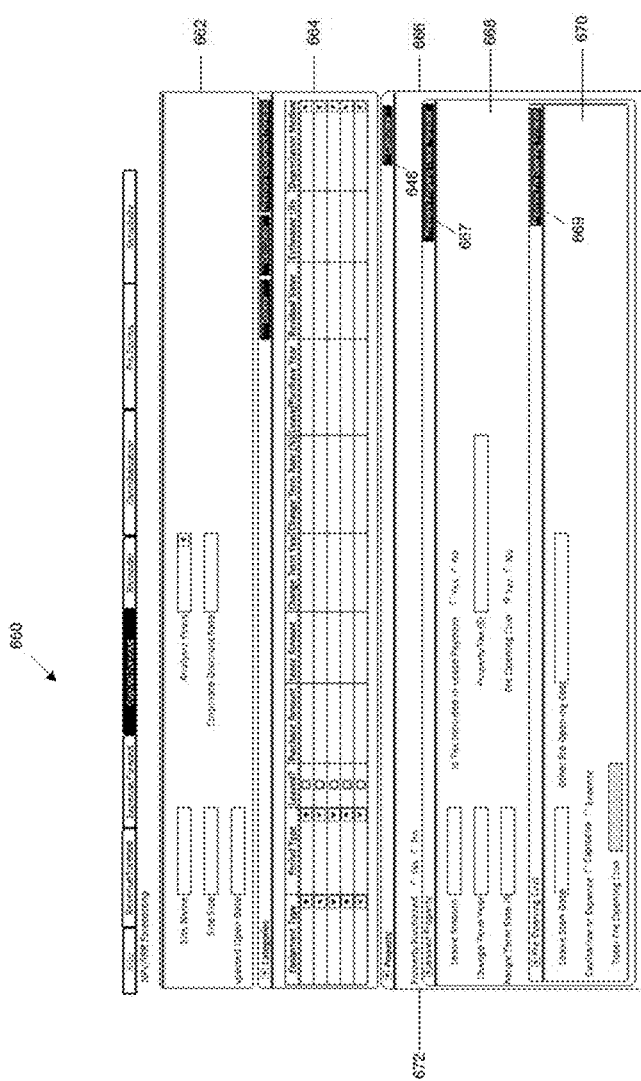
FIG. 39 is a screen shot showing one embodiment of a Capital Forecast screen for receiving capital expense values.

Referring again back to the process flow 600, at 610, the unit planning system 302 may receive capital expense values. Capital expense values may describe parameters utilized by the unit planning system 302 to forecast capital expenses over the analysis term. FIG. 39 is a screen shot showing one embodiment of a Capital Forecast screen 660 for receiving capital expense values. The screen 660 comprises an information field 662 that includes information about the site including, for example, the site name, the site size, the site's expected open date, the analysis term or years, and the discount rate. A Categories field 664 comprises fields for receiving information regarding capitalized assets that will be utilized by the site. The Categories field 664 may receive, for each asset, an asset type, an amortization period type, an indication of whether the asset is purchased or leased, a purchase amount and/or lease amount, etc. If the asset is leased, the field 664 may also receive an indication of a year where the lease terms change, and an associated term rate. The field 664 may also receive, for each asset, a year in which it was purchased or leased, a residual value, an estimated life, and a depreciation method.

A Property field 666 may receive information describing the physical property on which the sited is located. At 672, the field 666 may receive an indication of whether the property is purchased or leased. If the property is leased, a Leased Property field 668 may receive indications of the lease amount, a year (if any) in which the lease terms change, a rate at which the lease terms change, whether tax is included in the lease payment and, if so, a tax amount, and whether there are pre-opening costs. A Preview Property Lease Forecast button, 667, when selected, may cause the unit planning system 302 to provide a preview of forecast property-lease related values. If pre-opening costs exist, a Pre-Opening Cost field 670 may receive a lease start date or other pre-opening costs and an indication of whether the pre-opening costs will be expensed or capitalized. A Preview Pre-Opening Forecast button 669, when selected, may cause the unit planning system 302 to provide a preview of forecast pre-opening expense related values.

Figure 40:
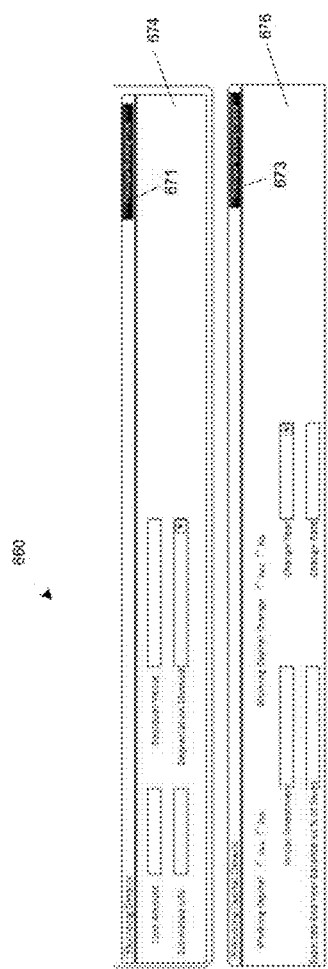
FIG. 40 is a screen shot showing one embodiment of a portion of the Capital Forecast screen of FIG. 39 including a Building Details field and a Working Capital field.

If the property is purchased, the unit planning system 302 may receive additional information (e.g., instead of the information received at the Property field 666). FIG. 40 is a screen shot showing one embodiment of a portion of the Capital Forecast screen 660 including a Building Details field 674 for receiving capital values premised on purchase of the site. For example, the field 674 may receive a cost amount (e.g., amount to purchase the property), an estimated life of the property, a residual value of the property, and a depreciation method for the property. A Preview Building Costs Forecast button 671, when selected, may cause the unit planning system 302 to provide a preview of forecast building cost related values. In some embodiments, the unit planning system 302 allows the user to capitalize interest paid on the purchase of the site property. For example, retailers that develop properties over extended periods may capitalize interest costs of development. FIG. 40 also illustrates a Working Capital Details field 676 for receiving capital expense values related to working capital at the site. For example, if significant cash or working capital is to be utilized in the start-up and/or operation of the retail location at the site, then the user may indicate so at field 676. The Field 676 may receive, for example, an indication of whether working capital is to be used, an initial investment, or initial amount of working capital, an expected end year balance of working capital as a percentage of sales, an indication of whether a working capital amount is to change and, if so, a change year and a change rate. A Preview Working Capital button 673, when selected, may cause the unit planning system 302 to provide a preview of forecast working capital related values.

Figure 41:
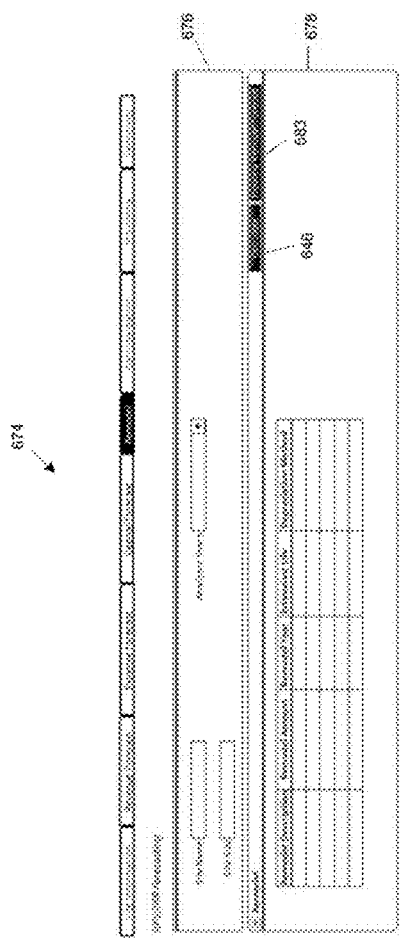
FIG. 41 is a screen shot showing one embodiment of a Remodel screen for receiving capital remodel values.

Referring back to the process flow 600, at 612, the unit planning system 302 may receive capital remodel values. For example, retail sites may require regular remodeling such that remodeling expenses should be considered a planned capital expense. FIG. 41 is a screen shot showing one embodiment of a Remodel screen 674 for receiving capital remodel values. A site information field 676 may display and/or receive general information about the site including, for example, a site name, a site size, and an analysis term. A Remodel field 678 may receive descriptions of planned remodels, costs for each remodel, a year for each remodel, an estimated life of each remodel, and a depreciation method. A Preview Remodel Forecast button 680, when selected, may cause the unit planning system 302 to provide a preview of forecast remodel related values.

Figure 42:
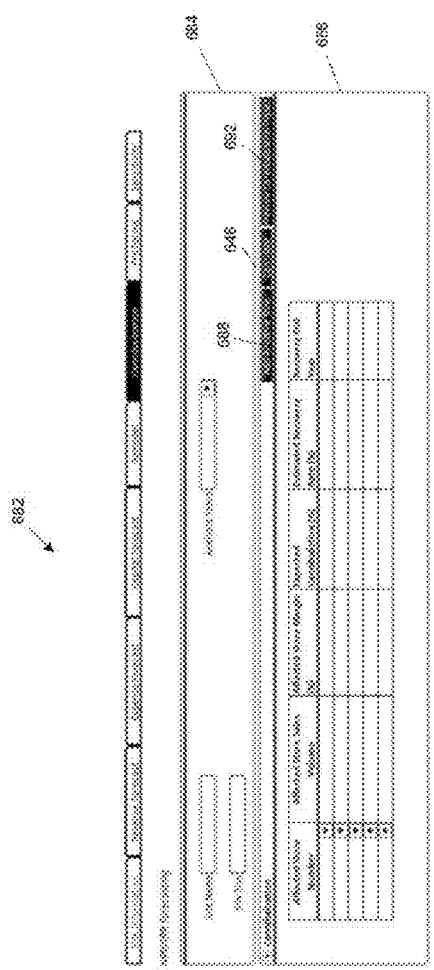
FIG. 42 is a screen shot showing one embodiment of a Cannibalization screen for receiving and/or providing cannibalization values.

Referring again back to the process flow 600, at 614, the unit planning system 302 may optionally generate a revenue forecast based on the received data describing the site. The revenue forecast may be generated, for example, as described herein with respect to FIG. 33. In some embodiments, revenue estimates may be received from the user. For example, the user may select revenue estimates and/or utilize revenue estimates generated by another model. At 616, the unit planning system 302 may optionally calculate cannibalization values indicating revenue that the site will cannibalize from planned or existing retail units of the implementing company. FIG. 42 is a screen shot showing one embodiment of a Cannibalization screen 682 for receiving and/or providing cannibalization values. The cannibalization screen 684 may comprise a site information field 684 that may indicate the site name, size and analysis term. A Cannibalization field 686 may receive and/or provide cannibalization values. For example, the field 686 may list affected stores (e.g., planned or existing retail units of the implementing company that are forecasted to lose sales on account of the site). For each affected store, the field 686 may list sales volume, margin, a cannibalization amount (e.g., amount lost to the site), a recovery rate (e.g., a rate at which a portion of the lost sales are regained) and a recover end year (e.g., a point at which recovery stops). The values for the field 686 may be provided by the user and/or calculated by the unit planning system 302, as described herein.

Figure 43:
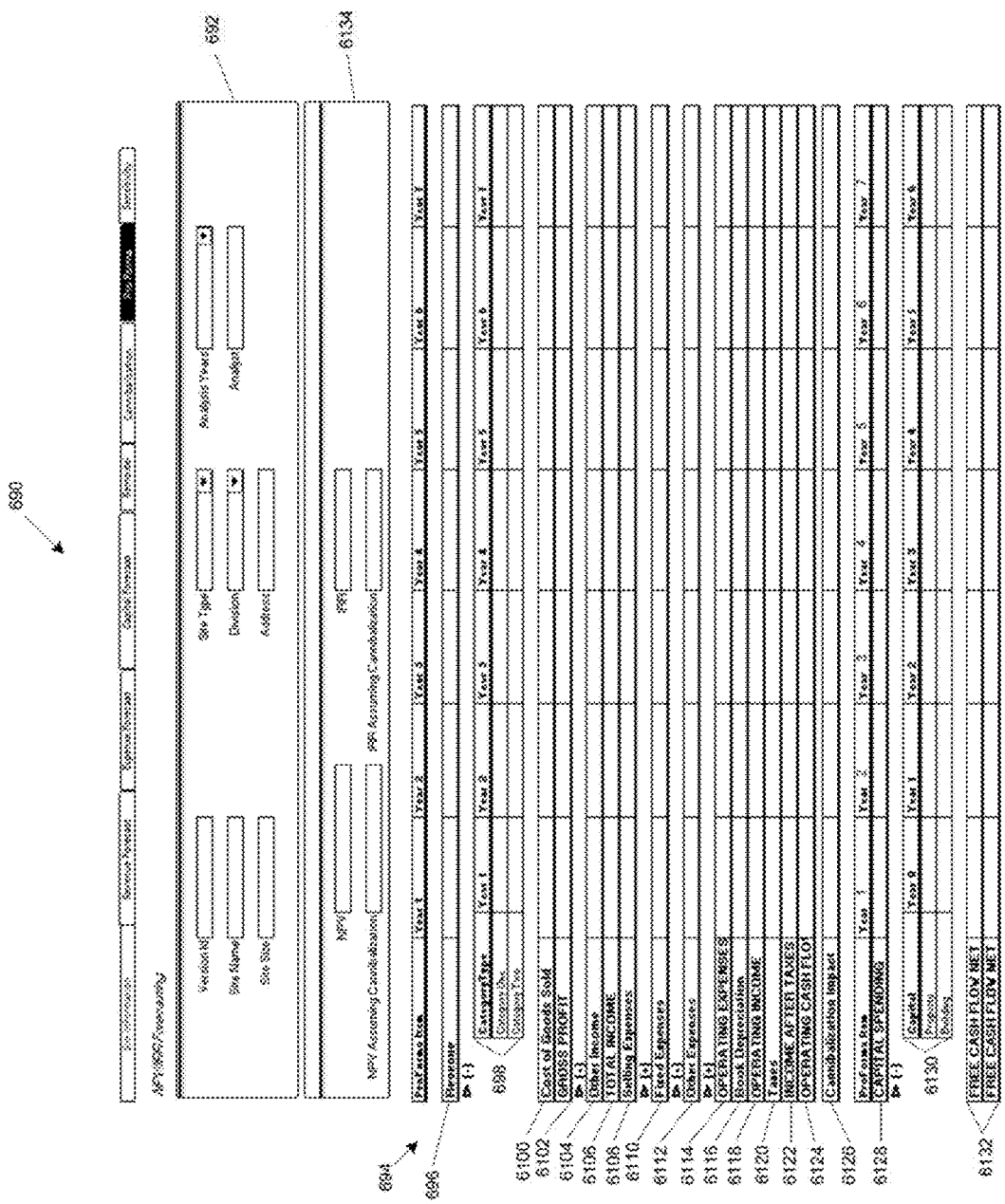
FIG. 43 is a screen shot showing one embodiment of a Pro Forma screen.

Referring back to the process flow 600, at 618, the unit planning system 302 may populate a pro forma calculation report for the site. The pro forma calculation report may comprise an income statement indicating revenue, expenses, profit, cannibalization, etc. for the subject site. FIG. 43 is a screen shot showing one embodiment of a Pro Forma screen 690 showing a pro forma income statement. The income statement may be displayed at a Pro Forma Item field 694. The Pro Forma item field 694 may list forecasted values for various revenues, expenses, profits, cannibalizations, etc. over the analysis term. In the example shown in FIG. 43, the analysis term is seven years. A Revenue line 696 may list forecasted revenue figures for the subject site over the analysis term. Category lines 698 may be utilized if the category revenue forecasting method is used and may show revenue forecasts over the analysis term broken down by category. In embodiments where a per square foot or other area-based forecast method is used an additional field (not shown) may display revenue across the analysis term broken down by square foot. The values for revenue provided at the Pro Forma Item field 694 may be generated, for example, as described above with respect to 614.

A Cost of Goods Sold line 6100 may display forecasted values for the cost of goods sold at the subject site over the analysis term. The cost of goods sold may be determined by the unit planning system 302, for example, considering expense values entered at 608. A Gross Profit line 6102 may display forecasted values for gross profit of the subject site over the analysis term. For example, the gross profit may be calculated by taking a difference of revenue over the cost of goods sold. An Other Income line 6104 may indicate other income forecasted to be generated by the subject site over the analysis term. A Total Income line 6104 may indicate the total income to be generated by the subject site over the analysis term. The total income, for example, may be the sum of the revenue at line 696 and other income at line 6104. A Selling Expenses line 6108 may indicate selling expenses forecast to be incurred by the site. The selling expenses, for example, may be determined based on the expense forecast values received at 608. A Fixed Expenses line 6110 may indicate fixed expenses forecast to be incurred by the subject site over the analysis term. Fixed expenses may include, for example, lease expenses, mortgage expenses, etc. and may be determined, for example, based on the values received at 604, 608, etc. An Other Expenses line 6112 may indicate any other expenses forecast to be incurred by the subject site over the analysis term. The other expenses may be determined, for example, based on the expense forecast data received at 608. An Operating Expenses line 6114 may indicate operating expenses forecast to be incurred by the subject site over the analysis term. The operating expenses may be determined, for example, based on the expense forecast data received at 608.

A Book Depreciation line 6116 may indicate depreciation forecast to be taken by the subject site over the analysis term. The book depreciation values may be determined, for example, based on data received at 610 and 612. An Operating Income line 6118 may indicate operating income forecast to be generated by the subject site over the analysis term. The operating income may be determined, for example, based on data received at various other actions of the process flow 600. A Taxes line 6120 may indicate taxes forecast to be paid by the subject site over the analysis term. Values for the taxes may be determined, for example, based on a tax rate received at 602 and the calculated revenue for the subject site. An Income After Taxes line 6122 may indicate income for the subject site less taxes over the analysis term. An Operating Cash Flow line 6124 may indicate operating cash flow for the subject site over the analysis term. The operating cash flow may be determined in any suitable manner. A Cannibalization Impact line 6126 may indicate the impact of the subject site on the revenue of sister sites over the analysis term. The periodic cannibalization may be stated in any suitable manner, for example, as a dollar value, a percentage of revenue, etc. Cannibalization values may be calculated, for example, as described herein with respect to 616. A Capital Spending line 6128 may indicate planned capital spending for the subject site over the analysis term. The line 6128 may indicate total forecast capital spending. Lines 6130 may indicate a breakdown between capital spending of different categories (e.g., property, building, equipment, etc.). A Free Cash Flow Net line 6132 may indicate the free cash flow forecast to be generated by the subject site over the analysis term. For example, the free cash flow may be the operating cash flow minus capital spending.

The Pro Forma screen 690 may also include a field 6134 comprising one or both of a new present value (NPV) and an internal rate of return (IRR) for the subject site over the analysis term. One or both of these values may be calculated by the unit planning system 302 in any suitable manner. For example, NPV may indicate the present value of the cash flows forecast to be generated by the subject site in view of the discount rate. Equation 1 below provides an example of how NPV may be calculated in some embodiments:

$$NPV = CF_0 + \frac{CF_1}{(1+R)} + \frac{CF_2}{(1+R)^2} + \ldots \frac{CF_T}{(1+R)T} \quad (1)$$

In Equation (1), CF refers to the periodic cash flow (e.g., the values of the fields 6132 over each of the years of the analysis term). R refers to the discount rate expressed as a percentage. T is the term, or the last unit of the analysis term (e.g., year 7 in FIG. 43).

The Pro Forma screen 690 may also comprise an internal rate of return (IRR) for the subject site over the analysis term. IRR may be calculated by the unit planning system in any suitable manner. For example, IRR may be calculated as indicated by Equation (2) below:

$$IRR = \sum_{i=1}^{T} CF_0 + \frac{CF_1}{(1+IRR)} + \frac{CF_2}{(1+IRR)^2} + \ldots \frac{CF_T}{(1+IRR)^T} \quad (2)$$

To calculate IRR, the unit planning system 302 may iteratively solve Equation (2), for example, according to any suitable method for solving recursive equations.

In various embodiments, the unit planning system 302 may solve for and display two values for NPV and IRR, a first value not considering cannibalization and a second value considering cannibalization. The values for NPV and IRR considering cannibalization may, for example, subtract from the subject site's revenues the amount of the revenues that is cannibalized from sister retail sites.

The systems and methods described herein may use ORACLE spatial technology and ORACLE MAPVIEWER (or similar services provided by other suitable GIS systems) to deliver a Software as a Service (SaaS) Geospatial Analytics solution. ("Tango Analytics Product")

The systems and methods may leverage standard ORACLE technology (or other suitable GIS system technology) for market planning and site selection. ("Tango Analytics Product")

The systems and methods may utilize methodologies for trade area modeling, site feature analysis, sales forecasting, market optimization, etc. utilizing any suitable GIS system including, for example, ORACLE, ESRI, MAPINFO, etc. ("TANGO Analytics Product")

The systems and methods may implement user dashboards that may leverage GIS system functionality, such as the ORACLE BUSINESS INTELLIGENCE SUITE ENTERPRISE EDITION or OBIEE, for market planning, site selection, and lease administration. ("TMC RE Dashboards")

The systems and methods may include extensions to application user interfaces, such as the ORACLE PROPERTY MANAGER, to address certain deficiencies. ("TMC OPN Extns")

The systems and methods may include extensions to systems, such as the ORACLE PROPERTY MANAGER, to address International Financial Reporting Standards (IFRS) lease accounting changes. ("TMC OPN Extns")

Various embodiments of the systems and methods may include and/or utilize a computer or computer system. In various embodiments, a user computer or computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle O64J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention.

The following description illustrates examples of various tools that can be used as described herein to perform certain sales/revenue forecasting, retail unit optimization, etc. No particular aspect or aspects of these examples are necessarily intended to limit the scope of the invention. Unless otherwise noted, and merely for purposes of convenience of disclosure, a nomenclature of "Figure X-Y" as applied in the description means that "X" represents the figure number, while "Y" represents an element designated by a reference numeral within Figure "X".

We claim:

1. A computer-implemented system for managing retail units, the system comprising:
   a computer system comprising at least one processor and operatively associated memory, wherein the computer system is in communication with at least one geospatial database, and wherein the computer system is programmed to:
   receive an indication of a target geographic area for placement of a retail unit;
   automatically retrieve, in response to the indication of the target geographic area, from the geospatial database first data describing the target geographic area;
   receive, via a communications port of the computer system, from a user device communicably coupled to the computer system second data describing the target geographic area, wherein the second data is user-collected;
   provide a graphical user interface to the user device, the graphical user interface comprising a first screen including:
      a first map field displaying a first geographic area including the target geographic area, and
      a first chart field displaying at least a portion of the first data and at least a portion of the second data;
   receive, using the at least one processor, an indication of a potential site for placement of a retail unit, wherein the potential site is positioned within the target geographic area;
   automatically generate in response to receiving the indication of the potential site for placement of the retail unit, using the at least one processor, a trade area around the potential site;
   retrieve, from the geospatial database, demographic data describing the trade area;
   receive from the user device at least one quantitative evaluation of the potential site;
   generate, using the at least one processor, a sales forecast for the potential site;
   generate, using the at least one processor, a cannibalization report for the potential site, wherein the cannibalization report indicates revenue at the potential site that is derived from other retail units; and
   transmit to the user device the sales forecast and the cannibalization report for the potential site,
   wherein, the graphical user interface further comprises a second screen, the second screen including:
  a second map field displaying the potential site and the trade area around the potential site, and
  a second chart field displaying at least a portion of the demographic data describing the trade area, the quantitative evaluation of the potential site, the sales forecast for the potential site, and the cannibalization report for the potential site.

2. The system of claim 1, wherein the user-collected data comprises a ranking of the target geographic area relative to at least one other geographic area.

3. The system of claim 1, wherein receiving the indication of the target geographic area comprises receiving the indication of the target geographic area from the user device in communication with the computer system.

4. The system of claim 1, wherein the computer system is further programmed to receive an optimized set of target geographic areas within a market area, wherein the set of target geographic areas comprises the target geographic area.

5. The system of claim 1, wherein the computer system is further programmed to organize at least the demographic data describing the trade area, the at least one quantitative evaluation of the potential site, the sales forecast for the site, and the cannibalization report for the potential site into a common data structure.

6. The system of claim 1, wherein the computer system is further programmed to receive from the user device additional data selected from the group comprising: data describing a landlord for the potential site and lease terms for the potential site.

7. The system of claim 1, wherein the computer system is further programmed to:
  receive data describing a plurality of potential sites comprising the potential site; and
  wherein the graphical user interface further comprises a third module, the third module comprising at least one comparative metric describing the plurality of potential sites.

8. The system of claim 1, wherein the computer system is further programmed to receive data describing a plurality of target geographic areas comprising the target geographic area.

9. A computer-implemented system for managing retail units, the system comprising:
  a computer system comprising at least one processor and operatively associated memory, wherein the computer system is in communication with at least one geospatial database, and wherein the computer system is programmed to:
    receive, via a network at a communication port, an indication of a potential site for placement of a retail unit, wherein the potential site is positioned within a target geographic area;
    automatically generate, using the at least one processor, a trade area around the potential site in response to receiving the indication of the potential site;
    automatically retrieve, from the at least one geospatial database, demographic data describing the trade area;
    receive, via the network at the communications port, from a user device communicably coupled to the computer system at least one quantitative evaluation of the potential site;
    generate, using the at least one processor, a sales forecast for the potential site;
    generate, using the at least one processor, a cannibalization report for the potential site, wherein the cannibalization report indicates revenue at the potential site that is derived from other retail units;
    transmit, via the network at the communications port, to the user device the sales forecast and the cannibalization report for the potential site; and
    provide a graphical user interface to the user device, the graphical user interface comprising:
      a map field displaying the potential site and the trade area around the potential site, and
      a chart field displaying at least a portion of the demographic data describing the trade area, the quantitative evaluation of the potential site, the sales forecast for the potential site, and the cannibalization report for the potential site.

10. The system of claim 9, wherein the computer system is further programmed to organize at least the demographic data describing the trade area, the at least one quantitative evaluation of the potential site, the sales forecast for the site, and the cannibalization report for the potential site into a common data structure.

11. The system of claim 9, wherein the computer system is further programmed to receive from the user device additional data selected from the group comprising: data describing a landlord for the potential site and lease terms for the potential site.

12. The system of claim 9, wherein the computer system is further programmed to:
  receive data describing a plurality of potential sites comprising the potential site, wherein the graphical user interface further comprises
  a module including at least one comparative metric describing the plurality of potential sites.

13. A system for managing retail units, the system comprising:
  means for receiving an indication of a potential site for placement of a retail unit, wherein the potential site is positioned within a target geographic area;
  means for automatically generating a trade area around the potential site;
  means for automatically retrieving demographic data describing the trade area;
  means for receiving from a user device at least one quantitative evaluation of the potential site;
  means for generating a sales forecast for the potential site; and
  means for generating a cannibalization report for the potential site, wherein the cannibalization report indicates revenue at the potential site that is derived from other retail units;
  means for transmitting to the user device the sales forecast and the cannibalization report for the potential site; and
  means for providing a graphical user interface to the user device, the graphical user interface comprising:
    a map field displaying the potential site and the trade area around the potential site, and
    a chart field displaying at least a portion of the demographic data describing the trade area, the quantitative evaluation of the potential site, the sales forecast for the potential site, and the cannibalization report for the potential site.

* * * * *